US006923286B2

(12) United States Patent
Sato et al.

(10) Patent No.: US 6,923,286 B2
(45) Date of Patent: Aug. 2, 2005

(54) PEDESTRIAN PROTECTING DEVICE

(75) Inventors: Yuji Sato, Aichi-ken (JP); Hiroyuki Kobayashi, Aichi-ken (JP); Takao Adachi, Aichi-ken (JP); Takehiko Shiraki, Aichi-ken (JP); Shinji Oguchi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 93 days.

(21) Appl. No.: 10/364,330

(22) Filed: Feb. 12, 2003

(65) Prior Publication Data

US 2003/0159875 A1 Aug. 28, 2003

(30) Foreign Application Priority Data

| Feb. 26, 2002 | (JP) | ................................. 2002-050169 |
| Feb. 26, 2002 | (JP) | ................................. 2002-050196 |
| Feb. 26, 2002 | (JP) | ................................. 2002-050225 |
| Feb. 26, 2002 | (JP) | ................................. 2002-050238 |
| Feb. 26, 2002 | (JP) | ................................. 2002-050262 |

(51) Int. Cl.[7] ............................................. B60R 21/34
(52) U.S. Cl. ................................. 180/274; 280/730.1
(58) Field of Search ........................... 180/271, 274; 280/730.1; B60R 21/34

(56) References Cited

U.S. PATENT DOCUMENTS

| 3,845,983 A | * | 11/1974 | Heintz .......................... 296/192 |
| 4,373,130 A | * | 2/1983 | Krasborn et al. ........... 219/203 |
| 4,466,654 A | * | 8/1984 | Abe ............................. 296/192 |
| 4,549,471 A | * | 10/1985 | Kochy et al. ................ 454/127 |
| 4,935,983 A | * | 6/1990 | Yamamoto et al. ...... 15/250.16 |
| 5,005,897 A | * | 4/1991 | Endo et al. .................. 296/192 |
| 6,182,782 B1 | * | 2/2001 | Matsuura et al. ............ 180/274 |
| 6,474,679 B2 | * | 11/2002 | Miyasaka et al. ............ 180/274 |
| 6,497,302 B2 | * | 12/2002 | Ryan ........................... 180/274 |
| 6,701,569 B1 | * | 3/2004 | Benner ..................... 15/250.31 |
| 6,827,170 B2 | * | 12/2004 | Hamada et al. ............. 180/274 |
| 2003/0062208 A1 | * | 4/2003 | Hamada et al. ............. 180/274 |

FOREIGN PATENT DOCUMENTS

| DE | 2711338 A1 | * | 9/1978 | ........... B60R/21/14 |
| EP | 0967128 A2 | * | 12/1999 | ........... B60R/21/34 |
| JP | H7-108903 | | 4/1995 | |
| JP | 2000-264146 | | 9/2000 | |

* cited by examiner

Primary Examiner—Paul N. Dickson
Assistant Examiner—Joselynn Y. Sliteris
(74) Attorney, Agent, or Firm—Posz Law Group, PLC

(57) ABSTRACT

A pedestrian protecting device includes an airbag housed below a cowl louver made of a synthetic resin, such that it is folded in an elongated shape along the cowl louver. The airbag can be expanded to protrude upward by an inflating gas discharged from an inflator, to protect a pedestrian. The cowl louver includes a door portion covering the airbag when folded and housed, and curved to protrude to the front at the respective centers of its front and rear edges. This door portion can be opened to the front or to the rear by the expanding airbag. The door portion is formed integrally with the cowl louver and includes expansion promoting means so that it can be smoothly opened.

13 Claims, 45 Drawing Sheets

PEDESTRIAN PROTECTING DEVICE

CROSS REFERENCE TO RELATED APPLICATIONS

The present application claims priority to Japanese patent application of Sato et al., filed Feb. 26, 2002, No.2002-050169, Japanese patent application of Sato et al., filed Feb. 26, 2002, No.2002-050 196, Japanese patent application of Sato et al., filed Feb. 26, 2002, No.2002-050225, Japanese patent application of Sato et al., filed Feb. 26, 2002, No.2002-050238, and Japanese patent application of Sato et al., filed Feb. 26, 2002, No.2002-050262, the contents of which are hereby incorporated by reference.

BACKGROUND OF THE INVENTION

1. Field of the Invention

The present invention relates to a pedestrian protecting device for a vehicle, which is provided with an airbag folded and housed on the lower side of the hood panel near the rear edge so that it can be expanded and inflated to protrude upward by admitting an inflating gas discharged from an inflator, thereby to protect a pedestrian.

2. Description of the Related Art

Pedestrian protecting devices of the aforementioned construction found in prior arts include an airbag device having the construction disclosed in Unexamined Published Japanese Patent Application No. 7-108903. The airbag device described in FIGS. 7 and 8 of that Application is provided with an airbag to be folded and housed, and a door portion for covering the upper side of the airbag. This airbag is folded and housed into an elongated shape below and along the lower edge of the hood panel. The door portion can be opened toward the vehicular rear when the airbag is expanded and inflated. In the vehicle having this airbag device arranged, the hood panel is so curved on its rear edge side that its transverse center may protrude to the front along with the curved shape of the lower edge of the front windshield. In this airbag device, therefore, the door portion covering the upper side of the folded airbag is also formed in a curved elongated shape along the rear edge of the hood panel.

Specifically in the airbag device of the aforementioned construction, the hinge portion on the door portion near the rear edge for providing the center of rotation when the door portion is opened is arranged with a curvature following the curved shape of the door portion. This is because the door portion is curved and elongated. At the expansion time of the airbag, therefore, the door portion may be hard to smoothly open, making prompt expansion of the airbag difficult.

In the aforementioned construction, moreover, the airbag device has to be assembled considering the interference of the hood panel with the door portion when the hood panel is opened/closed. This is because the door portion is arranged on the rear edge side of the hood panel itself. Therefore, it is troublesome to assemble the airbag device into the vehicle.

Another pedestrian protecting airbag device has the construction disclosed in Unexamined Published Japanese Patent Application No. 2000-264146.

This airbag device is housed in the recess which is formed by a cowl panel positioned between the hood panel and the front windshield of the vehicle. The airbag is expanded and inflated to cover the front sides of the front pillars and the wipers by admitting the inflating gas from the inflator.

However, the airbag device of the aforementioned construction is made absolutely separate of integral members of the vehicle. For this airbag device, therefore, a case for housing the airbag and the inflator, a door portion covering the airbag and adapted to be opened when the airbag is to be expanded and inflated, and so on are indispensable. And, the airbag device thus constructed is housed, as one unit comprising the case housing the airbag and the inflator, in the recess formed of the cowl panel. Therefore, the number of parts of the entire vehicle is increased and makes no contribution to the reduction in the number of assembling steps, thus increasing the weight of the vehicle.

In the pedestrian protecting device thus constructed, moreover, the airbag completes its inflation by extending obliquely backward and upward from the lower side of the hood panel. At this time, the airbag pushes up and supports the rear end of the hood panel so as to apply a shock absorbing action to the hood panel, and covers the front faces of the hard front pillars.

In connection with the airbag of the device of the prior art, however, the following problem arises, in case the portion to push up and support the rear end of the hood panel is so modified in construction as to cover the cowl louver between the hood panel and the front windshield of the vehicle widely in the longitudinal direction of the vehicle. Specifically, the portion of the airbag which pushed up and supported the rear end of the hood panel before modification is now formed into a simple cylindrical shape. If the cowl louver is still to be covered widely in the vehicular longitudinal direction by that portion, therefore, the diameter of that cylindrical portion must be enlarged, increasing the volume of the airbag unnecessarily. As a result, the time period from the start to the end of the expansion of the airbag is elongated, and the most preferred inflator for feeding the airbag with the inflating gas needs to be replaced by one of a high output.

In the construction of recent years to improve the design of the vehicle, moreover, the arms of the wipers when not used are housed on the lower side of the hood panel rear edge. In the vehicle having the pedestrian protecting device of that construction mounted thereon, however, the arms of the wipers are arranged between the recess and the front windshield (see FIG. 2 of the aforementioned Application). In other words, the arms of the wipers are exposed even in the unused state to the outside of the vehicle. It is, therefore, difficult to apply the pedestrian protecting device of the prior art to the vehicle of the type using wipers which are provided with the arms to be housed when not used on the lower side of the hood panel. This is because the wipers then make it difficult to retain the smooth expansion of the airbag.

SUMMARY OF THE INVENTION

A first object of the present invention is to provide a pedestrian protecting device, which can expand and inflate a housed airbag promptly by smoothly opening a door portion covering the airbag and which can be simply built into a vehicle.

Moreover, a second object of the invention is to provide a pedestrian protecting device which requires fewer steps to be built into the vehicle, does not greatly increase the number of parts of the vehicle, and is reduced in weight.

Moreover, a third object of the invention is to provide a pedestrian protecting device, in which the airbag can cover a cowl louver widely in the vehicular longitudinal direction while suppressing the increase in the volume.

Furthermore, a fourth object of the invention is to provide a pedestrian protecting device, which is provided with an airbag capable of being smoothly expanded and inflated to protect a pedestrian properly even if there are arranged wipers constructed to have arms to be housed on the lower side of a hood panel rear end.

The first object of the invention can be achieved by a pedestrian protecting device having the following construction.

In the pedestrian protecting device:

a cowl louver is made of a synthetic resin and is arranged between the hood panel and the front windshield of a vehicle such that it is bent along the lower end of the front windshield;

an airbag is housed below the cowl louver by being folded in an elongated shape along the cowl louver;

the airbag can be expanded and inflated to protrude upward by admitting an inflating gas discharged from an inflator, thereby to protect a pedestrian;

the cowl louver includes a door portion curved so that the centers of its front and rear edges protrude toward the front, thereby covering the upper side of the airbag folded and housed;

the door portion can be opened to the front and/or to the rear by the push of the airbag being expanded and inflated;

the door portion is formed integrally with the cowl louver; and the door portion includes expansion promoting means which can make the door portion smoothly opened.

In the pedestrian protecting device thus constructed, the expansion promoting means is arranged in the door portion which is formed integrally with the cowl louver made of a synthetic resin. Thus even if the door portion is curved and elongated along the cowl louver and if the hinge portion on the front edge side and/or the rear edge side of the door portion for the center of rotation for the door portion being opened is arranged with a curvature, the door portion can be smoothly opened by the expansion promoting means when the airbag is expanded and inflated.

In the pedestrian protecting device thus constructed, moreover, the airbag is folded and arranged below the cowl louver which is arranged between the hood panel and the front windshield of the vehicle and with a curvature along the front windshield. Therefore, the interference of the hood panel with the airbag device at the hood panel opening/closing time need not be considered and there is no problem in building the airbag device into the vehicle. In the pedestrian protecting device thus constructed, moreover, the door portion for covering the airbag housed is the cowl louver itself, an integral member of the vehicle. Therefore, the number of parts constructing the vehicle can be reduced, and the number of steps involved in building the airbag device into the vehicle is also reduced.

In the pedestrian protecting device thus constructed, therefore, the door portion for covering the housed airbag can be smoothly opened to expand and inflate the airbag promptly, and it can be simply built into the vehicle.

In the pedestrian protecting device thus constructed, moreover, it is preferable that the door portion is formed of a thermoplastic elastomer, this being an expansion promoting means.

With the pedestrian protecting device being thus constructed, because the door portion itself is made of a thermoplastic elastomer, it is slightly extended or contracted by the push of the airbag when it is opened. Thus, even if the hinge portions on the front edge side or the rear edge side of the door portion for providing the center of rotation at the opening time of the door portion is arranged along the curve of the cowl louver, the door portion is not partially broken. Therefore, the door portion is smoothly opened by the push of the airbag being expanded and inflated, so that the airbag can be promptly expanded and inflated.

In the pedestrian protecting device thus constructed, moreover, the expansion promoting means of the door portion may be a construction of split doors which are separated the door portion into a plurality of doors along the transverse direction of the vehicle.

With the pedestrian protecting device being thus constructed, the split doors separated into a plurality of doors in the transverse direction of the vehicle are opened by the push of the airbag when the airbag is expanded and inflated. Even if the hinge portions of the entire split door, which is formed centers of rotation at the opening time of the door portion, arranged along the curve of the cowl louver, the hinge portion forming the center of rotation of each split doors is substantially linear. This is because the door portion is divided into a plurality of split doors arranged in the vehicular transverse direction. Even if the door portion as a whole has curvature along the cowl louver, therefore, as it is opened the transverse edges of adjoining split doors overlap each other and separate from each other. In other words, force extending or contracting the door portion is hardly applied at all to the individual split door portions. Therefore, the door portion is not partially broken even if it is made of a hard material, so that it is smoothly opened by the push of the airbag when it expands and inflates. As a result, the door portion can be smoothly opened in its entirety to expand and inflate the airbag promptly.

Moreover, the second object of the invention can be achieved by the pedestrian protecting device having the following construction.

In a pedestrian protecting device:

a cowl louver is arranged between a hood panel and a front windshield of a vehicle;

an airbag is folded and housed below the cowl louver;

the airbag is expanded and inflated to protrude upward by admitting an inflating gas discharged from an inflator, thereby to protect a pedestrian;

the cowl louver is made of a synthetic resin and includes a main body of the cowl louver on the upper side and a lower side member arranged on the lower face of the main body;

the lower side member has a housing recess formed between itself and the main body for housing the airbag and the inflator;

the main body has a door portion formed integrally with the main body at a position above the housing recess;

the door portion can be opened, when the airbag housed is expanded and inflated, by the push of the airbag; and the main body and the lower side member are sealed and connected to each other near the peripheral edge of the housing recess.

In the pedestrian protecting device thus constructed, the cowl louver made of a synthetic resin or a member constructing the vehicle is constructed of the two members of the main body on the upper face side and the lower side member arranged on the lower face side of the main body. In the lower side member, moreover, there is formed the housing recess for housing the airbag and the inflator. At a position above the housing recess in the body, moreover, the door portion to be opened by the push of the housed airbag being expanded and inflated is formed integrally with the main body. In the pedestrian protecting device thus constructed, more specifically, the housing portion for housing the inflator and the airbag and the door portion for covering the vehicular outer side of the airbag are constructed of the cowl louver itself made of a synthetic resin or the member constructing the vehicle. In the pedestrian protecting device thus constructed, therefore, the number of parts constructing the vehicle can be made less than that of the case in which the pedestrian protecting device of the prior art requiring the case, the door portion and so on is mounted on the vehicle, and the weight can also be reduced.

In the pedestrian protecting device thus constructed, moreover, the airbag device can be mounted on the vehicle if the cowl louver having the airbag device assembled therewith is assembled into the vehicle. Therefore, the number of steps of assembling the airbag device into the vehicle can be reduced.

In the pedestrian protecting device thus constructed, therefore, the number of steps of assembling the pedestrian protecting device into the vehicle can be reduced while suppressing the increase in the number of parts of the vehicle, and the weight can also be reduced.

In the pedestrian protecting device thus constructed, moreover, the main body and the lower side member are sealed to each other near the peripheral edge of the housing recess. No rainwater invades into the housing recess for housing the airbag and the inflator so that the airbag and the inflator can be housed durably and stably.

In the pedestrian protecting device thus constructed, moreover, it is preferable that:

the main body and the lower side member are made of polypropylene;

a seal member for sealing the main body and the lower side member are made of a thermoplastic elastomer of olefins or a thermoplastic elastomer of styrenes; and the seal member is formed integrally with the main body or the lower side member.

With the pedestrian protecting device being thus constructed, the seal member can be formed integrally with the main body or the lower side member. Therefore, another seal member need not be arranged so that the number of parts can be more reduced.

In the pedestrian protecting device thus constructed, moreover, it is preferable that:

the door portion is made of the same material as that making the seal member; and the seal member is formed together with the door portion integrally with the main body.

With the pedestrian protecting device being thus constructed, the seal member can be formed, together with the door portion, integrally with the main body. As compared with the case in which the seal member is formed integrally with the lower side member, therefore, the mold for the lower side member can be simplified to lower the cost for manufacturing the cowl louver.

In the pedestrian protecting device thus constructed, moreover, it is preferable that:

the hood panel has a rear vertical wall portion arranged in the vertical direction on the rear end side;

the main body has a front vertical wall portion bend downward on the front side to form a front wall portion of the housing recess; and the front vertical wall portion is arranged to approach the rear vertical wall portion of the hood panel from the vehicular rear side and to confront the same.

With the pedestrian protecting device being thus constructed, at the time of expanding and inflating the airbag, the front vertical wall portion is supported, even if deformed to the front, by the rear vertical wall portion of the hood panel. And, the airbag can be prevented from being expanded and inflated to invade to the vehicular front side below the hood panel. This is because the front vertical wall portion of the main body is arranged to approach from the vehicular rear side and to confront the rear vertical wall portion of the hood panel. As a result, the airbag can be smoothly expanded and inflated to protrude upward.

In order to achieve the second object of the invention, moreover, the pedestrian protecting device may have the following construction.

In the pedestrian protecting device:

an airbag is folded and housed at a portion of a cowl arranged between a hood panel and a front windshield of a vehicle;

the airbag can be expanded and inflated to protrude upward by admitting an inflating gas discharged from an inflator, thereby to protect a pedestrian;

the cowl includes a cowl panel made of a sheet metal and arranged on the body side of the vehicle, and a cowl louver made of a synthetic resin and arranged above the cowl panel;

the cowl louver has a housing portion for housing the airbag and the inflator, and a door portion for covering the upper side of the housing portion;

the door portion can be opened, when the airbag housed is expanded and inflated, by the push of the airbag; and the housing portion is held by the cowl panel.

In the pedestrian protecting device thus constructed, the cowl louver made of a synthetic resin or the member constructing the vehicle includes the housing portion for housing the airbag and the inflator, and the door portion for covering the upper side of the housing portion. In the pedestrian protecting device thus constructed, more specifically, the housing portion for housing the inflator and the airbag and the door portion for covering the vehicular outer side of the airbag are constructed by the cowl louver itself made from the synthetic resin used for constructing the vehicle. As compared with the prior art requiring the case, the door portion and so on to be mounted on the vehicle, therefore, the pedestrian protecting device of the aforementioned construction can be constructed with a fewer number of parts added to the vehicle and can reduce the weight of the vehicle.

Moreover, the pedestrian protecting device of the aforementioned construction can be mounted on the vehicle together with the cowl louver to which it is attached. Therefore, it is possible to reduce the number of steps required for building the pedestrian protecting device into the vehicle.

In the pedestrian protecting device thus constructed, therefore, the number of steps required for building the pedestrian protecting device into the vehicle, while suppressing the increase in the number of parts added to the vehicle, and the weight can be reduced.

In the pedestrian protecting device thus constructed, moreover, the housing portion is held by the cowl panel made of a sheet metal sufficiently rigid that it stops the downward pushing force acting during expansion of the airbag. Therefore, the airbag can be stably expanded.

In the pedestrian protecting device thus constructed, moreover, it is preferable that the lower side of the housing portion of the cowl louver is supported in abutment against the cowl panel.

With the pedestrian protecting device being thus constructed, the lower side of the housing portion is supported in abutment against the cowl panel. Therefore, the downward pushing force acting during expansion of the airbag can be borne by the cowl panel, allowing the airbag to expand more stably.

In the pedestrian protecting device thus constructed, moreover, it is preferable that the housing portion of the cowl louver is held at a position on the upper side of the cowl panel.

With the pedestrian protecting device being thus constructed, the rainwater or the like hardly reaches the housing portion at all even if much water is collected in the cowl panel. This is because the housing portion is held at a portion on the upper side of the cowl panel. As a result, a housing portion which keeps out the rainwater can have a simplified structure.

In the pedestrian protecting device thus constructed, moreover, it is preferable that:

the airbag is housed in a water-proofed state in the housing portion; and the inflator is housed in the housing portion while being surrounded with the airbag.

With the pedestrian protecting device being thus constructed, the airbag is water-proofed and then housed in the housing portion, and the inflator is housed in the housing portion wrapped in the airbag. Thus, even if the rainwater or the like invades into the housing portion, the airbag and the inflator do not lose their durability. As a result, a housing portion which keeps out the rainwater can have a still more simplified structure.

In the pedestrian protecting device thus constructed, moreover, it is preferable that the airbag is connected and fixed together with the housing portion of the cowl louver to the cowl panel.

With the pedestrian protecting device being thus constructed, even the inertial force of the airbag when the airbag completes its inflation pulls strongly upward, the airbag can be reliably held down by the cowl panel. This is because the airbag is connected to and fixed on the cowl panel. As a result, it is possible to arrange the airbag stably.

Moreover, the third object of the invention can be achieved by the pedestrian protecting device having the following construction.

In the pedestrian protecting device:

an airbag having completed its expansion covers at least a cowl louver and the portion of the airbag for covering the cowl louver includes height restricting means for suppressing the height size at completion of the expansion.

In the pedestrian protecting device thus constructed, the airbag having completed its expansion is suppressed in height at the portion of the cowl louver by the height restricting means so that the width of the airbag in the longitudinal direction of the vehicle can be easily maintained.

And, the portion of the airbag for covering the cowl louver is suppressed in height to enable enlargement of the width size in the vehicular longitudinal direction at completion of the expansion by the height restricting means, so that the airbag can have minimal increase in the volume.

In this pedestrian airbag device thus constructed, therefore, the airbag can cover the cowl louver widely in the vehicular longitudinal direction while increase in the volume is suppressed, so that it can protect the pedestrian properly from the cowl louver.

In the pedestrian protecting device thus constructed, on the other hand, it is preferable that:

the airbag is formed by a hollow-weaving method;

the height restricting means includes a plurality of cylindrical portions juxtaposed in the vehicular longitudinal direction in the airbag, and a cover cloth for covering the cylindrical portions from above; and the cover cloth can be so arranged that it is connected in the vehicular longitudinal direction to the cylindrical portions so that it can bring the cylindrical portions closer to each other in the vehicular longitudinal direction.

With the pedestrian protecting device being thus constructed, at completion of the expansion of the airbag, the cylindrical portions juxtaposed in the vehicular longitudinal direction are arranged close to each other in the vehicular longitudinal direction by the cover cloth so as to cover the cowl louver. Specifically, not a single cylindrical portion is expanded or inflated, but a plurality of cylindrical portions are juxtaposed in the vehicular longitudinal direction and are arranged closer to each other in the vehicular longitudinal direction by the cover cloth. Therefore, the cylindrical portions neither leave each other nor increase their heights but can cover the cowl louver with the enhanced cushioning effect.

As a result, with the construction being thus constructed, the airbag can easily cover the cowl louver without increasing its volume while suppressing the height and enlarging the vehicular longitudinal width, even if the airbag is manufactured by the hollow-weaving method by which it is difficult to provide height restricting internal tethers in the airbag. The airbag can naturally be easily manufactured by being cut to the predetermined shape after being woven, because it is formed by hollow-weaving.

Moreover, the fourth object of the invention can be achieved by the pedestrian protecting device having the following construction.

In the pedestrian protecting device:

an airbag is folded and housed on the lower side near the rear edge of a hood panel of a vehicle;

the airbag can be expanded and inflated to protrude upward by admitting an inflating gas discharged from an inflator, thereby to protect a pedestrian;

wipers are arranged at a portion of a cowl between the hood panel and a front windshield;

the wipers include arms arranged on the upper side of the cowl louver;

the arms are housed when not used on the lower side near the rear edge of the hood panel; and a protruding opening for the housed airbag at the expansion time is provided below the rear edge of the hood panel and above the arms.

In the pedestrian protecting device thus constructed, the protruding opening for the housed airbag is arranged between below the hood panel rear end and above the arms of the wipers. Even if the arms of the wipers are housed below the hood panel rear edge when not being used, therefore, the airbag protrude from the protruding opening between the hood panel rear edge and the arms. As a result, the airbag can be smoothly expanded and inflated without interference to the hood panel rear end and the arms.

In the pedestrian protecting device thus constructed, therefore, even if the wipers are arranged to have the arms to be housed on the lower side of the hood panel near the rear edge when not being used, the airbag can be smoothly expanded and inflated to protect the pedestrian properly.

In the pedestrian protecting device thus constructed, moreover, it is preferable that:

the airbag is mounted and fixed to the hood panel or the cowl louver;

a slide mechanism for enlarging the vertical distance between the hood panel and the arms housed is arranged on either the hood panel or the wipers or both; and the airbag being expanded and inflated is protruded from the protruding opening by pushing and vertically displacing the hood panel or the arms or both, whichever has the slide mechanism.

With the pedestrian protecting device being thus constructed, even if the vertical distance between the hood panel rear end and the arms when the airbag is uninflated is set to be small, the vertical distance between the hood panel rear end and the arms is enlarged at the expansion time of the airbag so that the airbag is smoothly expanded and inflated without interference to the hood panel rear end and the arms. On the contrary, the vertical distance between the hood panel rear end and the arms when the airbag is not inflated can be set to be small so that the design of the vehicle can be improved.

DESCRIPTION OF THE PREFERRED EMBODIMENTS

Figure 1:
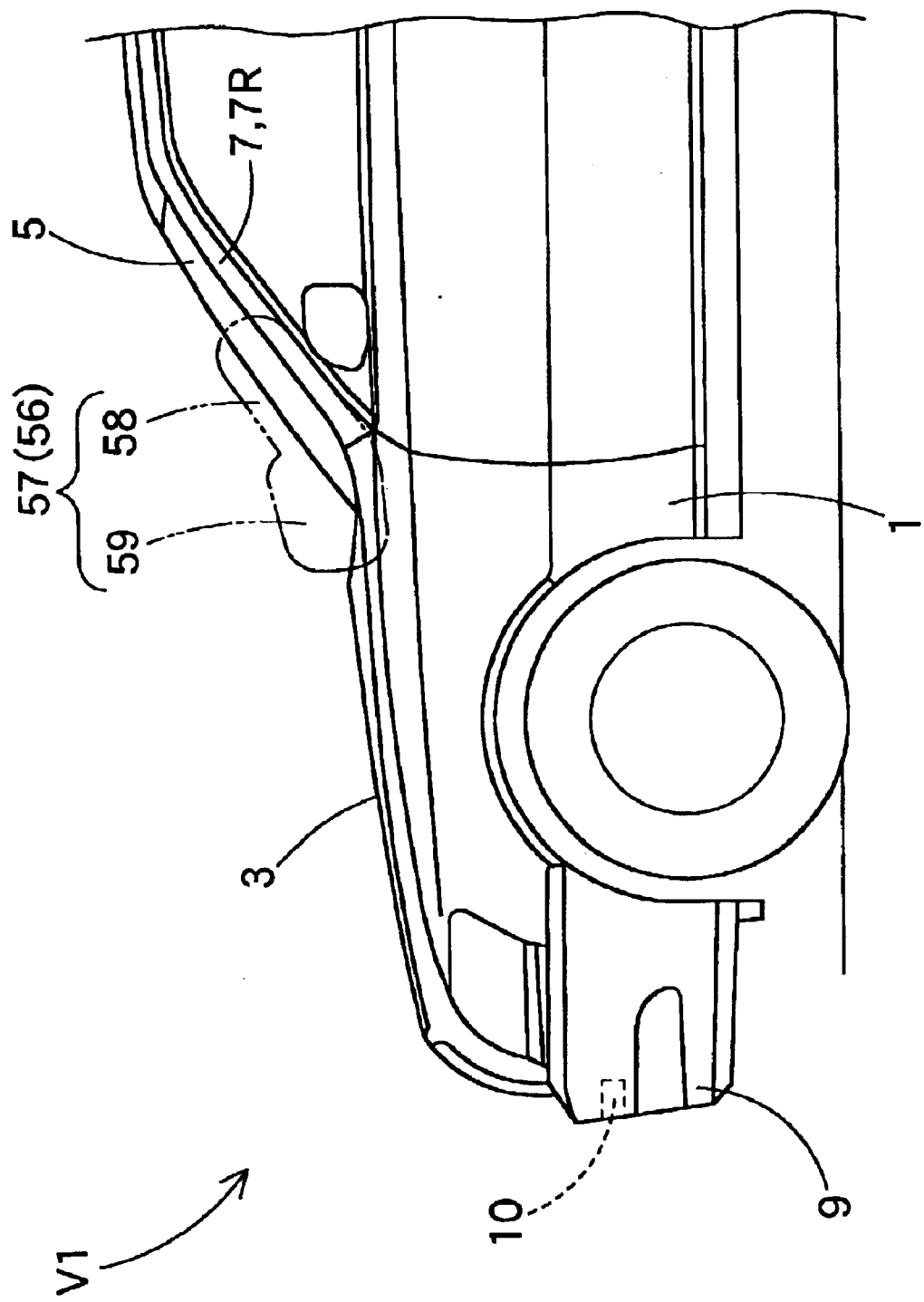
FIG. 1 is a side elevation of a vehicle, on which a pedestrian protecting device according to a first embodiment of the invention is provided.

The invention will be described below by way of embodiments shown in the drawings. In addition, the invention is not limited to the embodiments. All modification within the requirements of the claims and equivalents with respect to the requirements should be included in the scope of the claims.

One embodiment of the present invention will be described with reference to the accompanying drawings. Here, the longitudinal, vertical and transverse directions in the embodiment will be so defined as follows, unless otherwise specified. The vertical direction of the vehicle is defined as the "vertical direction", and the longitudinal direction of the vehicle will be defined as the "longitudinal direction". Moreover, the transverse direction, looking from the front side of the vehicle to the rear, will be defined as the "transverse direction".

First of all, here will be described airbag devices M1 and M2 for pedestrians, pedestrian protecting devices which can achieve the first and second objects of the invention.

The pedestrian airbag device M1 of the first embodiment is shown in FIGS. 1 to 5. The airbag device M1 is arranged at the location of a cowl 12 between a hood panel 3 and a front windshield 5 in a vehicle V1. Moreover, the airbag device M1 is provided with a folded airbag 56 and an inflator 46 for feeding the airbag 56 with an inflating gas.

In the case of the embodiment, moreover, an airbag cover having a door portion 26 for covering the folded airbag 56 and a portion 41 acting as a case for housing the airbag 56 and the inflator 46 are constructed of a cowl louver 18 arranged above a cowl panel 13.

Here, the cowl 12 is provided with a highly rigid cowl panel 13 provided toward the interior of the vehicular body 1, and a cowl louver 18 which is above the cowl panel 13.

In a front panel 9 of the vehicle V1, moreover, there is arranged a sensor 10 capable of detecting or predicting a collision with a pedestrian. And, the not-shown airbag activating circuit activates the inflator 46 to expand and inflate the airbag 56, when it inputs a signal having detected or predicted the collision with the pedestrian from the sensor 10.

The cowl panel 13 is constructed in the shown example by welding three steel sheet panel members 14, 15 and 16. In the cowl panel 13, moreover, there are arranged a passage 13a for introducing an air A flow from the cowl louver 18 into the vehicular compartment, and a passage 13b for draining the rainwater, coming from the cowl louver 18, from the left and right edges of the vehicle V1.

Here, the front windshield 5 is fixed at its peripheral edge on adjacent edges of the vehicular body 1 such as the cowl panel 13.

The cowl louver 18 is so arranged along the lower end 5a of the front windshield 5 which is curved so that its transverse center protrudes toward the vehicular front side. The cowl louver 18 is composed of a main body 19 and a lower side member 35, both of which are made of polypropylene. The main body 19 is arranged on the upper side of the folded airbag 56 and comprises the airbag cover. The lower side member is arranged under the main body 19. And, the lower side member 35 forms between itself and the main body 19 a housing recess 43 for housing the airbag 56 and the inflator 46. The polypropylene (PP) from which is made the main body 19 and the lower side member 35 preferably has high-impact properties. Specific examples of this polypropylene include homo-PP, a copolymer of PP and a small quantity of olefin monomer, PP containing a fibrous filler for affording the high-impact properties, or a composite containing a soft component such as ethylene-propylene rubber (EPR).

Figure 3:
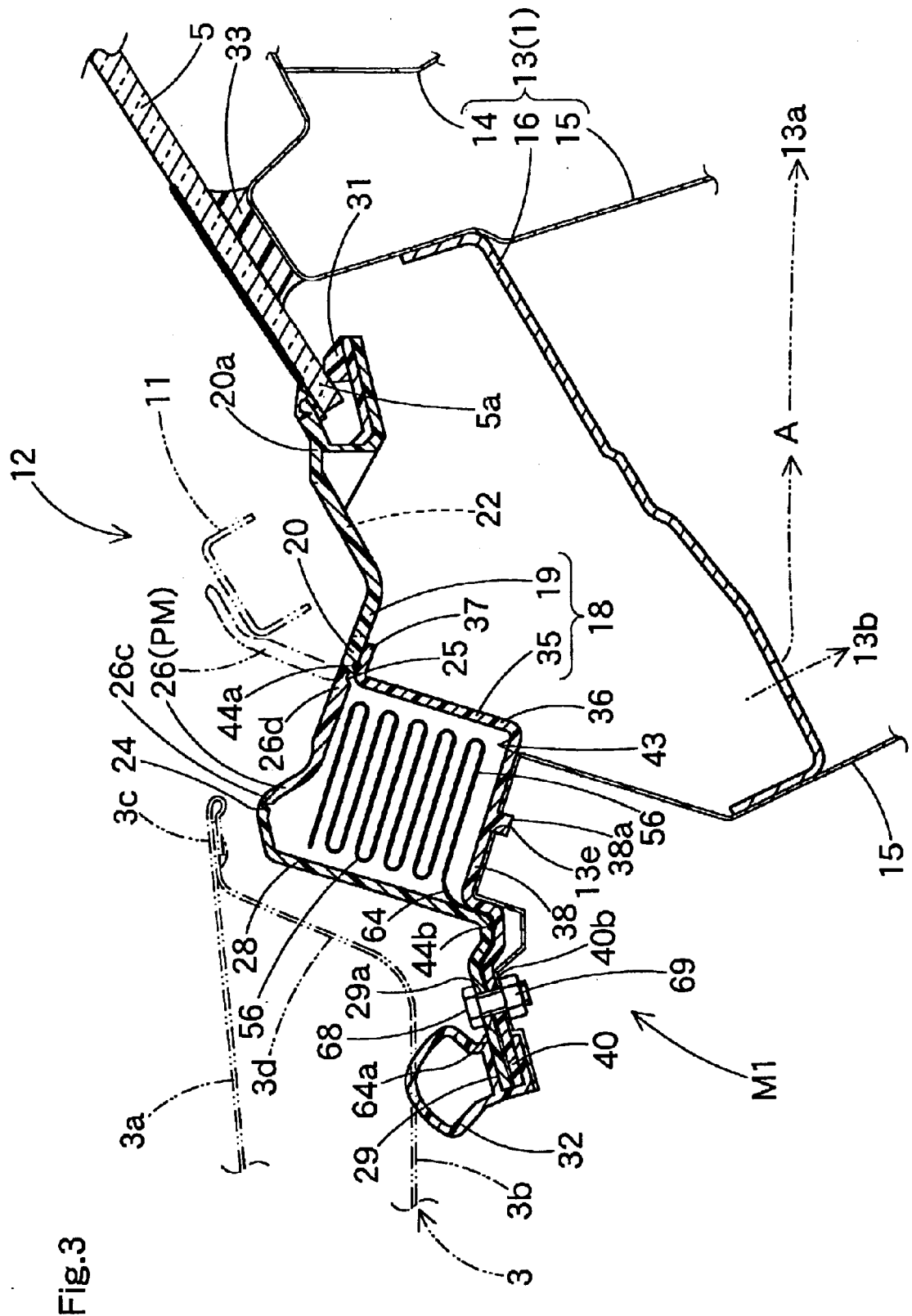
FIG. 3 is a schematic vertical section along line III—III of FIG. 2 showing the pedestrian protecting device of the first embodiment in the vehicular longitudinal direction.
Figure 4:
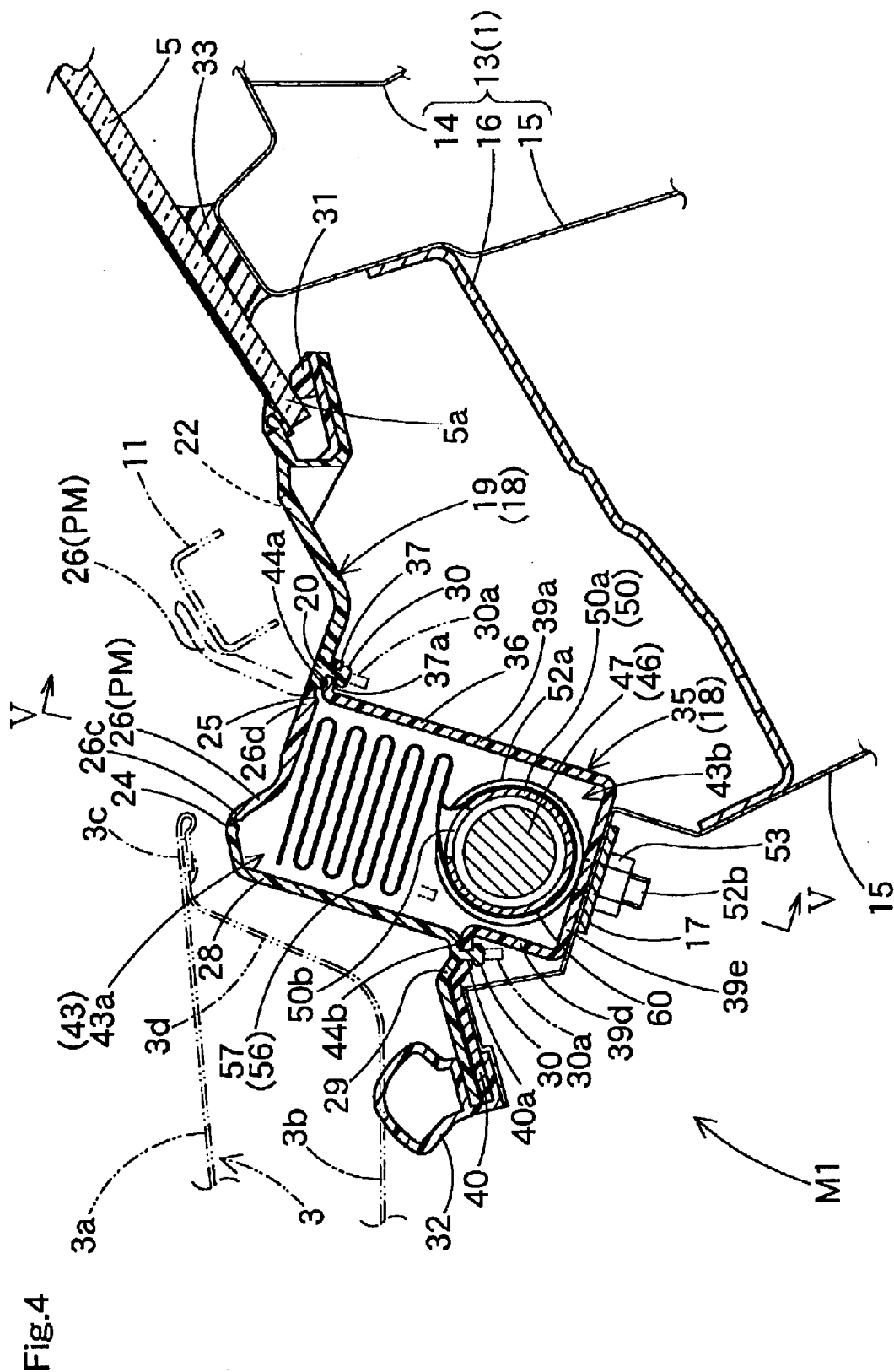
FIG. 4 is a schematic vertical section along line IV—IV of FIG. 2 showing the pedestrian protecting device of the first embodiment in the vehicular longitudinal direction.

The main body 19 is so arranged in the crescent space between the rear edge 3a of the hood panel 3 and the front windshield 5 as to extend up to the left and right edges of the vehicle V1. Also, the main body 19 is formed to have a sectional shape of a generally inverted letter "L" shape in the vehicular longitudinal direction, as shown in FIGS. 3 and 4. Specifically, the main body 19 is provided with an upper wall portion 20 arranged generally in the horizontal direction, and a front vertical wall portion 28 extending downward from the front edge of the upper wall portion 20.

Figure 6:
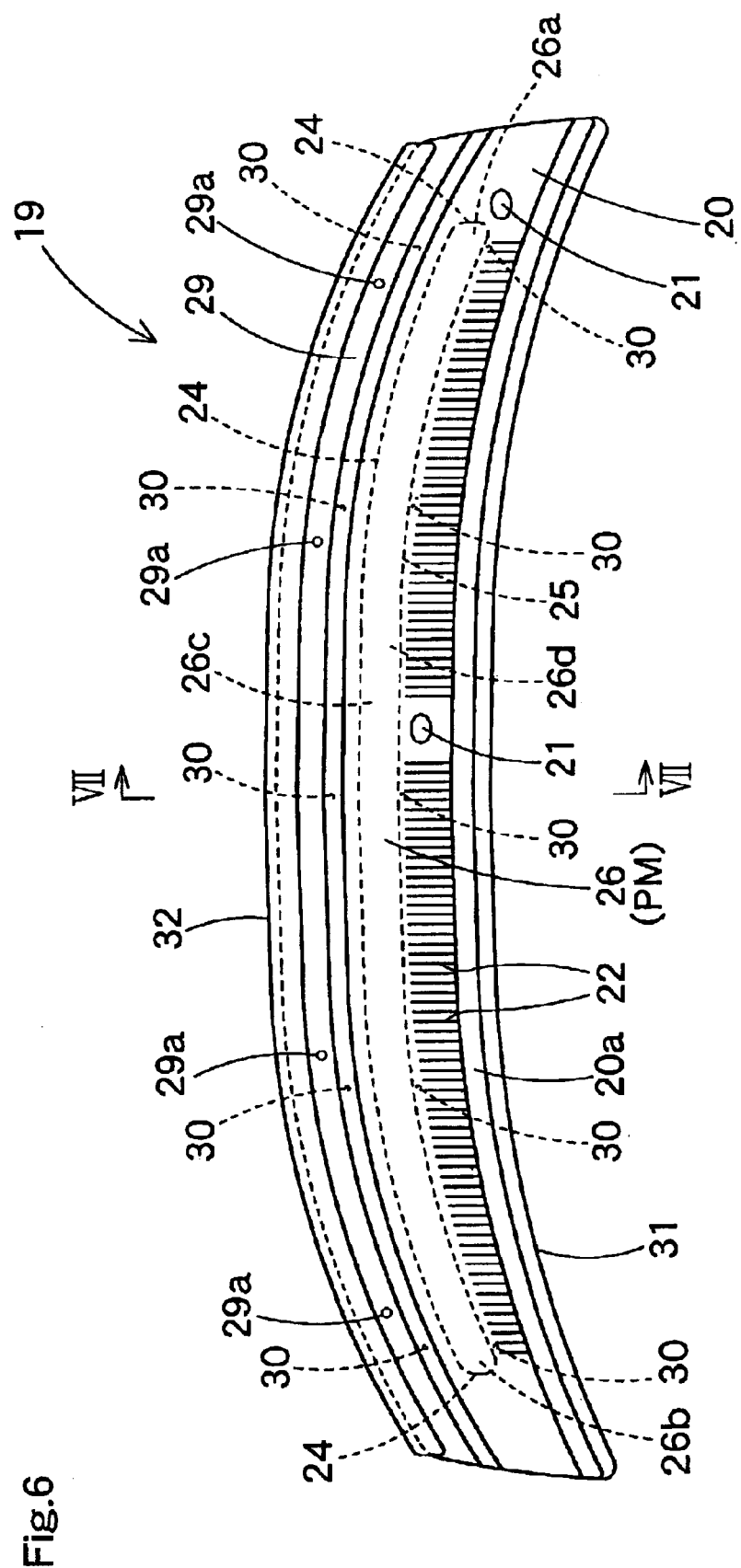
FIG. 6 is a top plan view of the main body of a cowl louver acting as an airbag cover to be used in the pedestrian protecting device of the first embodiment.
Figure 7:
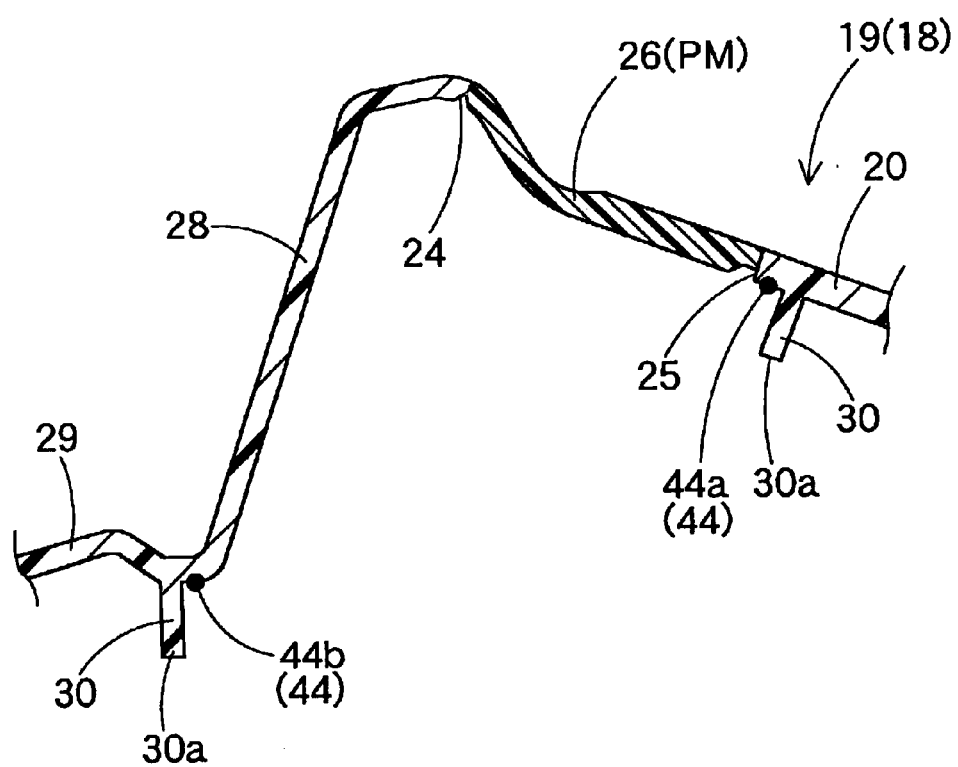
FIG. 7 is a partially enlarged end view of the main body along line VII—VII of FIG. 6.

The upper wall portion 20 is formed into a crescent shape in a downward view, as shown in FIG. 6. In the rear edge 20a of the upper wall portion 20, there is integrally arranged a weather strip 31 in which is fitted the lower end 5a of the front windshield 5. In the rear side of the upper wall portion 20, there are formed a plurality of insertion holes 22 for passing the rainwater or air to the side of the cowl panel 13. In the upper wall portion 20, also, there are formed two through holes 21 for passing wipers 11. On the front side of the upper wall portion 20, moreover, there is arranged a door portion 26 for covering the airbag 56 when folded and housed. This door portion 26 is pushed and opened by the airbag 56 when it expands.

Figure 2:
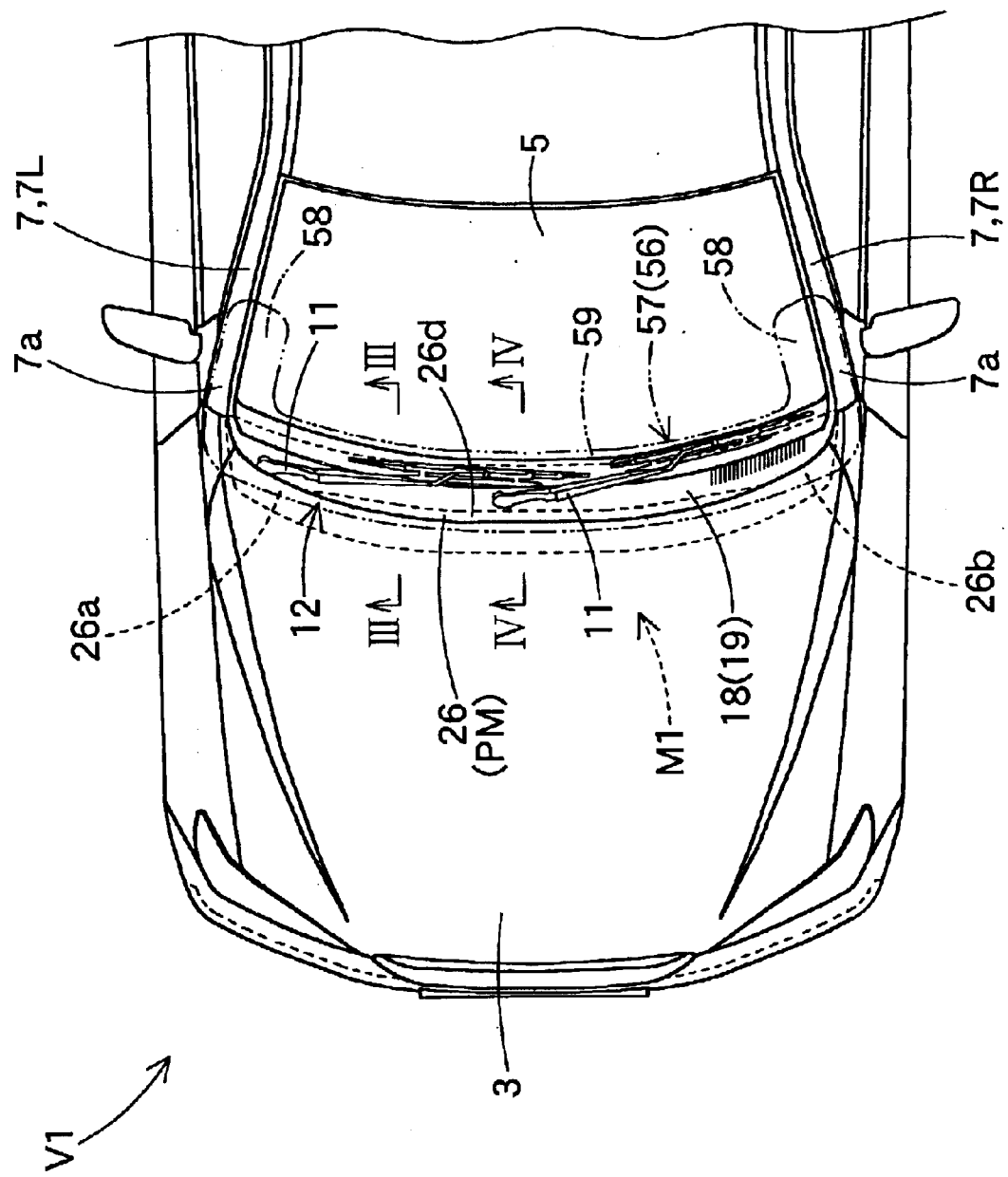
FIG. 2 is a top plan view of the vehicle having the pedestrian protecting device of the first embodiment mounted thereon.

The door portion 26 is made of such a thermoplastic elastomer, e.g., a thermoplastic elastomer of olefins (in the embodiment) or a thermoplastic elastomer of styrenes as can be fused by the heat at the molding time with the polypropylene from which is made the main body 19. In the case of the embodiment, the door portion 26 is made integral with the main body 19. In the embodiment, moreover, making the door portion 26 with the thermoplastic elastomer of olefins is used to act as expansion promoting means PM for opening the door portion 26 smoothly. Further, this door portion 26 is arranged at a position above the housing recess 43. The door portion 26 is formed into a generally crescent shape so that each transversely central portions of the front and rear edges 26c and 26d protrudes toward the vehicular front side. Moreover, the door portion 26 is provided with an opening hinge portion 25 at the rear edge 26d so that the door portion 26 may be opened toward the vehicular rear side. More specifically, the hinge portion 25 is curved along the main body 19 and the door portion 26 so that it protrudes at the transversely central portion toward the vehicular front side. At the U-shaped portion of the peripheral edge of the door portion 26 excepting the edge of the hinge portion 25, there is formed a thinned break-away portion 24 which can be broken when pushed by the airbag 56. The hinge portion 25 is an integral hinge. In the case of the embodiment, moreover, left and right ends 26a and 26b of the door portion 26 are arranged at positions of the vehicle center side but not quite as far as the lower ends 7a of left and right front pillars 7L and 7R (FIGS. 2 and 6).

Here, the door portion 26 is arranged when it is completely opened to cover the front side of the wipers 11 in their initial position, arranged generally transversely under the front windshield 5 (double-dotted lines in FIGS. 3 and 4).

The front vertical wall portion 28 is constructed by bending the front side of the main body 19 to the lower side. This front vertical wall portion 28 forms the wall portion on the front side of the housing recess 43. The hood panel 3 is provided with a vertical rear wall portion 3d near the side of the rear edge 3a, arranged in the vertical direction. As shown in FIGS. 3 and 4, moreover, the front vertical wall portion 28 is so arranged in the vertical direction as to approach and abut the rear vertical wall portion 3d of the hood panel 3 from the rear. On the lower portion of the front vertical wall portion 28, moreover, there is arranged a flange portion 29, which is bent to the front. On the flange portion 29, there is assembled a weather strip 32 for sealing the lower face 3b of the hood panel 3 near the rear end 3a. This weather strip 32 is so arranged as to be forced to contact with the hood panel 3 on the side of the rear end 3a substantially all along the transverse direction. In the flange portion 29, on the other hand, there are formed a plurality of (four in the embodiment) insertion holes 29a. Into each insertion hole 29a is inserted a bolt 68 for mounting and fixing the later-described airbag 56 on the cowl panel 13 together with the cowl louver 18.

On the flange portion 29 or the portion forming the peripheral edge of the housing recess 43 and on the portion near the hinge portion 25 of the upper wall portion 20, on the other hand, there are arranged a plurality of fixing protrusions 30, which protrude downward. These fixing protrusions 30 connect and fix the main body 19 and the lower side member 35. The individual fixing protrusions 30 are made integral with the main body 19. In the case of the embodiment, the individual fixing protrusions 30 connect the main body 19 and the lower side member 35 to each other near the two longitudinal edges of the housing recess 43, as described in the following. First of all, the individual fixing protrusions 30 are inserted into hole portions 37a and 40a, which are formed in the later-described flange portions 37 and 40 of the lower side member 35. After this, the individual fixing protrusions 30 are melted and fixed and thermally caulked to enlarge their leading ends 30a radially so that the main body 19 and the lower side member 35 can be connected (FIG. 4).

Figure 8:
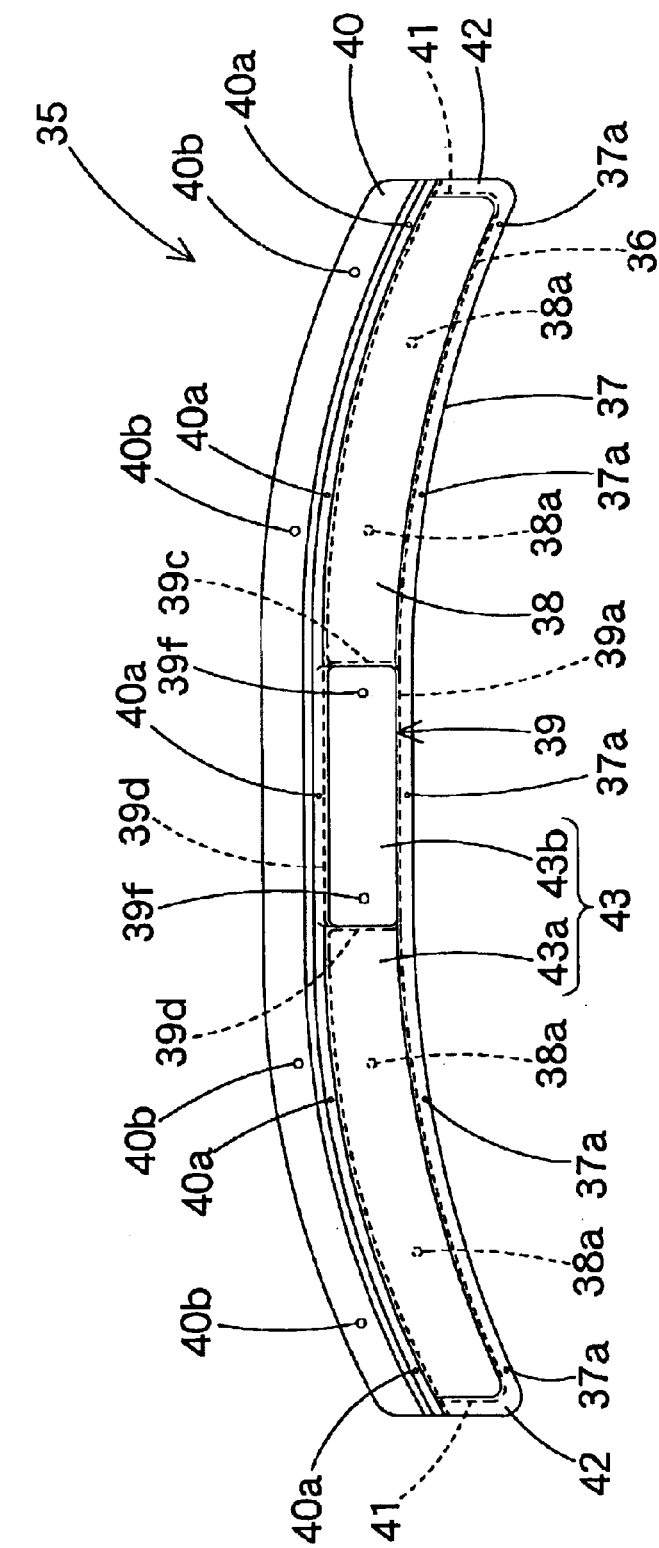
FIG. 8 is a top plan view of the lower side member of the cowl louver acting as a housing recess to be used in the pedestrian protecting device of the first embodiment.
Figure 9:
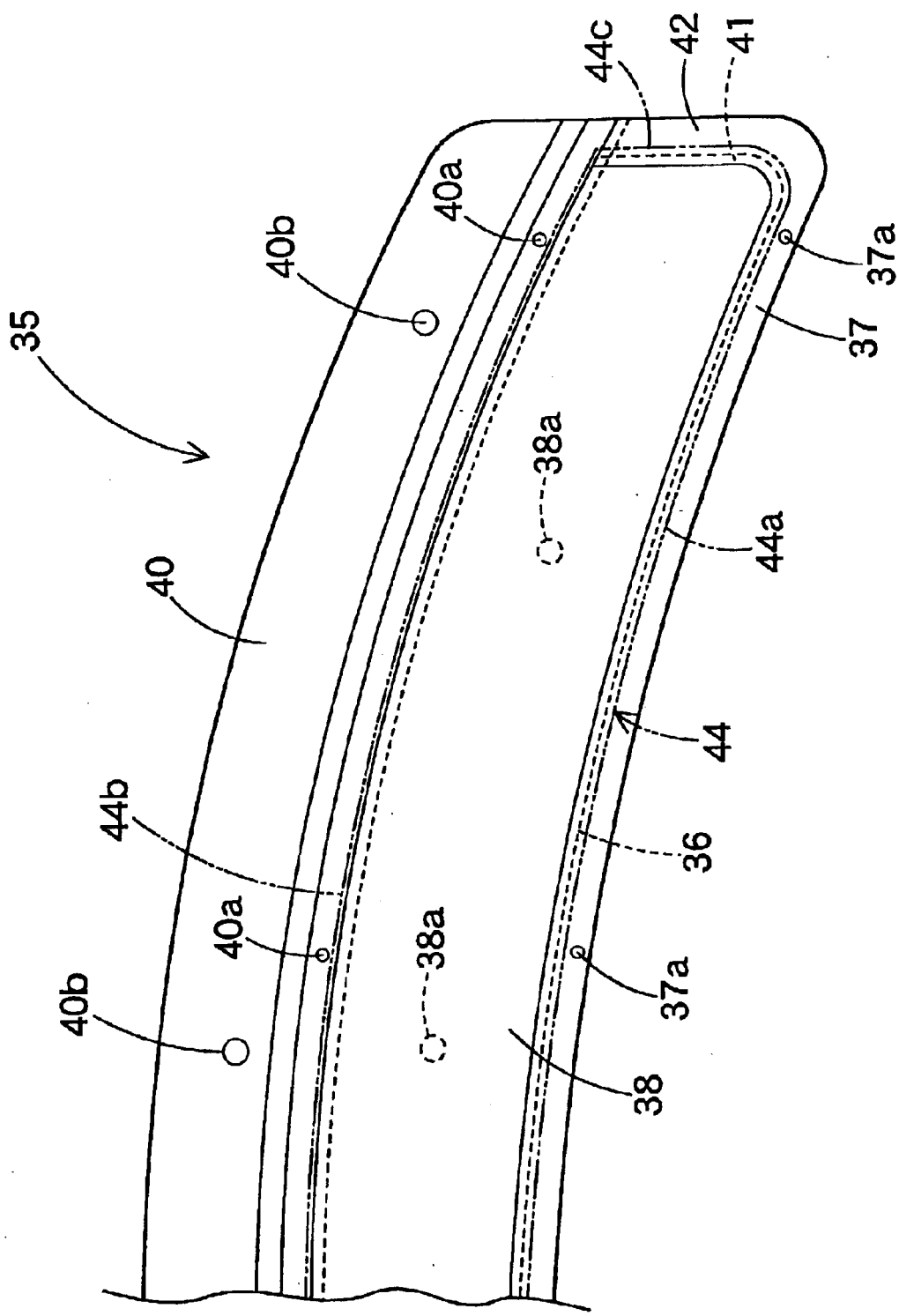
FIG. 9 is a partially enlarged top plan view of the lower side member.

The lower side member 35 is made of polypropylene to have a generally inverted L-shape in its longitudinal section, as shown in FIGS. 3, 4 and 8. The lower side member 35 is provided with a vertical wall portion 36 and a bottom wall portion 38. The vertical wall portion 36 is formed to extend downward from the vicinity of the lower end of the hinge portion 25. The bottom wall portion 38 is arranged to extend forward generally in the horizontal direction from the lower end of the vertical wall portion 36 to the vicinity of the lower end of the front vertical wall portion 28 of the main body 19. On the two transverse end sides of the lower side member 35, on the other hand, there are arranged the side wall portions 41 and 41 closing the two transverse sides of the housing recess 43. These side wall portions 41 and 41 are arranged at positions near the two left and right ends 26a and 26b of the door portion 26, respectively. On the upper edges of the individual side wall portions 41, further, there are formed flange portions 42. Each of these flange portions 42 is bent to the left or right side, whichever is the side away from the vehicular transverse center. Moreover, the portion which is defined by the door portion 26 and the front vertical wall portion 28 of the main body 19 and by the vertical wall portion 36, the bottom wall portion 38 and the side wall portions 41 and 41 of the lower side member 35, provides the housing recess 43 for housing the airbag 56 and the inflator 46.

Figure 5:
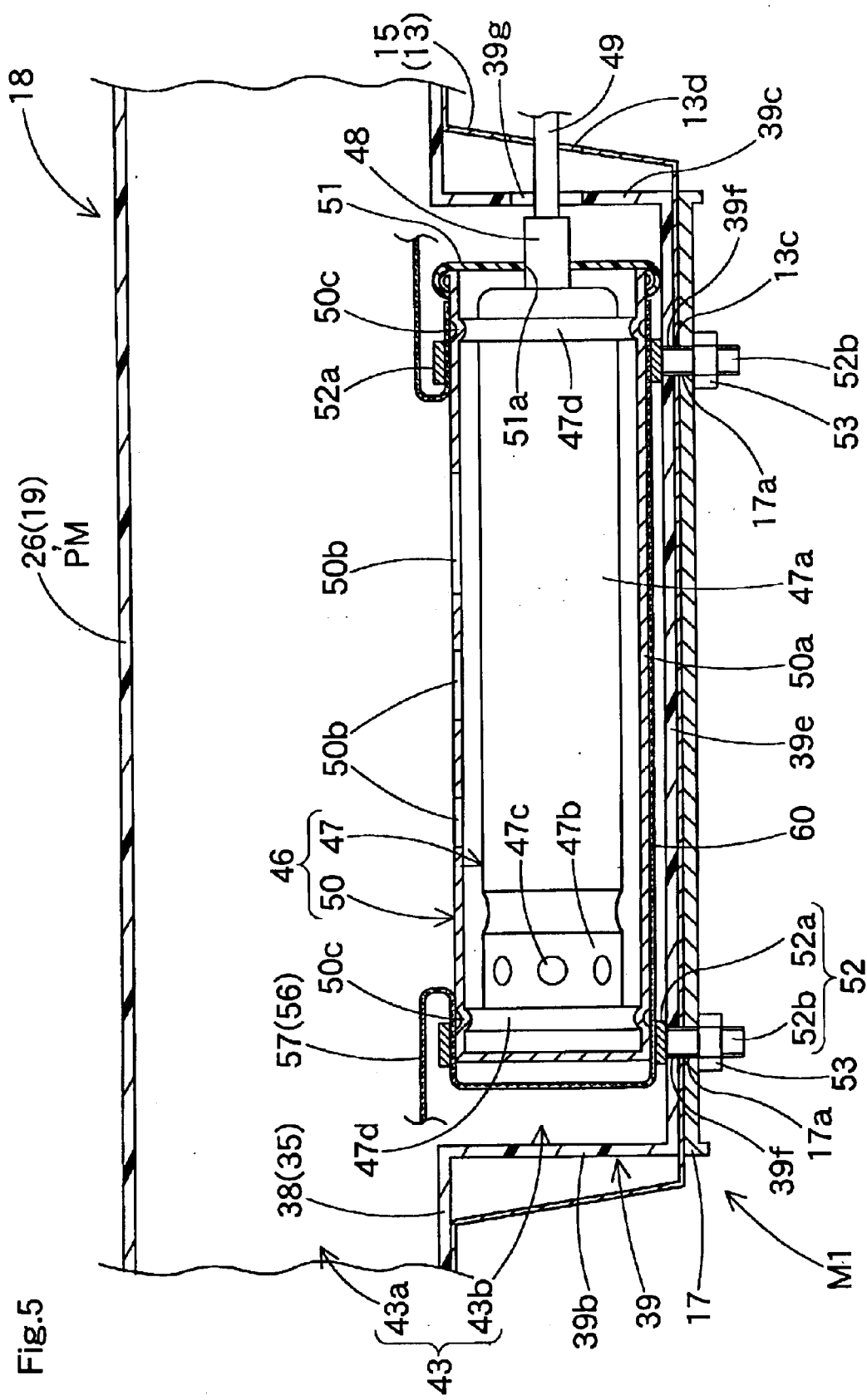
FIG. 5 is a schematic longitudinal section along line V—V of FIG. 4 showing the pedestrian protecting device of the first embodiment in the vehicular transverse direction.

The portion of the bottom wall portion 38 near the transverse center is recessed downward into a generally rectangular-parallelepiped shape, as shown in FIG. 5. This recessed portion 39 is defined by a rear wall portion 39a, left and right side wall portions 39b and 39c, a front wall portion 39d and a bottom wall portion 39e. The rear wall portion 39a is formed continuously with the vertical wall portion 36. The left and right side wall portions 39b and 39c are arranged to intersect the bottom wall portion 39 generally at a right angle. The front wall portion 39d is arranged to intersect the later-described flange portion 40 generally at a right angle. The bottom wall portion 39e is arranged to close the opening defined by the lower edges of the front, rear, left and right side wall portions 39a, 39b, 39c and 39d. In the embodiment, moreover, the recessed portion 39 provides an inflator housing portion 43b for housing the inflator 46. On the upper side of the inflator housing portion 43b, moreover, the portion, as defined by the door portion 26, the front vertical wall portion 28, the vertical wall portion 36, the bottom wall portion 38 and the side wall portions 41 and 41, provides an airbag housing portion 43a for housing the folded airbag 56.

On the lower side of the bottom wall portion 38, further, the panel member 15 comprising the cowl panel 13 is arranged to abut against the bottom wall portion 38. This panel member 15 is formed into a recessed shape at one portion so as to abut against the lower side of the recessed portion 39 even at the portion where the inflator housing portion 43b is arranged. At the bottom wall portion 38, moreover, there are arranged a plurality of (four in the embodiment) protrusions 38a, which are protruded downward (FIGS. 3 and 8). These protrusions 38a are formed to position the bottom wall portion 38 with respect to the panel member 15. Specifically, each protrusion 38a is inserted into an insertion hole 13e formed in the cowl panel 13, as shown in FIG. 3. At a predetermined position of the bottom wall portion 39e in the recessed portion 39, on the other hand, there is formed an insertion hole 39f for inserting the later-described bolt 52b of the inflator 46, as shown in FIG. 5. At the right side wall portion 39c in the recessed portion 39, moreover, there is formed an insertion hole 39g for inserting the later-described connector 48 and lead wire 49 of the inflator 46.

On the upper edge of the vertical wall portion 36, there is arranged the flange portion 37, which is bent to abut against the lower side of the upper wall portion 20 in the main body 19. This flange portion 37 protrudes toward the vehicular rear side. In this flange portion 37, there are formed the hole portions 37a, into which can be inserted the fixing protrusions 30 arranged on the upper wall portion 20 of the main body 19, as shown in FIGS. 4 and 8.

On the front edge of the bottom wall portion 38, there is formed the flange portion 40, which is so bent and arranged as to abut against the flange portion 29 in the main body 19 (FIG. 3). Seen in a different cross section, flange portion 40 is formed at the upper edge of the front wall portion 39d of the recessed portion 39 (FIG. 4). In this flange portion 40, as shown in FIGS. 4 and 8, there are formed the hole portions 40a, which can insert the fixing protrusions 30 arranged on the flange portion 29. In the flange portion 40, moreover, there are formed insertion holes 40b, which communicate with the insertion holes 29a formed in the flange portion 29. Into the individual insertion holes 40b are inserted the mounting bolts 68 for mounting and fixing on the cowl panel 13 the later-described mounting members 64 of the airbag 56 together with the cowl louver 18.

Between the main body 19 and the lower side member 35, on the other hand, there is arranged a seal member 44 for sealing the peripheral edge of the housing recess 43 entirely (as shown in FIGS. 3, 4, 7 and 9). This seal member 44 is arranged on the side of the main body 19. The seal member 44 is molded integrally and simultaneously with the door portion 26, and is made from the same material as that of the door portion 26 and the weather strip 31. The seal member 44 is provided with a rear edge seal portion 44a, a front edge seal portion 44b and left and right edge seal members 44c and 44d. In other words, the seal member 44 seals the peripheral edge of the housing recess 43 entirely. The rear edge seal portion 44a is arranged at a position near the hinge portion 25 of the upper wall portion 20. The front edge seal portion 44b is arranged in the flange portion 29. The left and right edge seal portions are arranged at the peripheral edge of the door portion 26 abutting against the flange portions 42 and 42 of the lower side member 35 (the double-dotted line of FIG. 9). Moreover, the front and rear seal portions 44a and 44b are arranged closer to the housing recess 43 than the fixing protrusions 30 (or the hole portions 37a and 40a).

The inflator 46 is formed into the cylinder type, in which its axis is arranged in the transverse direction, as shown in FIG. 5. The inflator 46 is provided with a generally column-shaped inflator body 47 and a diffuser 50. The inflator body 47 is provided with a column-shaped general portion 47a and a head portion 47b arranged on one end of the general portion 47a. In the outer circumference of the head portion 47b, there are arranged a plurality of gas discharge ports 47c. In the inflator body 47, on the leading end side of the head portion 47b and also near the base of the general portion 47a, moreover, there are arranged flange portions 47d and 47d, which protrude outward. These flange portions 47d clamp the later-described clamping portions 50c of the diffuser 50 to fix the diffuser 50 on the inflator body 47. To the base of the general portion 47a, moreover, there is connected the connector 48, with which the lead wire 49 for inputting an activation signal is connected.

The diffuser 50 is formed into a generally cylindrical shape surrounding the inflator body 47 and closed off at the side of the head portion 47b. The diffuser 50 is opened at its end side apart from the head portion 47b so as to allow insertion of the general portion 47a of the inflator body 47. In the circumferential wall portion 50a of the diffuser 50, moreover, there are formed a plurality of gas outlet ports 50b, which can let out the inflating gas discharged from the gas discharge ports 47c of the inflator body 47. The individual gas outlet ports 50b are formed on the upper side of the circumferential wall portion 50a in the mounted state. Near the two ends of the circumferential wall portion 50a of the diffuser 50, moreover, there are formed the clamping portions 50c for holding the inflator body 47. Each clamping portion 50c is formed be bending the circumferential wall portion 50a all along the circumference of the circumferential wall portion 50a. This clamping portion 50c is constructed by deforming the circumferential wall portion 50a plastically to abut against the outer circumference of the flange portion 47d. And, the inflator body 47 is fixed on the diffuser 50 in the following manners. First of all, the inflator body 47 is inserted from the opening into the diffuser 50 with its head portion 47b first. After this, the individual clamping portions 50c are so plastically deformed as to abut against the outer circumference of the flange portions 47d of the inflator body 47. Thus, the inflator body 47 can be fixed in the diffuser 50.

At the end portion of the diffuser 50 on the side of the connector 48, on the other hand, there is arranged a seal cap 51, which is made of a synthetic resin or rubber, for covering the opening. This seal cap 51 prevents rainwater or the like from flowing into the diffuser 50. The seal cap 51 is formed generally into a disc shape and is provided near its center with a hole portion 51a for insertion of the connector 48.

Further, the inflator 46 is fixed on the side of the bottom wall portion 39e of the housing recess 39 of the lower side member 35 by means of mounting brackets 52. Each of these mounting brackets 52 is provided with a holding ring portion 52a and a bolt 52b protruding from the holding ring portion 52a. This holding ring portion 52a can clamp the outer circumference of the inflator 46, on which the later-described inlet portion 60 of the airbag 56 is mounted. In the embodiment, the mounting brackets 52 are arranged at two portions, on the leading end side and the base side of the inflator 46. Further, the inflator 46 is mounted and fixed on the cowl panel 13 in the following manner. First of all, the retaining ring portions 52a of the mounting brackets 52 are mounted on the inflator 46, on which the inlet portion 60 of the airbag 56 is mounted. Then, the bolts 52b of the mounting brackets 52 are inserted into the insertion holes 39f, 13c and 17a of the bottom wall portion 39e, the cowl panel 13 and the reinforcing panel 17 respectively so as to protrude from the reinforcing panel 17. After this, nuts 53 are fastened on the bolts 52b, and the inflator 46 can be mounted and fixed together with the airbag 56 on the cowl panel 13 through the bottom wall portion 39e. Here, the reinforcing panel 17 is arranged to strengthen the attachment of the inflator 46 on the bottom wall portion 38.

Figure 10:
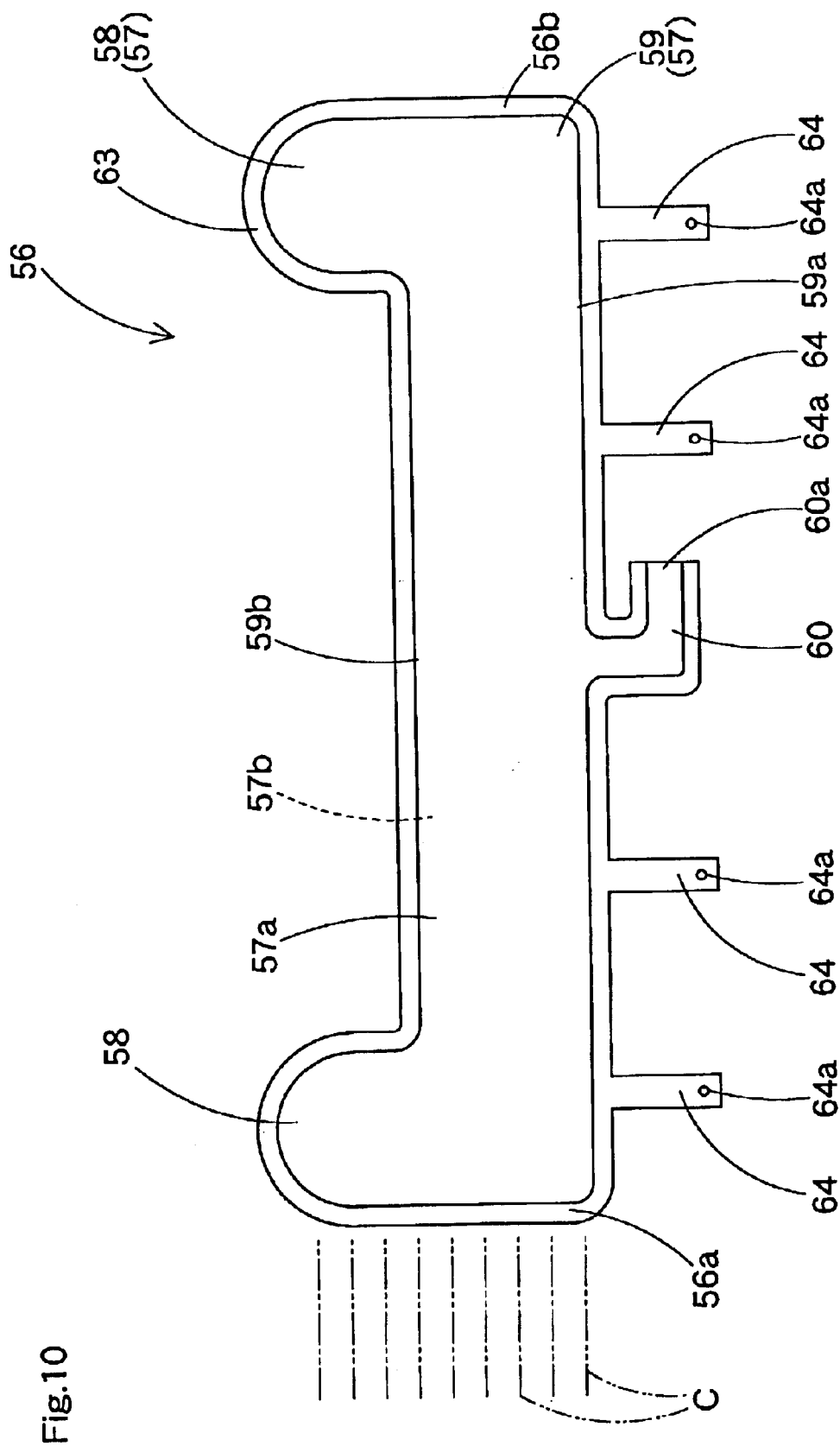
FIG. 10 is a top plan view showing the only the airbag to be used in the pedestrian protecting device of the first embodiment when inflated.

As shown in FIGS. 1, 2 and 10, the airbag 56 is provided with an inflating portion 57 to be inflated by admitting the inflating gas, and a peripheral edge portion 63 arranged in the periphery of the inflating portion 57 but admitting no inflating gas. The inflating portion 57 is inflated to separate a front side wall portion 57a and a back side wall portion 57b when it admits the inflating gas. Further, the airbag 56 is of the flat airbag type, which has identical plane shapes at the front side wall portion 57a and the back side wall portion 57b so that it can be expanded flat when the wall portions 57a and 57b are laid one on each other. In the case of the embodiment, the airbag 56 is manufactured by hollow-weaving polyester yarns, polyamide yarns or the like.

Here, the back side wall portion 57b is mostly arranged on the side of the vehicle V1 when the airbag 56 completes its expansion. The front side wall portion 57a is mostly arranged on the free space side removed from the side of the vehicle V1.

As shown in FIGS. 1, 2 and 10, moreover, the inflating portion 57 of the airbag 56 is formed to take a transversely widened, general U-shape as viewed from the front when it completes its expansion in the non-mounted state. Vertical inflating portions 58 and 58 arranged on the two transverse sides cover the front faces of the left and right front pillars 7L and 7R when the airbag 56 completes its expansion. A transverse inflating portion 59 connected with the lower end sides of the vertical inflating portions 58 and 58 extends generally in the transverse direction of the vehicle V1 when the airbag 56 completes its expansion. At the completion of the expansion of the airbag 56, moreover, the transverse inflating portion 59 covers over the cowl louver 18 from the upper face of the vicinity of the lower edge 5a of the front windshield 5 to the upper face 3c of the vicinity of the rear edge 3a of the hood panel 3.

On the front edge 59a of the transverse inflating portion 59 (or on the lower edge at the completion of inflation in the mounted state), moreover, there is arranged the inlet portion 60. This inlet portion 60 extends toward the front and then bends toward the right side of the vehicle. The inlet portion 60 has an opening 60a in its end portion into which is inserted the inflator 46. This inlet portion 60 allows the inflating gas from the inflator 46 into the inflating portion 57 of the airbag 56. The inlet portion 60 is mounted on and connected to the inflator 46 by means of the mounting brackets 52 and 52.

At portions of the peripheral edge portion 63 on the front edge 59a of the transverse inflating portion 59, there are formed four mounting members 64 which extend in a strip shape. In each mounting member 64, there is formed a mounting hole 64a. Each mounting member 64 is mounted and fixed together with the cowl louver 18 on the cowl panel 13 by inserting the bolt 68 for fixing the cowl louver 18 on the cowl panel 13, into the mounting hole 64a and by fastening a nut 69 (FIG. 3).

Here will be described how to mount the airbag device M1 for pedestrians on the vehicle V1. First of all, the airbag 56 is folded up. Then, the airbag 56 is expanded into a plane shape by laying the front side and back side wall portions 57a and 57b one on the other. After this, the airbag 56 is folded into a bellows shape, excepting the portions of the inlet portion 60 and the mounting members 64, with creases C having ridges and valleys parallel to the front edge 59a of the transverse inflating portion 59, as indicated by double-dotted lines in FIG. 10, as to approach the front edge 59a. Then, the two left and right ends 56a and 56b of the airbag 56 are folded back onto the bellows-folded side (the rear edge 59b side of the transverse inflating portion 59) so that it may be housed in the housing recess 43. Thus, the airbag 56 can be folded up. The airbag 56 is suitably wrapped, after being completely folded, with not-shown breakable wrapping material for preventing the airbag 56 from collapsing.

Then, the inflator 46 is inserted from the opening 60a into the inlet portion 60 of the airbag 56 which has been folded up. After this, the retaining ring portions 52a of the individual mounting brackets 52 are mounted on the inflator 46 mounted into the inlet portion 60, and thus the inflator 46 is connected to the inlet portion 60 of the airbag 56.

Next, the folded airbag 56 and the inflator 46 are housed in the lower side member 35. At this time, the bolts 52b of the inflator 46 are protruded from the insertion holes 39f of the bottom wall portion 39e in the housing recess 39. Then, the not-shown spring washers are arranged on the bolts 52b protruding from the insertion holes 39f. Then, the main body 19 assembled in advance with the weather strips 31 and 32 is arranged on the upper side of the lower side member 35. At this time, the individual fixing protrusions 30 protrude from the hole portions 37a and 40a formed in the lower side member 35. Then, the leading ends 30a of the fixing protrusions 30 protruding from the hole portions 37a and 40a are thermally caulked to connect the main body 19 and the lower side member 35 to each other near the two longitudinal edges of the housing recess 43. Thus, the cowl louver 18 is assembled with the airbag device M1. At the same time, the peripheral edge of the housing recess 43 is entirely sealed with the seal member 44 arranged at the main body 19.

Moreover, the assembly of the cowl louver 18 is joined to the cowl panel 13. At this time, the protrusions 38a formed in the bottom wall portion 38 of the lower side member 35 are inserted into the insertion holes 13e. Then, the bolts 52b protruding from the bottom wall portion 38 are inserted through the insertion holes 13c and 17a and protruded from the reinforcing panel 17. Further, the bolts 52b protruding from the reinforcing pane 117 are fastened with the nuts 53. Moreover, the flange portion 29 of the main body 19 is fixed together with the mounting members 64 of the airbag 56 on the cowl panel 13 by means of the bolts 68 and the nuts 69. At the same time, the connector 48 having the lead wire 49 connected therewith is connected to the body 47 of the inflator 46 through an insertion hole 13d of the cowl panel 13 and the insertion hole 39g of the recessed portion 39. As a result, the airbag device M1 can be mounted on the vehicle V1.

After the airbag device M1 is mounted on the vehicle V1, moreover, the arms of the wiper 11, the hood panel 3 and so on are mounted on the vehicle V1.

If the activation signal is inputted through the lead wire 49 to the body 47 of the inflator 46 after the pedestrian airbag device M1 is mounted on the vehicle V1, the inflating gas is discharged from the gas discharge ports 47c of the inflator 46. Then, the airbag 56 is inflated with the inflating gas let in from the inlet portion 60. Therefore, the door portion 26 of the cowl louver 18 is pushed by the airbag 56 to break the break-away portion 24 around the door portion 26. Then, the door portion 26 is opened on the hinge portion 25 toward the rear side of the vehicle V1 so that the airbag 56 is expanded outward.

When the airbag 56 of the pedestrian airbag device M1 of the first embodiment completes its expansion, the vertical inflating portions 58 and 58 cover the front faces of the front pillars 7L and 7R, as indicated by the double-dotted lines in FIGS. 1 and 2, and the transverse expansion portion 59 covers over the cowl louver 18 in front of the lower edge 5a of the front windshield 5.

In the airbag device M1 of the first embodiment, moreover, the expansion promoting means PM is arranged in the door portion 26 which is formed integrally with the cowl louver 18 made of the synthetic resin. Even though the door portion 26 is curved and elongated along the cowl louver 18 and even if the hinge portion 25 providing the center of rotation of the door portion 26 on the rear edge 26d of the door portion 26 is arranged along a curve, the door portion 26 can be smoothly opened by the expansion promoting means PM.

In the airbag device M1 of the first embodiment, moreover, the airbag 56 is folded and arranged between the hood panel 3 and the front windshield 5 of the vehicle V1 and below the cowl louver 18 arranged with a curvature along the windshield 5. Therefore, no consideration need be taken any interference of the airbag device M1 to the hood panel 3 at the opening/closing time of the hood panel 3, and there is no difficulty building the airbag device M1 into the vehicle V1. In the pedestrian airbag device M1 of the first embodiment, moreover, the door portion 26 for covering the airbag 56 when housed is constructed of the cowl louver 18 itself, a member of the original vehicle V1. Therefore, it is possible to reduce increase in number of parts composing the vehicle V1 and the number of steps for building the airbag device M1 into the vehicle V1.

In the airbag device M1 of the first embodiment, therefore, the door portion 26 for covering the housed airbag 56 can be smoothly opened to expand the airbag 56 promptly, and the ease of building the airbag device M1 into the vehicle V1 is improved.

In the airbag device M1 of the first embodiment, moreover, as the expansion promoting means PM for the door portion 26, the door portion 26 is made of a thermoplastic elastomer of olefins. Thus, the door portion 26 is pushed, when opened, by the airbag 56 so that it slightly extends and compresses at different locations. Thus, the door portion 26 is not partially broken even though the hinge portion 25 on the side of the rear edge 26d providing the center of rotation has curvature along the cowl louver 18. Therefore, the door portion 26 is smoothly opened by the push of the airbag 56 being expanded and inflated, so that it can expand and inflate the airbag 56 promptly.

In the airbag device M1 of the first embodiment, moreover, the cowl louver 18 made of the synthetic resin or the member constructing the vehicle V1 is constructed of two members, i.e., the main body 19 on the upper face side and the lower side member 35. This lower side member 35 forms the housing recess 43 for housing the airbag 56 and the inflator 46. At the position of the main body 19 above the housing recess 43, moreover, there is formed integrally with the main body 19 the door portion 26 which can be opened by the push of the housed airbag 56 when it expands. In the airbag device M1 of the first embodiment, more specifically, the housing portion 43 for housing the inflator 46 and the airbag 56 and the door portion 26 for covering the vehicular outer side of the airbag 56 comprise the cowl louver 18 itself, which is made of the synthetic resin or the member constructing the vehicle V1. In the airbag device M1 of the first embodiment, therefore, the number of parts composing the vehicle V1 can be made less than that of the pedestrian airbag device of the prior art requiring a case, door portion and so on. Moreover, it is possible to reduce the added weight to the vehicle V1.

Moreover, the airbag device M1 of the first embodiment can be mounted on the vehicle V1 at the same time as the cowl louver 18, because the airbag device M1 assembled therewith. Therefore, it is possible to reduce the number of steps of assembling the airbag device M1 into the vehicle V1.

Therefore, the pedestrian airbag device M1 of the first embodiment can have a reduced number of necessary steps for assembly into the vehicle V1, a smaller increase in the number of parts of the vehicle V1 and a smaller increase in the weight.

Moreover, the pedestrian airbag device M1 of the first embodiment is constructed by sealing the main body 19 and the lower side member 35 to each other near their front and rear edges by the seal member 44. Therefore, the housing recess 43 for housing the airbag 56 and the inflator 46 can be kept away from rainwater and the airbag 56 and the inflator 46 can be housed durably and stably.

In the airbag device M1 of the first embodiment, moreover, the seal member 44 is made integral with the main body 19. Therefore, the number of parts can be further reduced while making it unnecessary to arrange the seal member separately. In the airbag device M1 of the first embodiment, moreover, the seal member 44 is made of the same material as that of the door portion 26 and is formed integrally with the main body 19 together with the door portion 26. As compared with the case in which the seal member 44 is formed integrally with the lower side member 35, therefore, the mold for the lower side member 35 can be simplified. As a result, it is possible to reduce the cost for manufacturing the cowl louver 18. If this point is not considered important, it is natural that the seal member 44 may be formed integrally with the lower side member 35. Moreover, the construction may also be modified such that the seal member is separately arranged.

In the airbag device M1 of the first embodiment, moreover, the rear vertical wall portion 3d is arranged along the vertical direction on the rear edge 3a of the hood panel 3. Further, the main body 19 is provided with a front vertical wall portion 28 by bending downward its front side, thus forming the front wall of the housing recess 43. In other words, the front vertical wall portion 28 is so arranged as to approach and be adjacent to the rear vertical wall portion 3d of the hood panel 3 from the rear. At the time of expanding the airbag 56, therefore, the front vertical wall portion 28 is supported, even if there is pressure outward to the front, by the rear vertical wall portion 3d of the hood panel 3. Thus, the airbag 56 can be prevented from being expanded and inflated to invade to the vehicular front side below the hood panel 3. As a result, the airbag 56 can smoothly expand upward from the vehicle.

Figure 11:
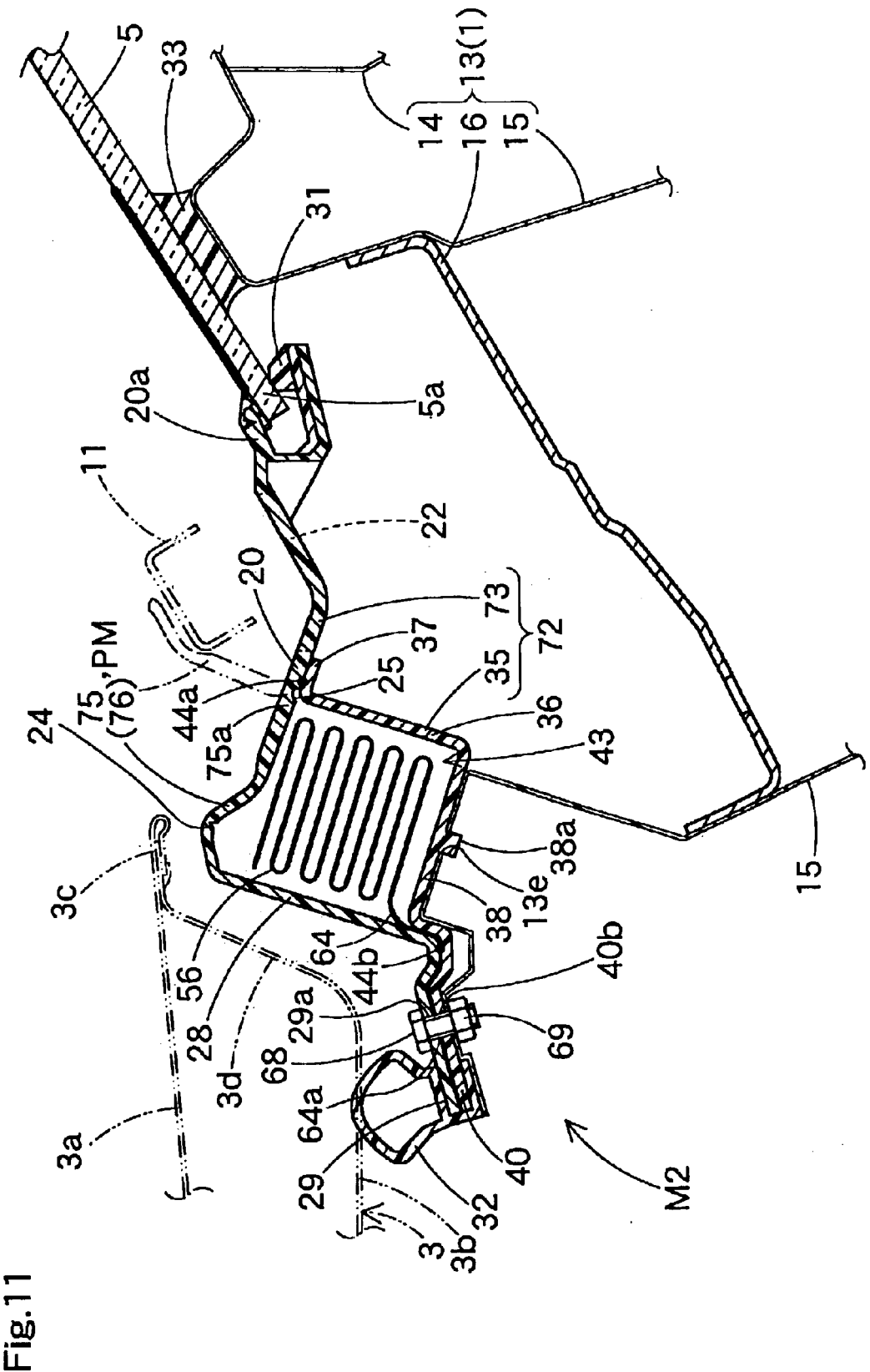
FIG. 11 is a schematic vertical section showing a pedestrian protecting device according to a second embodiment in the vehicular longitudinal direction.

Here will be described the airbag device M2 for pedestrians according to a second embodiment. This airbag device M2 has a construction similar to that of the aforementioned airbag device M1 excepting the main body 73 of the cowl louver 72, as shown in FIG. 11. Therefore, the description of the common members will be omitted, designating them by the same reference numerals.

Figure 12:
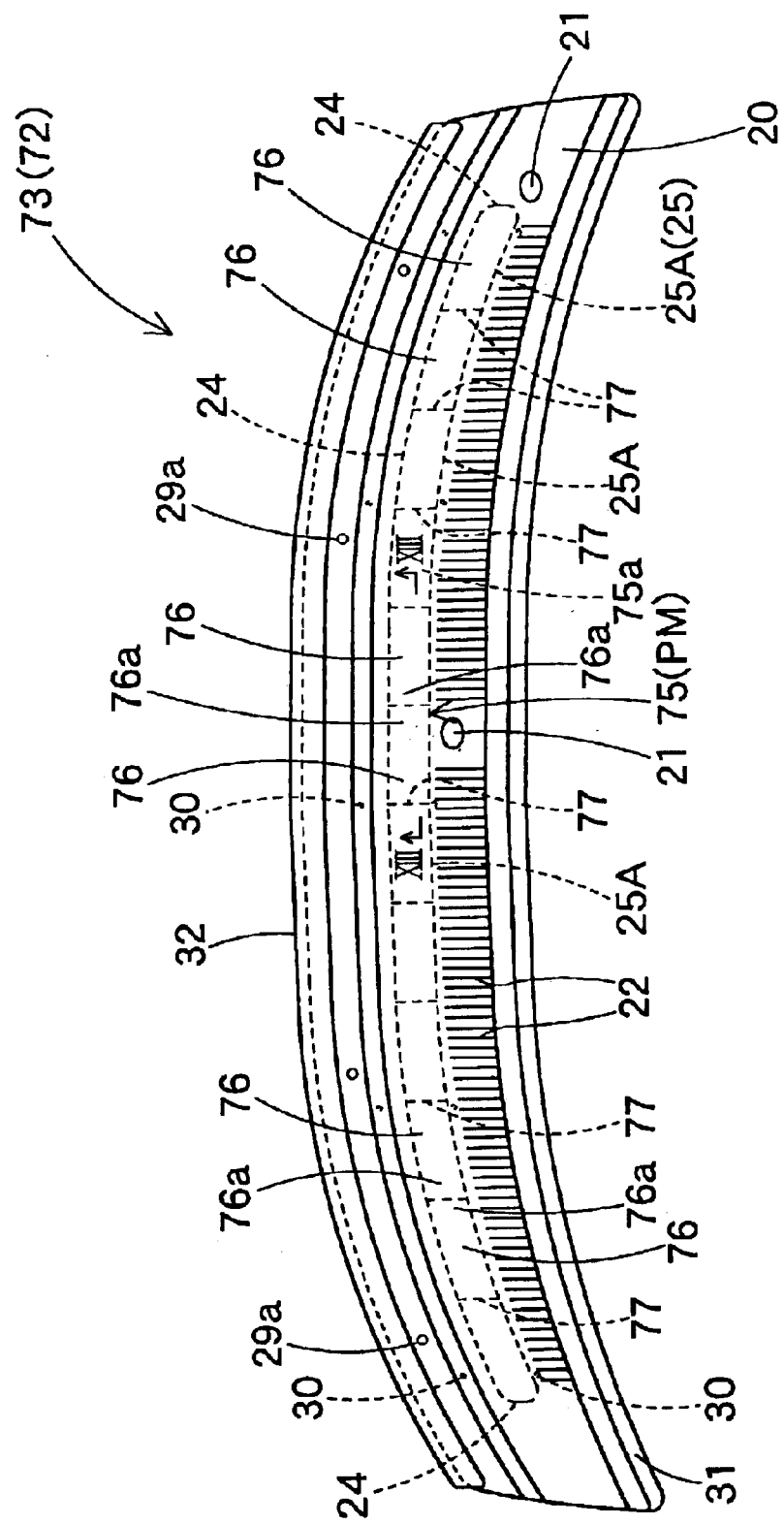
FIG. 12 is a top plan view of the main body of a cowl louver to be used in the second embodiment.

Like the main body 19 of the aforementioned airbag device M1, the main body 73 is provided with the upper wall portion 20 and the front vertical wall portion 28, as shown in FIGS. 11 and 12. At a position of the upper wall portion 20 above the housing recess 43, moreover, there is arranged a door portion 75, which is made of polypropylene integrally with the main body 73.

Figure 13:
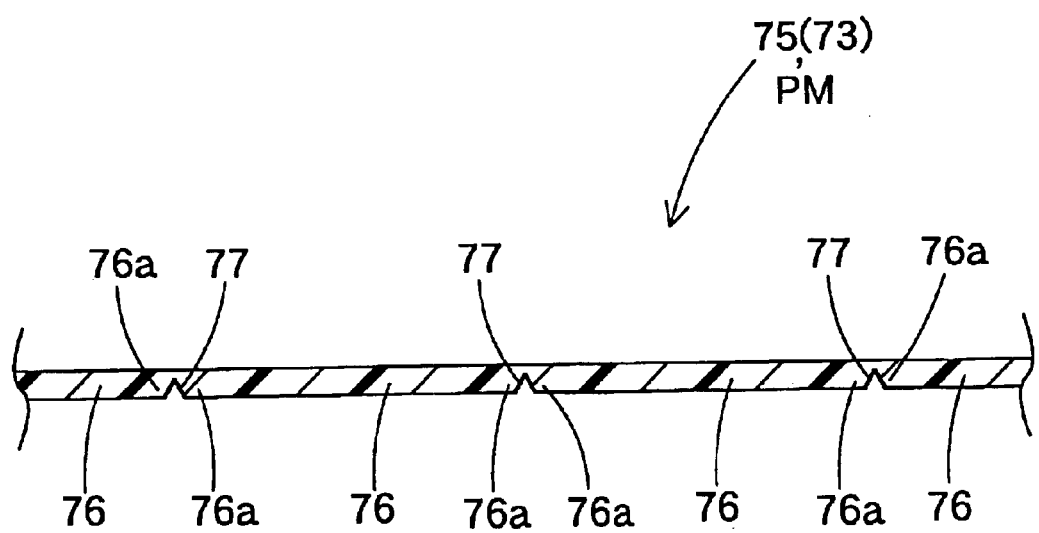
FIG. 13 is a partially enlarged end view of the main body at the portion XIII—XIII of FIG. 12.

The door portion 75 is split into a plurality of (twelve in the embodiment) split doors 76 in the transverse direction of the vehicle, as shown in FIGS. 12 and 13. The individual split doors 76 are formed by dividing the door portion 75 at a plurality of (or eleven in the embodiment) break-away portions 77 in the vehicular longitudinal direction. Further, the door portion 75 is provided at its rear edge 75a with a hinge portion 25 for opening the door portion 75, as in the door portion 26 in the aforementioned airbag device M1. Moreover, the door portion 75 is provided with a break-away portion 24 at its three sides other than the side of the hinge portion 25 of the door portion 75. In short, the split doors 76 are constructed to be individually opened to the vehicular rear side, by providing the hinge portion 25 on the rear edge side and by arranging the break-away portions 24 and 77 at its three sides other than the side of the hinge portion 25. In the airbag device M2 of the second embodiment, moreover, the construction, in which the door portion 75 is formed of a plurality of (twelve in the embodiment) split doors 76 divided so as to be lined up in the transverse direction, is used as the expansion promoting means PM for opening the door portion 75 smoothly.

In case the airbag device M2 is thus constructed, the split doors 76 divided the door portion 75 into a plurality in the transverse direction are opened by the push of the airbag 56 when this airbag 56 is expanded. Even if the hinge portion 25 acting as the rotation center for the entirety of the split door 76 at the opening time of the door portion 75 is arranged with a curvature along the cowl louver 72, a portion 25A of the hinge portion serving as the rotation center of the individual split doors 76 is approximately a straight shape, as shown in FIG. 12. This is because the door portion 75 is divided into the plural split doors 76 arranged in the transverse direction of the vehicle V1. Even if the door portion 75 itself is arranged with a curvature along the cowl louver 72, moreover, it is opened with the transverse end portions 76a and 76a of the adjoining split doors 76 and 76 overlapping and separating from each other, so that the forces that extend and contract the door portion 75 are scarcely act at all on the individual split doors 76. Even if the door portion 75 is made of a hard material, therefore, it is not partially broken but only pushed open by the airbag 56 when expanding, so that it is smoothly opened. As a result, the door portion 75 can be smoothly opened as a whole to allow the airbag 56 to expand smoothly.

In the airbag device M2 of the embodiment, too, the airbag 56 is folded and arranged between the hood panel 3 and the front windshield 5 of the vehicle V1 and below the cowl louver 72 curving along the front windshield 5. Moreover, the door portion 75 for covering the housed airbag 56 is constructed of the cowl louver 72 itself, one of the members composing the original vehicle V1. Therefore, it is possible to reduce the number of working steps for building the airbag device M2 into the vehicle V1 like the aforementioned airbag device M1.

In the airbag device M2 thus constructed, therefore, the door portion 75 for covering the housed airbag 56 can be smoothly opened to allow the airbag 56 to expand promptly, and the ease of assembling the airbag device M2 into the vehicle V1 is improved.

Moreover, the airbag device M2 of the aforementioned construction is similar in construction to the foregoing airbag device M1 excepting the main body 73 of the cowl louver 72. In the airbag device M2, too, the number of steps needed for building the airbag device M2 into the vehicle V1 can be reduced while suppressing the increase in the number of parts of the vehicle V1, and the increase in weight can also be reduced.

Here in the airbag device M2 of the embodiment thus far described, the door portion 75 is made of polypropylene. Like the door portion 26 in the airbag device M1, however, the door portion provided with the split doors may also be made of a thermoplastic elastomer.

Further, the aforementioned airbag devices M1 and M2 are constructed such that the door portions 26 and 75 are opened toward the rear by arranging the hinge portion 25 on the rear edges of the door portions 26 and 75. In another construction, the hinge portion 25 may be arranged on the front edges of the door portions 26 and 75. In other words, the door portions 26 and 75 may also be opened toward the vehicle front side. Moreover, two door portions may be arranged adjacent to each other in the longitudinal direction, and hinge portions may be individually arranged at positions on the front edge side and the rear edge side in the housing recess so that the two door portions may be opened on their hinge portions.

In the case using the door portion constructed to have the split doors divided so as to be lined up in the transverse direction as in the aforementioned airbag device M2, moreover, the construction may also be modified such that the hinge portions are arranged alternately on the front edge and the rear edge of the individual split doors so that the individual split doors are opened alternately toward the vehicular front side and toward the rear side.

Figure 14:
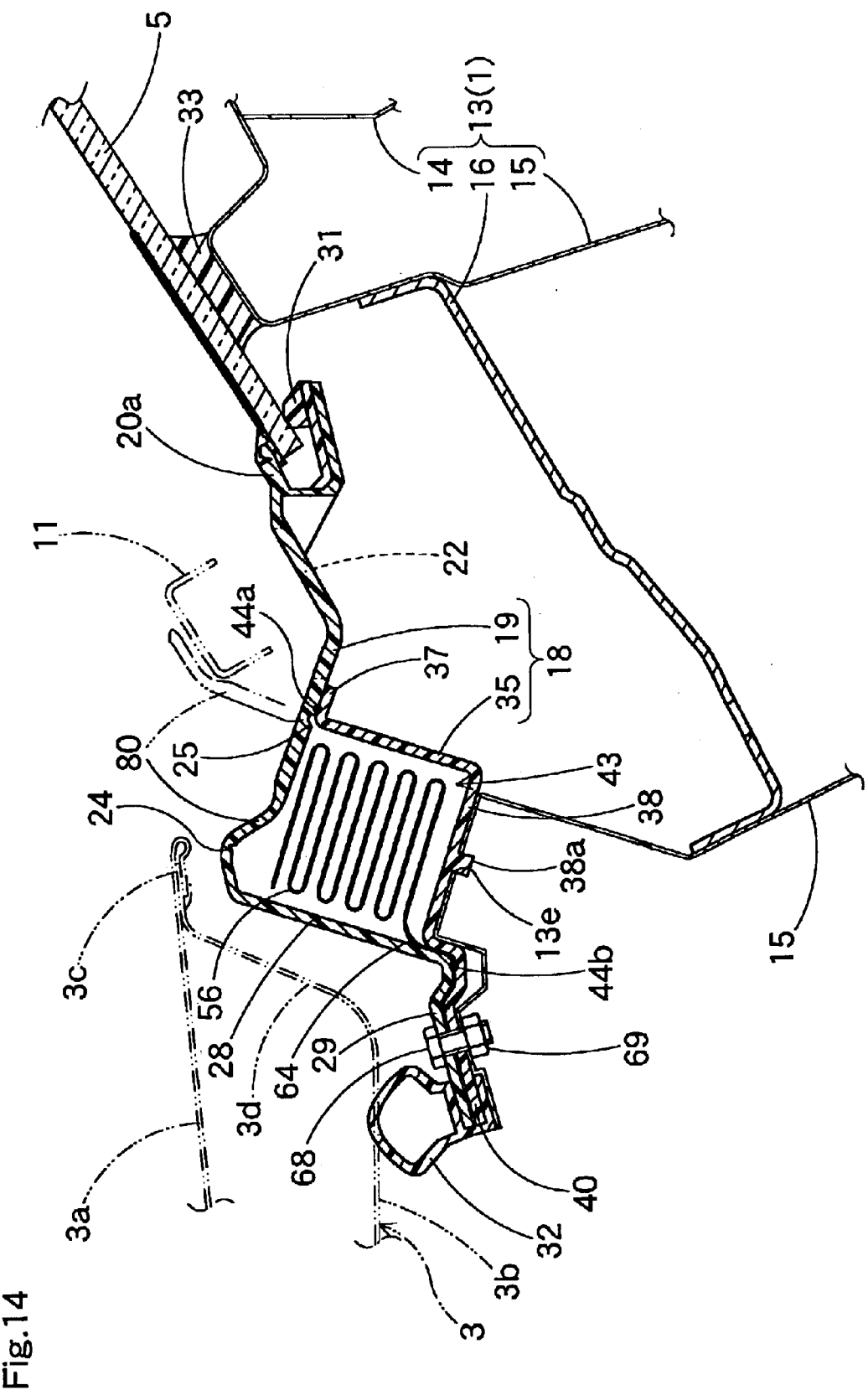
FIG. 14 is a schematic vertical section showing a modification of the first embodiment in the vehicular longitudinal direction.

Here in the airbag device M1 of the first embodiment, the door portion 26 is made of a thermoplastic elastomer. In the case of the construction capable achieving the second object exclusively, however, a door portion 80 to be used may be made of polypropylene the same as the main body 19, as shown in FIG. 14, if it can be smoothly opened.

An airbag device M3 which is the pedestrian protecting device of a third embodiment capable of achieving the second object of the invention will next be described. The vehicle V1 mounting the airbag device M3 of the third embodiment has a construction similar to that of the vehicle V1 mounting the foregoing airbag device M1, excepting a cowl louver 121. Therefore, the description of the common members will be omitted, designating them by the same reference numerals.

The airbag device M3 is arranged at a portion of the cowl 12 between the hood panel 3 and the front windshield 5 in the vehicle V1 and is provided with a folded airbag 160 and the inflator 46 for feeding the airbag 160 with the inflating gas. Here, the inflator 46 has a construction similar to that of the inflator 46 used in the foregoing airbag device M1. Therefore, the description of the common members will be omitted, designating them by the same reference numerals.

In the third embodiment, too, the airbag cover having a door portion 128 for covering the folded airbag 160 and a housing portion 130 acting as the case for housing the airbag 160 and the inflator 46 comprises the cowl louver 121, arranged above the cowl panel 13.

The cowl louver 121 is made of polypropylene. This cowl louver 121 is so arranged, like the cowl louver 18 in the aforementioned airbag device M1, in the crescent space between the rear edge 3a of the hood panel 3 and the front windshield 5 as to extend to the vicinity of the two transverse edges of the vehicle V1. The preferable polypropylene (PP) for making the cowl louver 121 has high-impact properties. Specific examples of this polypropylene are homo-PP, a copolymer of PP and a small quantity of olefin monomer, PP containing a fibrous filler for affording the high-impact properties, or a composite containing a soft component such as ethylene-propylene rubber (EPR).

The cowl louver 121 is provided with an upper wall portion 122 arranged on the upper side of the folded airbag 160, and the housing portion 130 arranged below the upper wall portion 122. This upper wall portion 122 is the portion constructing the airbag cover. The housing portion 130 is a portion for housing the folded airbag 160 and the inflator 46.

Figure 18:
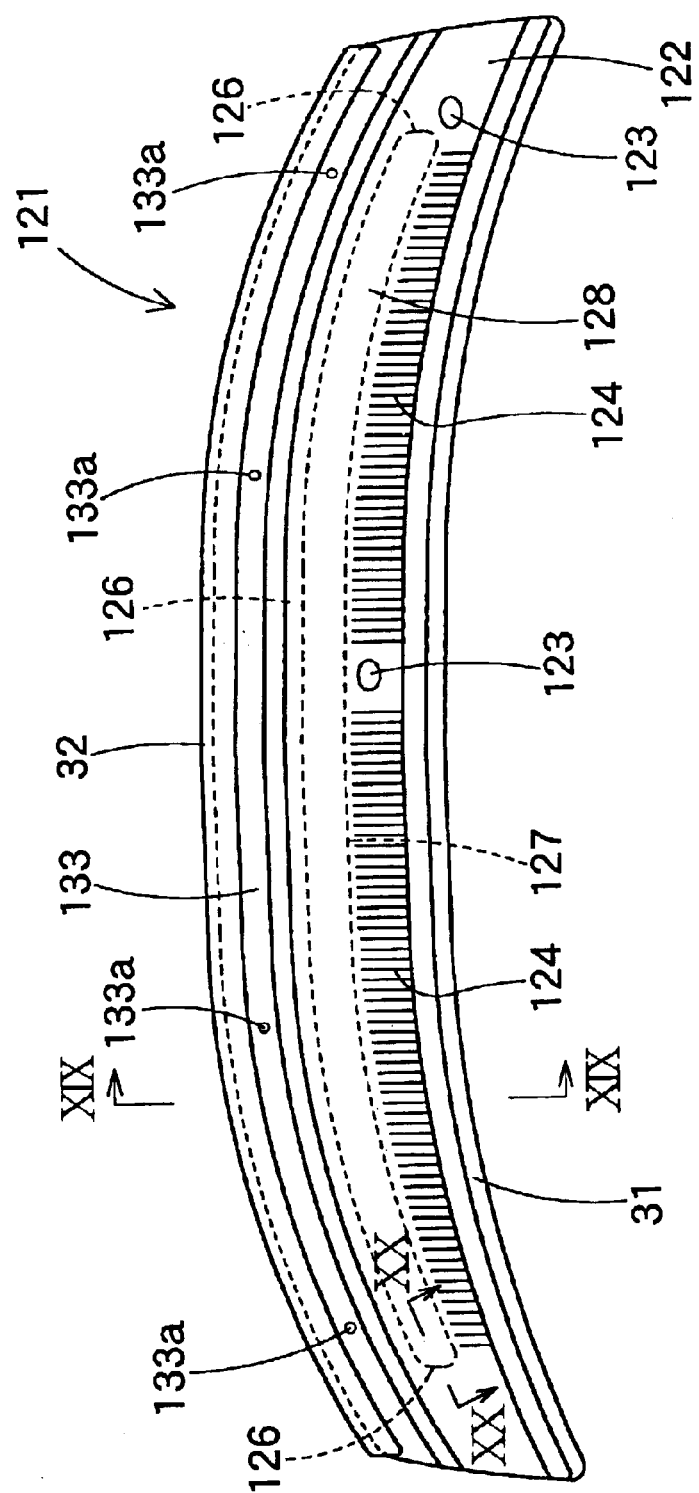
FIG. 18 is a top plan view of a cowl louver to be used in the pedestrian protecting device of the third embodiment.
Figure 19:
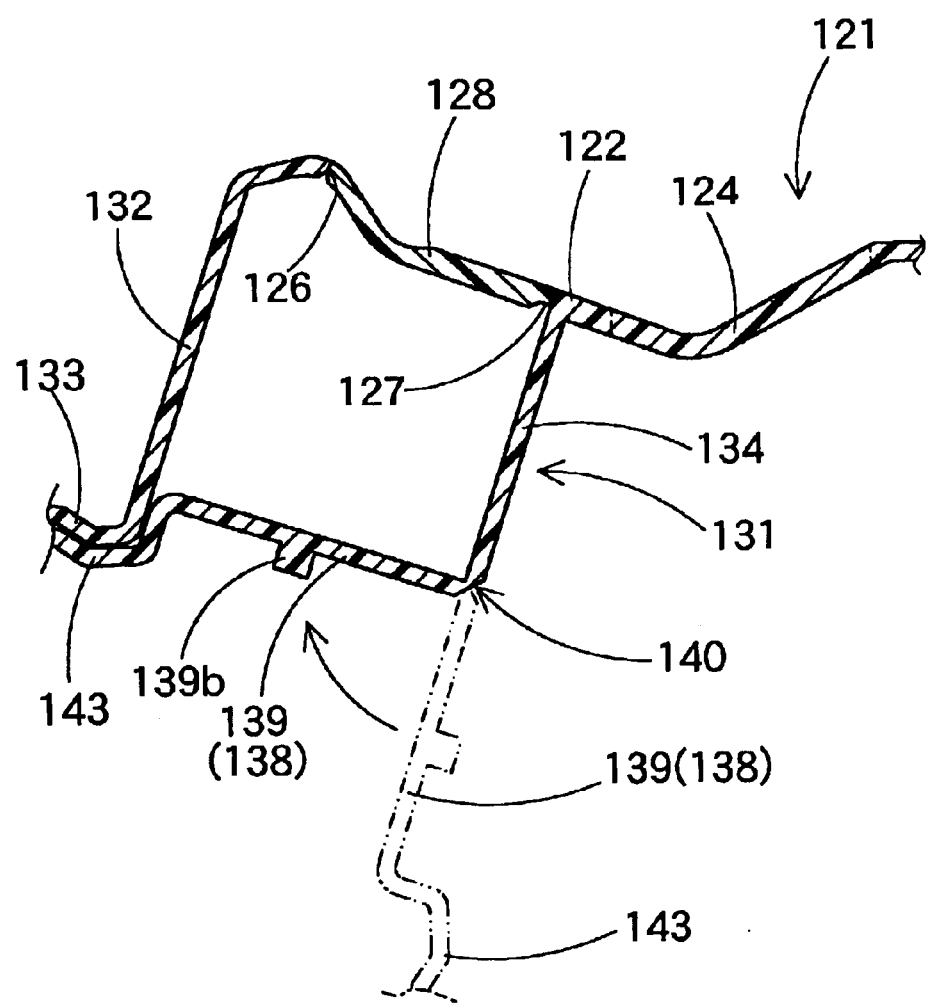
FIG. 19 is a partially enlarged end view of the cowl louver at the position XIX—XIX of FIG. 18.
Figure 20:
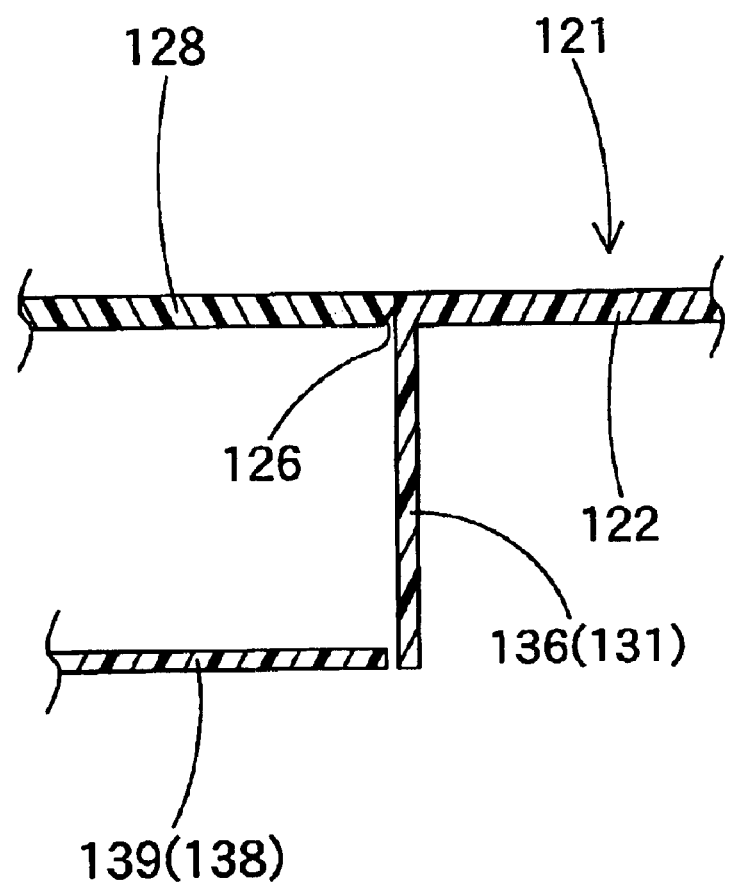
FIG. 20 is a partially enlarged end view of the cowl louver at the position XX—XX of FIG. 18.

The upper wall portion 122 has a crescent top plan shape, as shown in FIG. 18. At the rear edge 122a of the upper wall portion 122, there is integrally arranged the weather strip 31 contacting the lower edge portion of the front windshield 5. In the rear side of the upper wall portion 122, there are formed a plurality of holes 124 for passing rainwater or the like toward the cowl panel 13. In the upper wall portion 122, moreover, there are formed two through holes 123 for allowing the wipers 11 to extend through. On the front side of the upper wall portion 122, moreover, there is arranged the door portion 128 which is opened by the push of the airbag 160 when expanding.

The door portion 128 is made of a thermoplastic elastomer of olefins (in the embodiment) or a thermoplastic elastomer of styrenes which can be fused by the heat at the molding time with the polypropylene comprising the cowl louver 121. The door portion 128 is thus made integral with the cowl louver 121. Moreover, the door portion 128 is arranged to cover over the housing portion 130 and to take a crescent top plan shape. The door portion 128 is constructed by making the rear edge side into an hinge portion 127 so that the door may be opened to the rear. At the other three peripheral edges of the door portion 128, moreover, there is formed a thinned break-away portion 126, which can be broken by the push of the airbag 160. The hinge portion 127 is constructed as an integral hinge. In the case of the embodiment, moreover, the two left and right edges 128a and 128b of the door portion 128 are arranged, as in the door portion 26 in the foregoing airbag device M1, at positions closer to the vehicular center side than the lower ends of the left and right front pillars.

Here, this door portion 128 is arranged such that it covers, when completely opened, the front sides of the wipers 11 which are arranged in their initial position below the front windshield 5 and generally in the transverse direction of the vehicle (as referred to double-dotted lines in FIGS. 15 and 16).

The housing portion 130 is provided with a peripheral wall portion 131 composed of four side wall portions 132, 134, 135 and 136, and a bottom wall portion 138 arranged to close the lower side of the portion defined by the peripheral wall portion 131. The front wall portion 132 is formed to extend downward from the front end of the upper wall portion 122. The left and right side wall portions 135 and 136 and the rear wall portion 134 are formed to extend downward from the vicinities of the two left and right edges and the rear edge of the door portion 128 (FIGS. 15 and 19 to 21). The front wall portion 132 is so arranged in the vertical direction as to approach and to confront the rear vertical wall portion 3d of the hood panel 3 extending from the rear edge 3a of the hood panel 3 from the rear, as shown in FIGS. 15 and 16.

On the lower edge of the front wall portion 132, further, there is arranged a flange portion 133 which is bent to the front. With this flange portion 133, as in the cowl louver 18 of the foregoing airbag device M1, there is assembled the weather strip 32 for sealing the lower face 3b of the hood panel 3 at its rear edge 3a. In the flange portion 133, moreover, there are formed a plurality of (or four in the embodiment) insertion holes 133a. These individual insertion holes 133a are formed for insertion of the bolts 68 for connecting and fixing the mounting members 64 of the airbag 160 together with the cowl louver 121 to the cowl panel 13.

Figure 17:
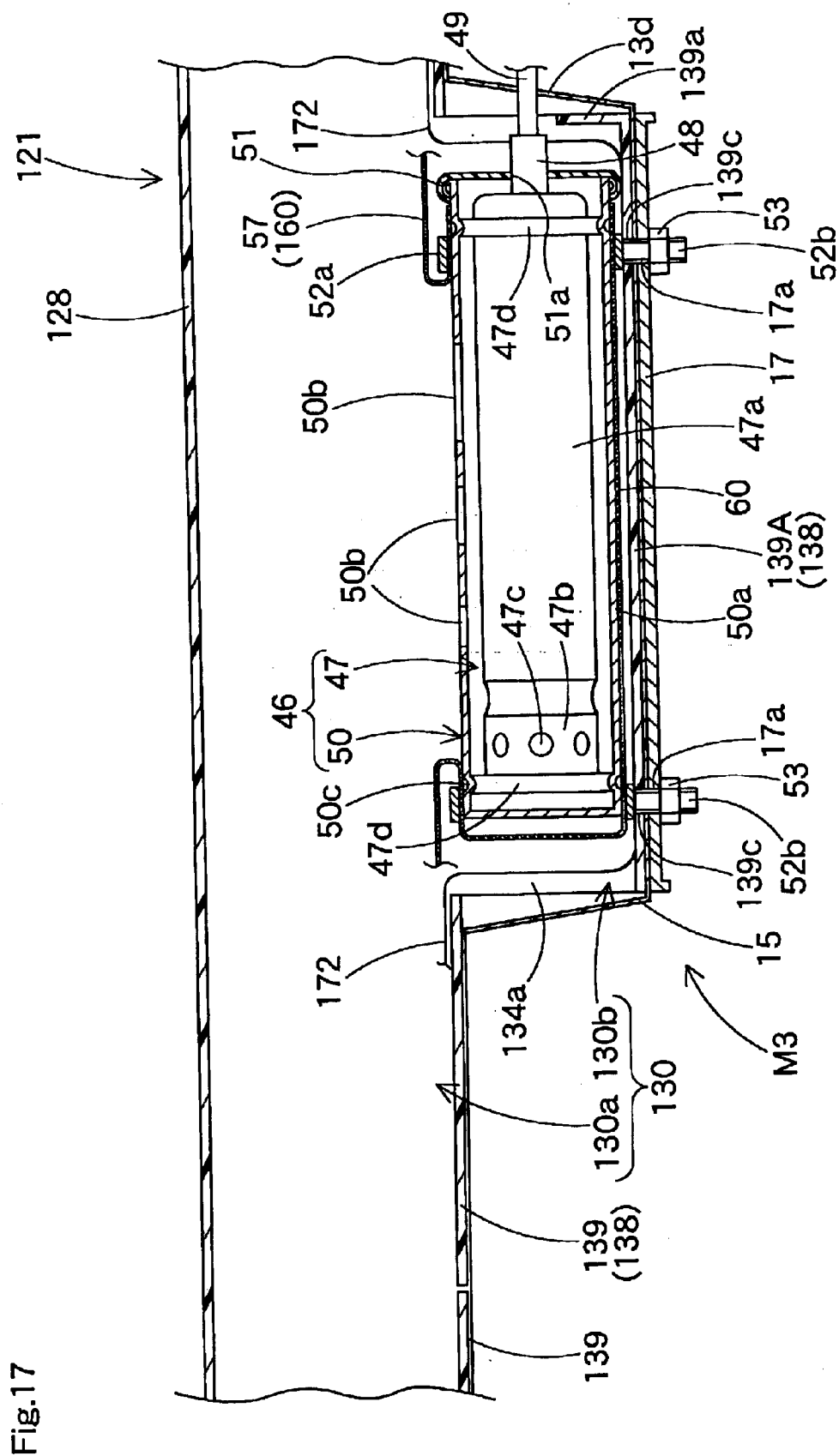
FIG. 17 is a schematic vertical section showing the pedestrian protecting device of the third embodiment in the vehicular transverse direction along line XVII—XVII of FIG. 16.
Figure 21:
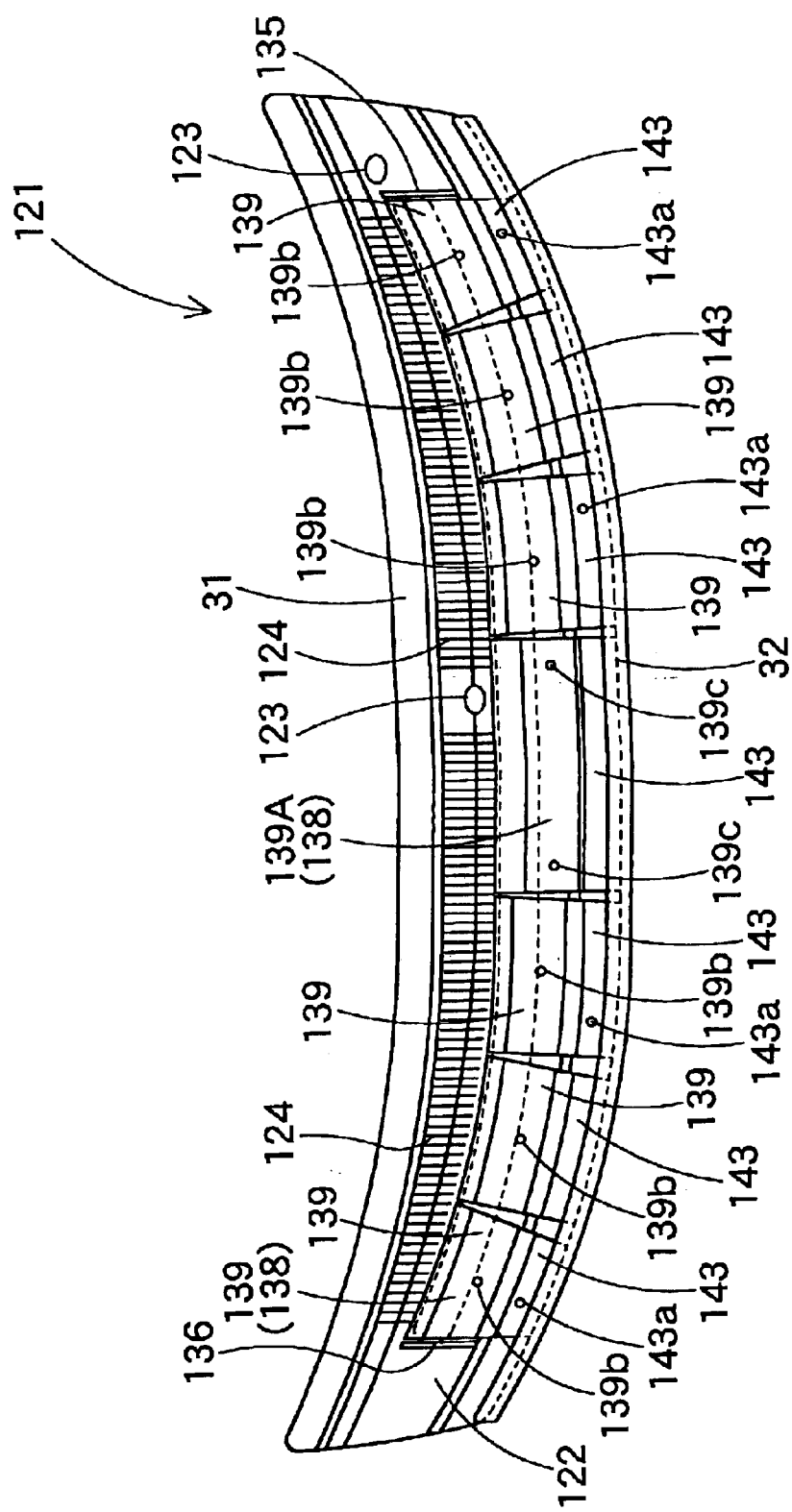
FIG. 21 is a bottom view of the cowl louver to be used in the pedestrian protecting device of the third embodiment.

The bottom wall portion 138 is divided into a plurality of portions lined up in the transverse direction (FIGS. 17 and 21). The individual split bottom wall portions 139 are formed to continue to the rear wall portion 134 through hinge portions 140 formed on the rear end sides. In other words, the individual split bottom wall portions 139 are constructed to form a common plane with the rear wall portion 134, as shown by double-dotted lines in FIG. 19, when the cowl louver 121 is manufactured. Moreover, the individual split bottom wall portions 139 are bent at the hinge portions 140, when the airbag 160 and the inflator 46 are to be housed, so as to cover the lower side of the peripheral wall portion 131.

Figure 16:
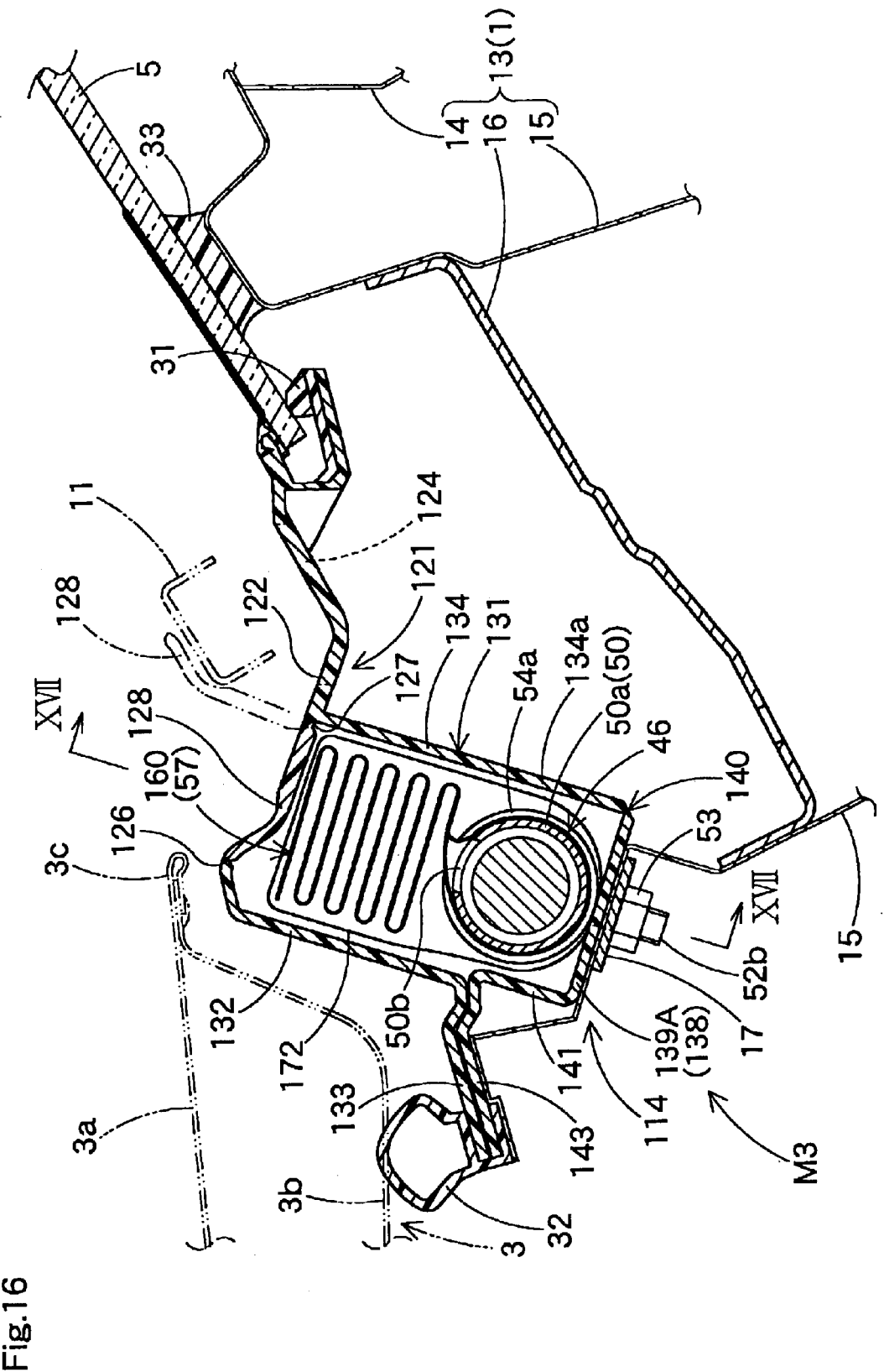
FIG. 16 is a schematic vertical section of the pedestrian protecting device of the third embodiment in the vehicular longitudinal direction.

In the bottom wall portion 138, moreover, split bottom wall portion 139A arranged near the transverse center is positioned below the surrounding split bottom wall portions 139, as shown in FIGS. 16 and 17. This arrangement is made to house the inflator 46. The wall on the rear of the split bottom wall portions 139A, moreover, is formed by an extended wall portion 134a of the rear wall portion 134, extended downward and connected to the rear end of the split bottom wall portions 139A. In short, the split bottom wall portion 139A is formed to continue to the extending wall portion 134a through the hinge portions 140. On the front of the split bottom wall portion 139A, moreover, there is formed a vertical wall portion 141, which extends upward. This vertical wall portion 141 is formed in the same plane as the front wall portion 132 when the airbag device M3 is mounted on the vehicle. In the split bottom wall portion 139A near the right edge on the side of the connector 48 of the inflator 46, moreover, there are protruded upward ribs 139a for preventing the rainwater or the like from invading into the housing portion 130 (FIG. 17). In the embodiment, moreover, the portion defined by the extending wall portion 134a, the split bottom wall portion 139A and the vertical wall portion 141 provides an inflator housing portion 130b. On the upper side of the inflator housing portion 130b, the portion defined by the peripheral wall portion 131 and the individual split bottom wall portions 139 provides an airbag housing portion 130a for housing the folded airbag 160. The inflator housing portion 130b is closed near the lower end of the right side portion by the ribs 139a but is opened at the left side portion (FIG. 17).

Figure 15:
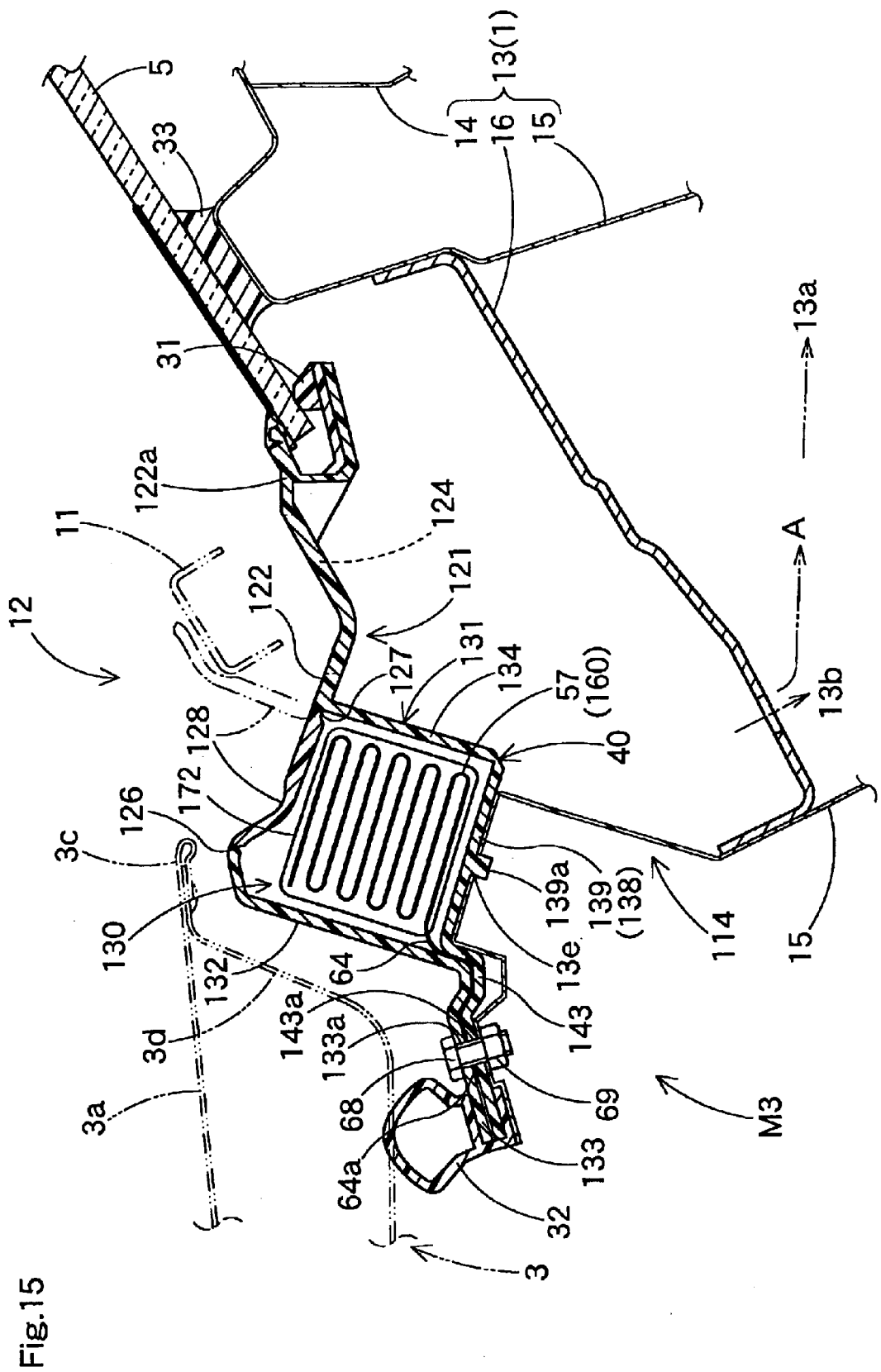
FIG. 15 is a schematic vertical section showing a pedestrian protecting device according to a third embodiment in the vehicular longitudinal direction.

On the lower sides of the individual split bottom wall portions 139 and 139A, as shown in FIGS. 15 and 16, the panel member 15 comprising an upper side portion 114 of the cowl panel 13 is arranged to abut against the individual split bottom wall portions 139 and 139A. This panel member 15 is partially recessed to abut against the lower sides of the split bottom wall portions 139A even at the portion where the inflator housing portion 130b is arranged. In each of the split bottom wall portions 139, moreover, there is formed a protrusion 139b, which protrudes downward (FIGS. 15 and 21). This protrusion 139b is inserted into the insertion hole 13e formed in the cowl panel 13, as shown in FIG. 15. In other words, each protrusion 139b is formed to position the panel 15 when the cowl louver 121 is to be mounted on the cowl panel 13. At predetermined positions of the split bottom wall portion 139A, moreover, there are formed insertion holes 139c for inserting the bolts 52b of the inflator 46, as shown in FIGS. 16 and 21.

At the upper edge of the vertical wall portion 141 and at the front edges of the individual split bottom wall portions 139, there are formed flange portions 143, which are bent and arranged to abut against the flange portion 133. In each of these flange portions 143, moreover, there are formed insertion holes 143a to communicate with the insertion holes 133a formed in the flange portion 133, as shown in FIGS. 16 and 21. In these insertion holes 143a are inserted the bolts 68 for connecting and fixing the mounting members 64 of the airbag 160 together with the cowl louver 121 to the cowl panel 13.

Figure 22:
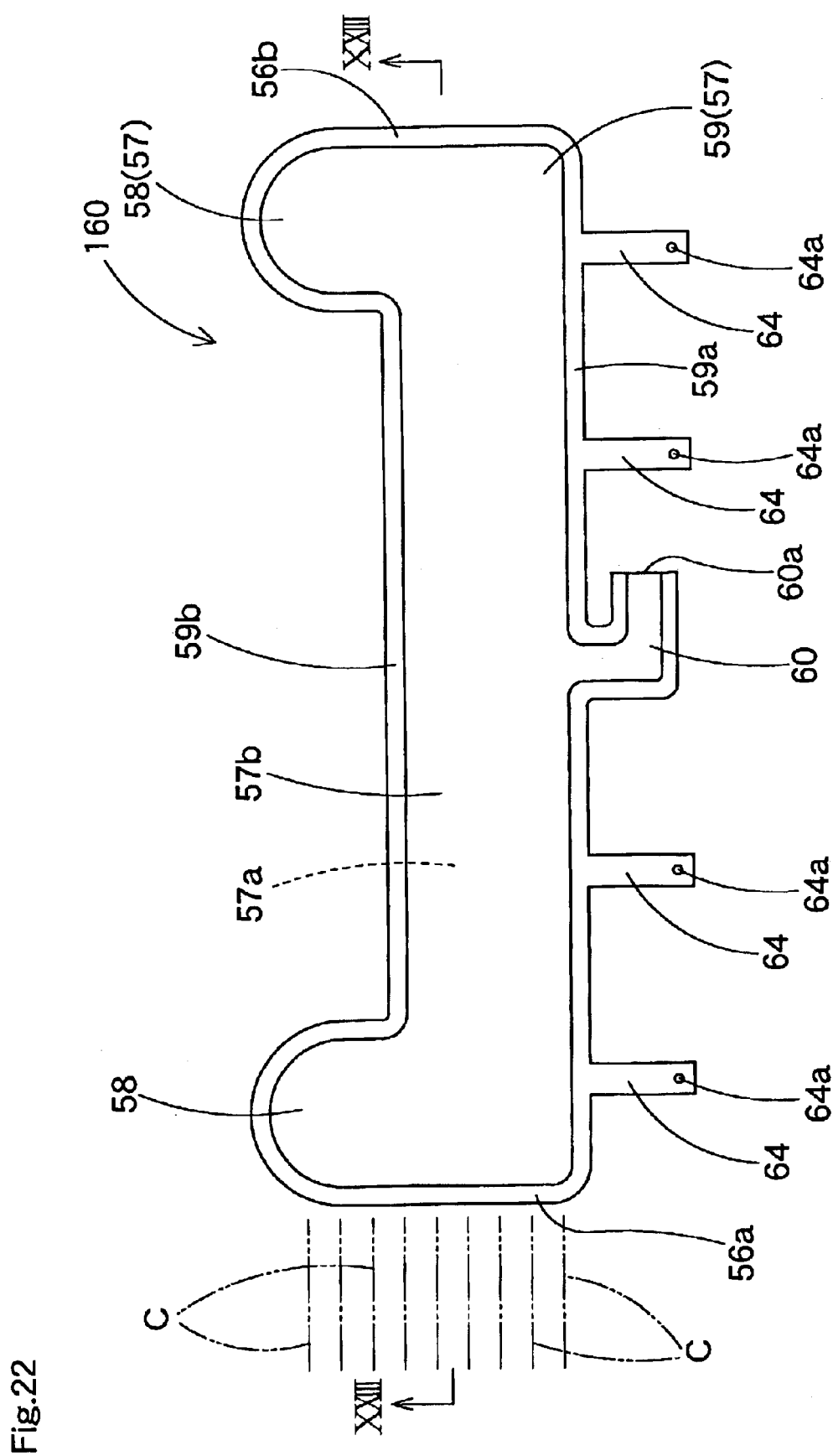
FIG. 22 is a top plan view showing only the airbag to be used in the pedestrian protecting device of the third embodiment when inflated.
Figure 23:
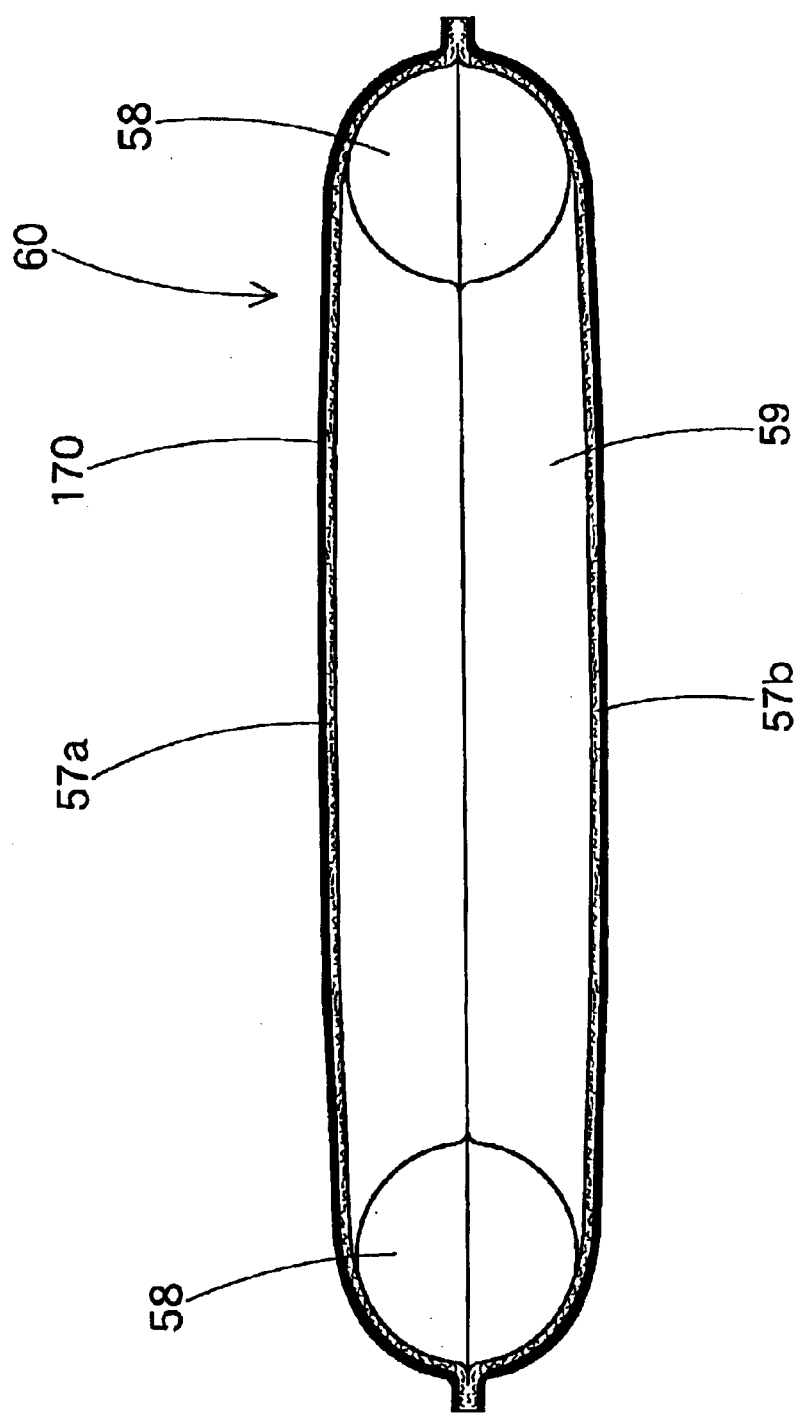
FIG. 23 is a section of the airbag and corresponds to portion XXIII—XXIII of FIG. 22.

The airbag 160 has a construction similar to that of the airbag 56 in the foregoing airbag device M1 except that in addition there is a coating layer 170 arranged on the outer surface side, as shown in FIGS. 22 and 23. Therefore, the description of the common members will be omitted, designating them by the same reference numerals. The coating layer 170 is made of highly water-resisting silicon rubber or the like.

Further, the airbag 160 is housed in the folded state in the housing portion 130 while being covered on its outer peripheral side with a wrapping member 172 made of a sheet material of a highly water-resisting synthetic resin (as referred to FIGS. 15 to 17). Specifically, it is preferred that the sheet material for the wrapping member 172 is made of highly water-resisting polyethylene, polypropylene or polyvinylidine chloride. In the embodiment, the wrapping member 172 is made of a sheet material of polyethylene. In the third embodiment, more specifically, the inflator 46 is also mounted and fixed on the cowl panel 13 while being covered on its outer periphery with the wrapping member 172 covering the outer periphery of the airbag 160.

Here will be described how to mount the airbag device M3 of the third embodiment on the vehicle V1. First of all, the airbag 160 is folded up like the airbag 56 in the foregoing airbag device M1. After this, the inflator 46 is connected to the inlet portion 60 of the airbag 160 as in the aforementioned airbag device M1.

Next, the airbag 160 and the inflator 46 are wrapped with the wrapping member 172 so that the folded airbag 160 and the inflator 46 other than the portion of the bolts 52b maybe covered substantially all over their outer peripheral sides. The weather strip 31 is assembled in advance with the cowl louver 121. In the cowl louver 121 inverted, the inflator 46 inverted to protrude the bolts 52b upward and the folded airbag 160 are then housed in the housing portion 130 which is defined by the peripheral wall portion 131. Then, the individual split bottom wall portions 139 and 139A are bent at the portions of the hinge portions 140 so as to close the housing portion 130. At this time, the split bottom wall portions 139A are arranged to protrude the bolts 52b from the insertion holes 139c. Then, the not-shown spring washers are fitted on the bolts 52b protruded from the insertion holes 139c. After this, the leading ends of the flange portions 133 and 134 are inserted so as to contact the weather strip 32. Thus, the cowl louver 121 is built into the airbag device M3.

And, the assembled cowl louver 121 is so assembled by inserting the protrusions 139b formed on the individual split bottom wall portions 139 into the insertion holes 13e so that the bottom wall portion 138 may abut on its lower face side against the panel member 15 acting as the upper side portion 114 of the cowl panel 13. Further, the bolts 52b are inserted into the insertion holes 13c and 17a of the cowl panel 13 and the reinforcing panel 17. The bolts 52b protruding from the reinforcing panel 17 are fastened by the nuts 53. At the same time, the cowl louver 121 is fixed at the flange portions 133 and 143 together with the individual mounting members 64 of the airbag 160 on the cowl panel 13 by means of the bolts 68. Next, the connector 48 having the lead wire 49 connected therewith is connected to the body 47 of the inflator 46 in a manner to break the wrapping member 172 covering the outer circumference of the inflator 46. Then, the airbag device M3 can be mounted on the vehicle V1.

If the activation signal is inputted through the lead wire 49 to the body 47 of the inflator 46 after the pedestrian airbag device M3 was mounted on the vehicle V1, the inflating gas is discharged from the gas discharge ports 47c of the inflator 46. Then, the airbag 160 is inflated with the inflating gas let in from the inlet portion 60. Therefore, the door portion 128 of the cowl louver 121 is pushed by the airbag 160 to break the break-away portion 126 around the door portion 128. Then, the door portion 128 is opened on the hinge portion 127 toward the rear side of the vehicle V1 so that the airbag 160 is expanded.

In the pedestrian airbag device M3 of the third embodiment, moreover, the cowl louver 121 made of a synthetic resin used in making the vehicle V1 itself is provided with the housing portion 130 and the door portion 128 for covering the upper side of the housing portion 130. In the pedestrian airbag device M3 of the third embodiment, more specifically, the housing portion 130 for housing the inflator 46 and the airbag 160 and the door portion 128 for covering the side of the airbag 160 facing the outside of the vehicle are the cowl louver 121 itself, made of a synthetic resin, used in making the vehicle V1 itself. With the pedestrian airbag device M3 of the third embodiment, therefore, the number of parts of the vehicle V1 can be made fewer, and the weight can also be made less than the case of the pedestrian airbag device of the prior art which requires a case, a door portion and so on to be mounted on the vehicle.

Moreover, the pedestrian airbag device M3 of the third embodiment can be mounted on the vehicle when the cowl louver 121 is attached to the vehicle together with the airbag device M3. Therefore, it is possible to reduce the number of steps needed to build the airbag device M3 into the vehicle.

In the pedestrian airbag device M3 of the third embodiment, therefore, the number of steps needed for building the airbag device M3 into the vehicle V1 can be reduced while suppressing the increase in the number of parts of the vehicle V1, and the increase in weight can also be reduced.

In the pedestrian airbag device M3 of the third embodiment, moreover, the housing portion 130 is held by the cowl panel 13 made of a sheet metal. Therefore, the downward pushing force to act when the airbag 160 is expanded and inflated can be received by the highly rigid cowl panel 13 so that the airbag 160 can stably expand.

In the pedestrian airbag device M3 of the third embodiment, the bottom wall portion 138 of the housing portion 130 is supported on its lower face side in abutment against the cowl panel 13. Therefore, the downward pushing force to act when the airbag 160 is expanded and inflated can be received more reliably by the cowl panel 13. As a result, the airbag 160 can expand more stably.

In the pedestrian airbag device M3 of the third embodiment, moreover, the housing portion 130 is held by the upper portion 114 of the cowl panel 13. This means that even if rainwater or the like collects in the cowl panel 13, it is unlikely to accumulate enough to reach the housing portion 130. Therefore, the structure of the housing portion 130 to protect against the rainwater can be simplified so that the bottom wall portion 138 can safely be split into separate portions, as in the embodiment.

In the pedestrian airbag device M3 of the third embodiment, moreover, the airbag 160 is constructed by arranging coating layer 170 for giving the water-resistance to the outer surface side. At the same time, on the other hand, the airbag 160 is covered in its folded state on its outer peripheral side with the water-resisting wrapping member 172 and is housed in the water-proofed state in the housing portion 130. Further, the inflator 46 is housed in the housing portion 130 while being covered with not only the airbag 160 but also the wrapping member 172. Even if the rainwater or the like invades into the housing portion 130, therefore, the strength of the airbag 160 and the inflator 46 will not be deteriorated. As a result, the structure of the housing portion 130 needed to prevent damage by rainwater can be simplified.

In the pedestrian airbag device M3 of the third embodiment, moreover, the airbag 160 is connected and fixed to the cowl panel 13 at the mounting members 64 and at the portions of the inflator 46 where the mounting brackets 52 are arranged. Even if the upward inertial force acts intensely when the airbag 160 completes its inflation, therefore, the airbag 160 can be reliably held by the cowl panel 13. As a result, it is possible to stabilize the position of the airbag 160 at completion of its inflation.

Here in the pedestrian airbag device M3 of the third embodiment, the cowl louver 121 consists of one integral member. Like the cowl louver 18 in the foregoing airbag device M1, however, another cowl louver may be constructed by assembling two members: an upper side member containing the door portion, and a lower side member comprising the housing portion.

In the pedestrian airbag device M3 of the third embodiment, on the other hand, the door portion 128 is made of a flexible synthetic resin such as a thermoplastic elastomer of olefins or a thermoplastic elastomer of styrenes. Even if the door portion 128 is elongated in the vehicular transverse direction and curved to protrude to the vehicular front side, therefore, it is not partially broken but pushed and extended by the airbag 160 when the door is opened, so that it is smoothly opened. This is because the material making the door portion 128 itself is slightly extendible. As a result, the airbag 160 can be promptly expanded. Of course, the material for making the door portion 128 should not be limited to the above-specified but may be made of polypropylene integrally with the cowl louver 121, if it can be smoothly opened.

Here will be described airbag devices M4 and M5 as pedestrian protecting devices according to fourth and fifth embodiments, which can achieve the third object of the present invention. The vehicle V1 for mounting the airbag devices M4 and M5 of the fourth and fifth embodiments has a construction similar to that of the vehicle V1 for mounting the foregoing airbag device M1, excepting a cowl louver 218. Therefore, the description of the common members will be omitted, designating them by the same reference numerals.

Figure 24:
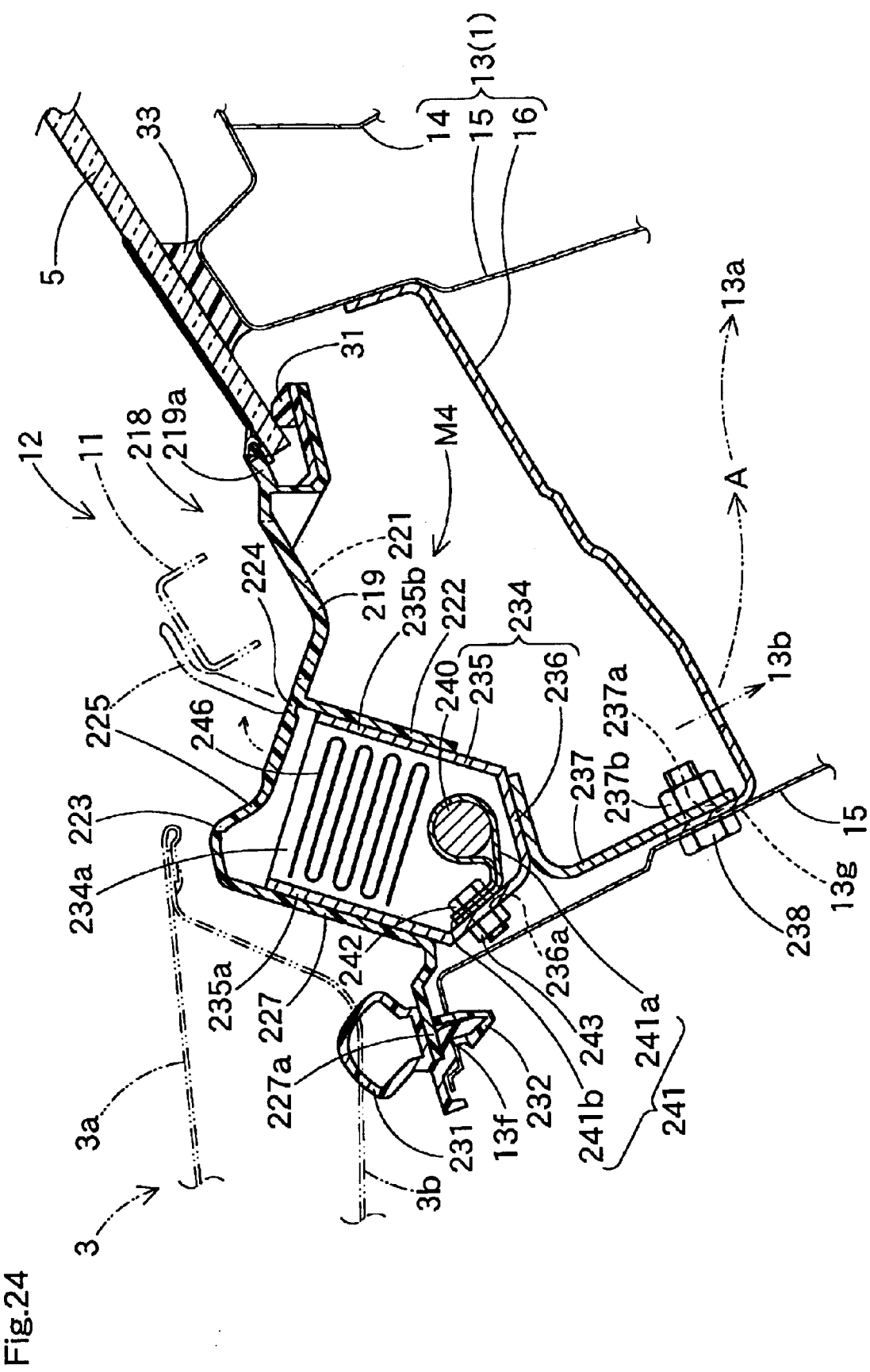
FIG. 24 is a schematic vertical section showing a pedestrian protecting device according to a fourth embodiment in the vehicular longitudinal direction.
Figure 25:
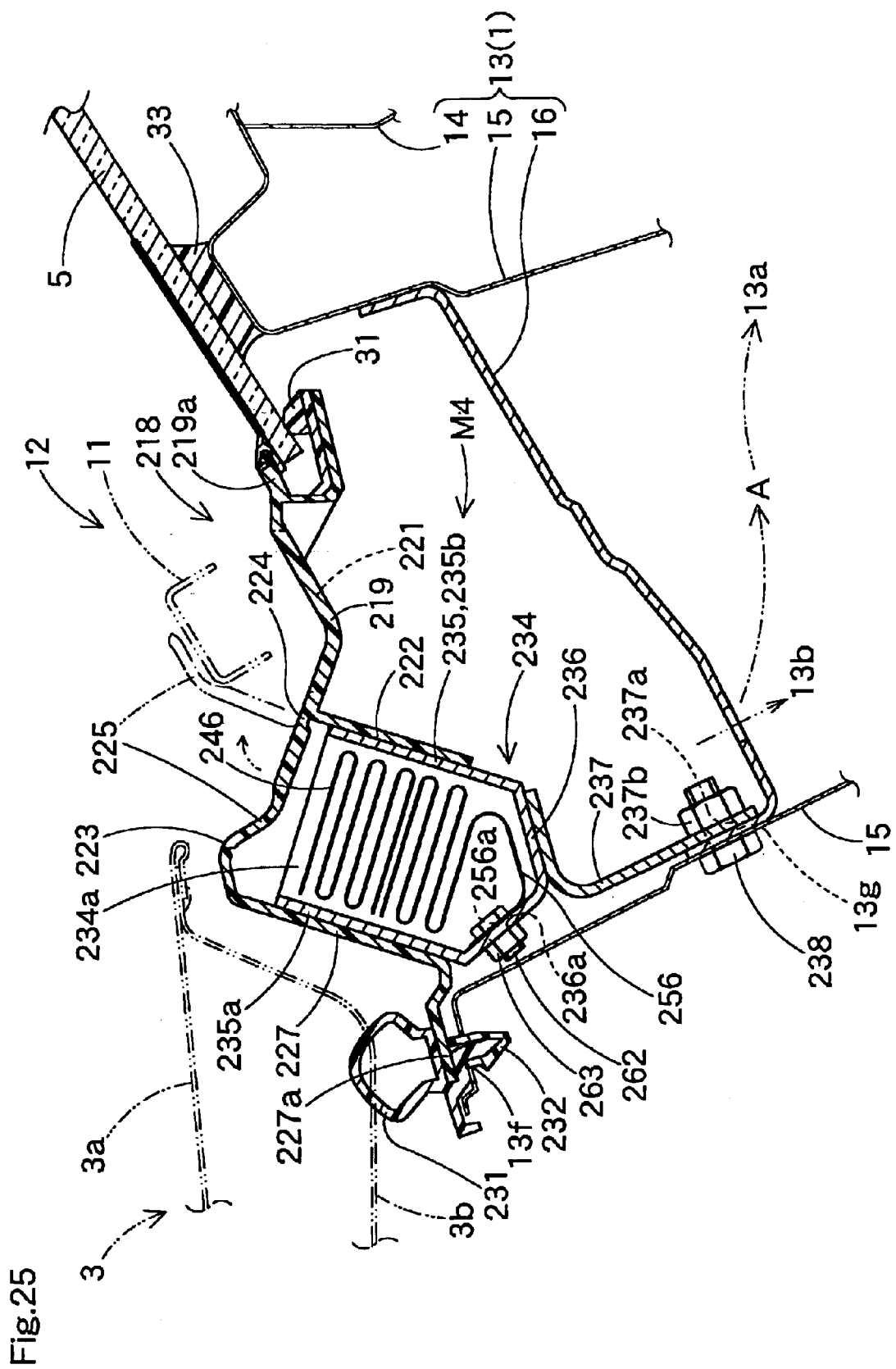
FIG. 25 is a schematic vertical section showing a pedestrian protecting device according to the fourth embodiment in the vehicular longitudinal direction.

As shown in FIGS. 24 and 25, the pedestrian airbag device M4 of the fourth embodiment is provided with: an airbag 246; an inflator 240 for feeding the airbag 246 with the inflating gas; a case 234 for housing the airbag 246 folded and the inflator 240; and an airbag cover 218 for covering the folded airbag 246. Further, the airbag device M4 is arranged at the portion of the cowl 12 between the hood panel 3 and the front windshield 5 of the vehicle V1.

In the case of the embodiment, the airbag cover 218 is the cowl louver which is arranged above the cowl panel 13 on the side of the body 1 of the vehicle V1. The case 234 is fixed on the cowl panel 13.

The cowl louver 218 which is the airbag cover is made of a synthetic resin and is so arranged in the crescent space between the rear end 3a of the hood panel 3 and the front windshield 5 as to extend to the vicinities of the left and right edges of the vehicle V1. The cowl louver 218 has a section of generally inverted L-shape in the longitudinal direction. Specifically, the cowl louver 218 is provided with an upper wall portion 219 which is arranged roughly horizontal, and a vertical wall portion 227 extending downward from the front end of the upper wall portion 219.

The upper wall portion 219 has a crescent top plan shape. On the rear edge 219a of the upper wall portion 219, there is fixed a weather strip 31 against which is fitted the lower end of the front windshield 5. Toward the rear of the upper wall portion 219, there are formed a plurality of holes 221 for passing rainwater or the like toward the cowl panel 13. Toward the front of the upper wall portion 219, on the other hand, there is arranged a door portion 225, which is opened by the push of the airbag 246 when expanding.

The door portion 225 has a crescent top plan shape. Moreover, the door portion 225 is provided with such an opening hinge portion 224 on its rear edge side that it opens to the rear. In the three other peripheral edges of the door portion 225, moreover, there is formed a thinned break-away portion 223 which can be broken when pushed by the airbag 246. The hinge portion 224 is an integral hinge. In the case of the embodiment, moreover, the two left and right ends 225a and 225b of the door portion 225 are closer to the vehicular center than the lower ends 7a of the left and right front pillars 7L and 7R, as in the cowl louver 18 of the aforementioned airbag device M1.

Here, this door portion 225 is arranged so that when it is completely opened it covers the front sides of the wipers 11 at their initial position, below the front windshield 5 and lying roughly in the transverse direction of the vehicle (the double-dotted lines in FIGS. 24 and 25).

In the upper wall portion 219, further, there are formed two through holes 220 through which the wipers 11 pass. On the lower face of the upper wall portion 219 near the hinge portion 224, there is arranged a downward extending side wall portion 222. This side wall portion 222 is arranged to clamp the front and rear wall portions 235a and 235b of the later-described peripheral wall portion 235 of the case 234 between itself and the vertical wall portion 227.

The vertical wall portion 227 is provided with a flange portion 227a formed by bending the vertical wall at its lower edge toward the front side. On the flange portion 227a, there is assembled a weather strip 231 for sealing the lower face 3b of the hood panel 3 near its lower edge 3a. The weather strip 231 is so arranged as to contact with the side of the rear end 3a of the hood panel 3 at a line extending substantially all along its transverse direction. On the lower portion of the weather strip 231, moreover, there are mounted a plurality of (five in the embodiment) clips 232, which are arranged at intervals in the vehicular transverse direction and retained in assembly holes 13f of the cowl panel 13.

Figure 26:
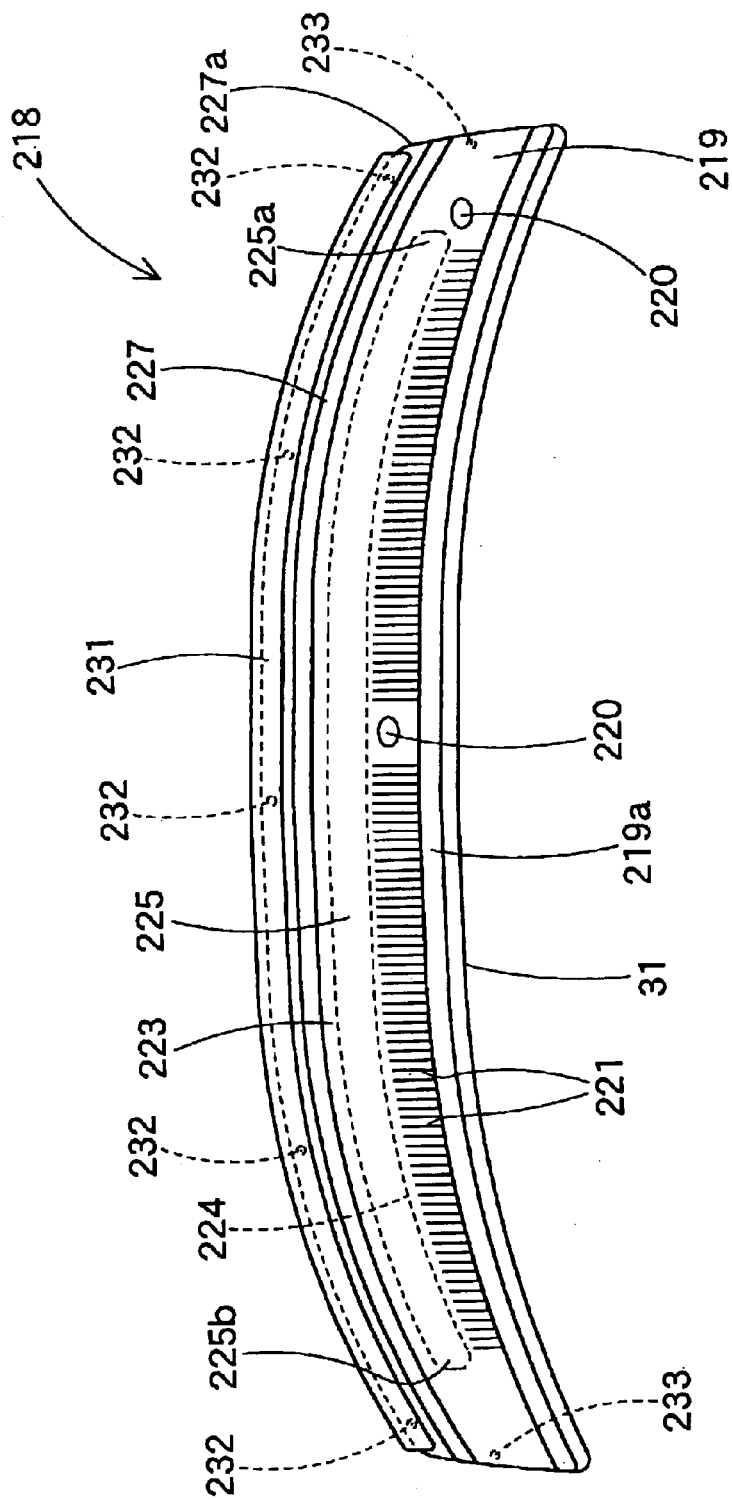
FIG. 26 is a schematic top plan view showing a cowl louver acting as an airbag cover to be used in the pedestrian protecting device of the fourth embodiment.

This cowl louver 218 is mounted on the cowl panel 13 in the following manner. First of all, with the rear edge of the upper wall portion 219 of the cowl louver 218 being fitted on the front windshield 5, individual clips 232 are inserted into and retained by assembly holes 13f. At the same time, clips 233 (FIG. 26) arranged on the two transverse edges are inserted and retained in the not-shown assembly holes formed in the cowl panel 13, and thereby the cowl louver 218 can be mounted on the cowl panel 13.

Figure 27:
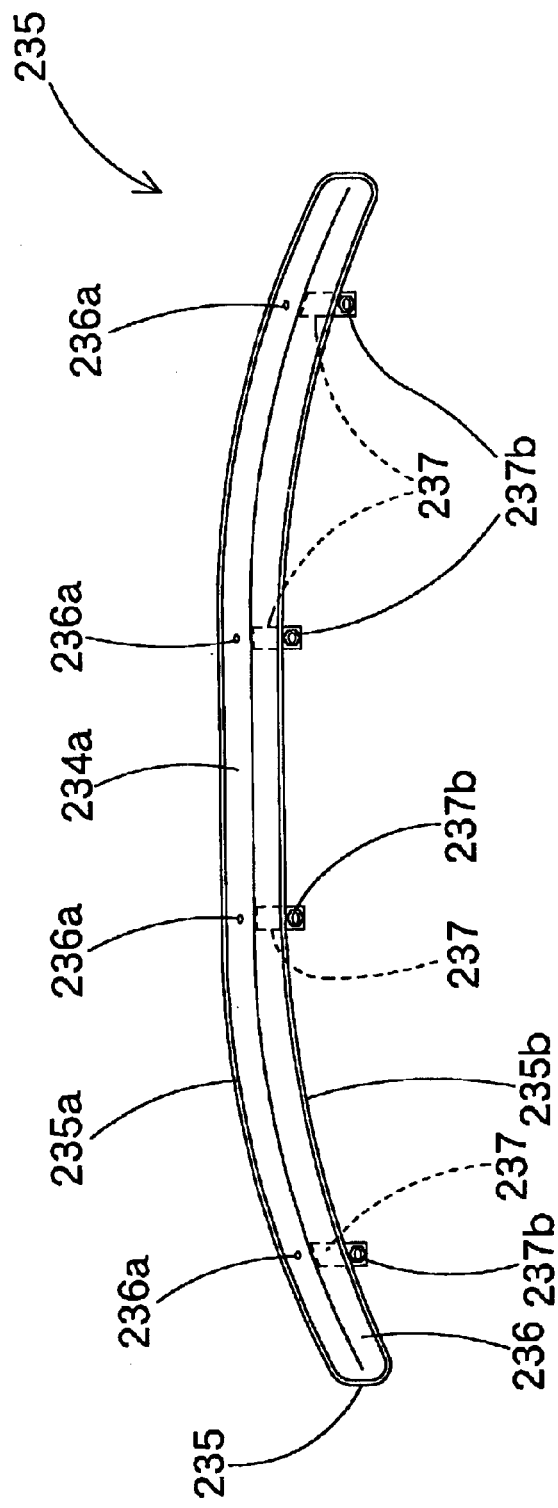
FIG. 27 is a schematic top plan view showing a case to be used in the pedestrian protecting device of the fourth embodiment.

The case 234 is formed of a sheet metal into a box shape. The case 234 is provided with the peripheral wall portion 235 having an opening 234a below the door portion 225, and a bottom wall portion 236 closing the lower portion of the peripheral wall portion 235, as shown in FIGS. 24, 25 and 27. Further, the front wall portion 235a and the rear wall portion 235b of the peripheral wall portion 235, confronting each other in the longitudinal direction, are positioned so that near their transverse centers protrude toward the front and near their two transverse edges are bent toward the rear. In other words, the front wall portion 235a and the rear wall portion 235b are curved along the front and rear edges of the door portion 225.

In the bottom wall portion 236, there are formed insertion holes 236a for inserting bolts 262 and 242 to mount the airbag 246 and the inflator 240 on the case 234. On the lower face of the bottom wall portion 236, moreover, there are fixed a plurality of brackets 237 (four in the embodiment) for mounting the case 234 on the cowl panel 13. Each of the brackets 237 is provided with an insertion hole 237a for inserting a bolt 238 and a nut 237b to be fixed on the peripheral edge of the insertion hole 237a. The nuts 237b can fasten the bolts 238. Further, the case 234 is mounted and fixed on the cowl panel 13 by fastening the bolts 238 on the nuts 237b after being passed through insertion holes 13g of the cowl panel 13 and through the insertion holes 237a.

Figure 29:
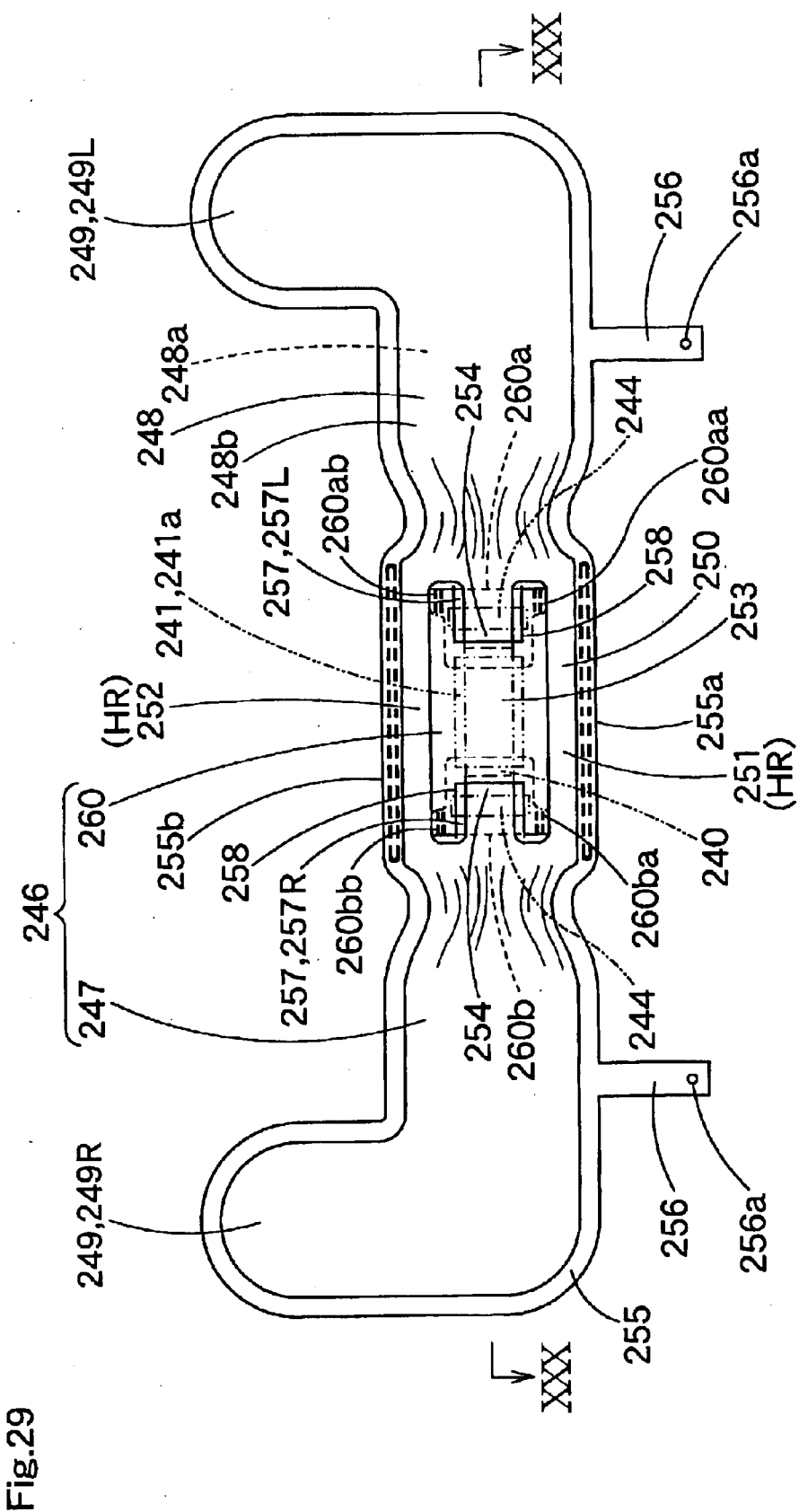
FIG. 29 is a back elevation of the airbag to be used in the pedestrian protecting device of the fourth embodiment.
Figure 30:
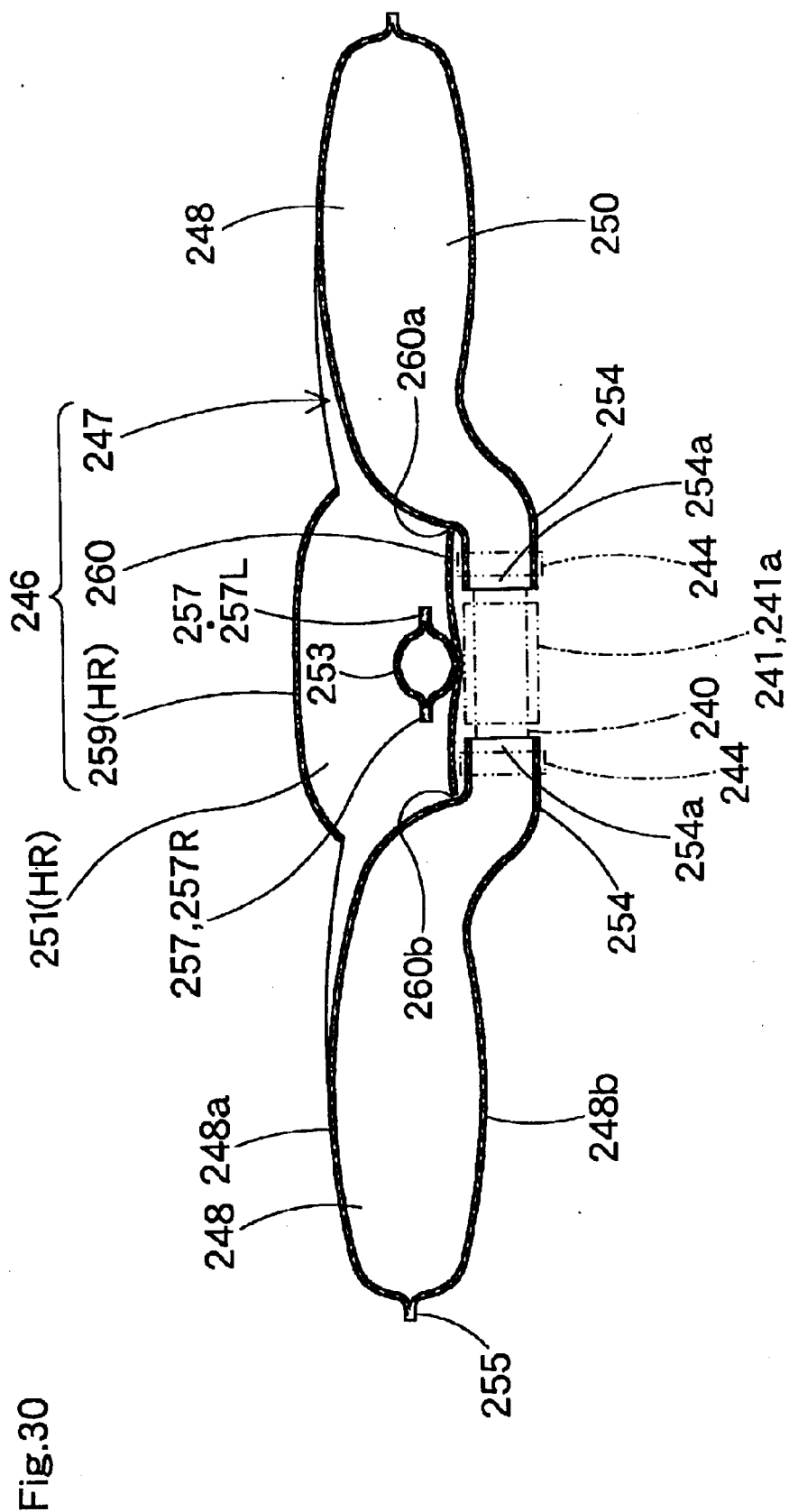
FIG. 30 is a transverse section along line XXX—XXX of FIG. 29 at the inflation time of the airbag to be used in the pedestrian protecting device of the fourth embodiment.

As shown in FIGS. 24, 29 and 30, the inflator 240 is of the cylinder type, in which its axis is arranged in the vehicular transverse direction. This inflator 240 has gas discharge ports arranged on the two transverse ends, although not shown. The inflator 240 is held by a bracket 241. Specifically, the bracket 241 is made of a sheet metal and fixed on the case 234 so that the inflator 240 is mounted and fixed in the case 234. To the left and right ends of the inflator 240, moreover, there are connected the later-described generally cylindrical inlet portions 254 and 254 of the airbag 246 by means of clamps 244.

The bracket 241 is provided with a holding portion 241a capable of clamping and holding the inflator 240, and a mounting member portion 241b extending from the holding portion 241a. To the mounting member portion 241b, there are fixed the two bolts 242. Further, the inflator 240 is mounted in the case 234 in the following manner. First of all, with the inflator 240 being held on the holding portion 241a of the bracket 241, the individual bolts 242 of the mounting member portion 241b are protruded from the inside to the outside of the case 234 through the insertion holes 236a. After this, nuts 243 are fastened on the individual bolts 242, and thereby the inflator 240 can be mounted in the case 234.

Figure 28:
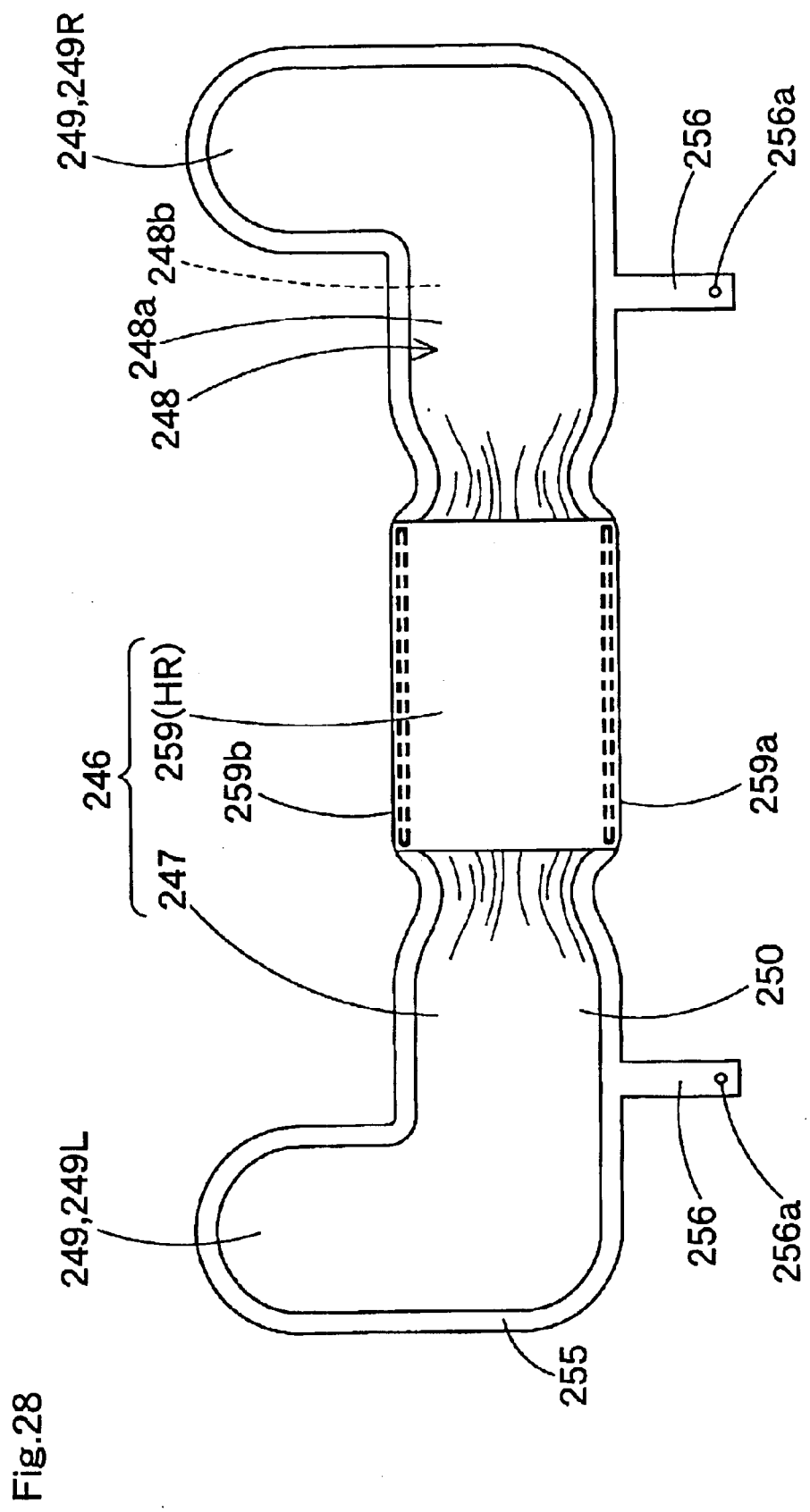
FIG. 28 is a front elevation of an airbag to be used in the pedestrian protecting device of the fourth embodiment.

As shown in FIGS. 28 to 30, the airbag 246 includes a main body 247, a cover cloth 259 and a reinforcing cloth 260. The main body 247 is manufactured by a hollow-weaving polyester yarns, polyamide yarns or the like. The cover cloth 259 and the reinforcing cloth 260 are formed of flexible woven fabric of polyester yarns, polyamide yarns or the like.

The main body 247 is provided with an inflating portion 248, a peripheral edge portion 255 and joint portions 257 (257L and 257R). The inflating portion 248 is constructed so that when it is inflated by entry of the inflating gas, the front wall portion 248a and the rear wall portion 248b separate from each other. The peripheral edge portion 255 and the joint portions 257 are constructed to join the wall portions 248a and 248b, but the inflating gas does not enter these portions. The peripheral edge portion 255 is formed at the outer peripheral edge of the inflating portion 248. The joint portions 257L and 257R are arranged around the later-described inlet portions 254 and 254. Further, the airbag 246 is of such a flat airbag type which can be expanded in a plane since the surface side wall portion 248a and the back side wall portion 248b are made to have identical plane shapes and are overlapped one on the other. When the airbag 246 completes its expansion, the rear wall portion 248b is mostly facing the side of the vehicle V1. Further, the front wall portion 248a mostly faces toward the free space side removed from the vehicle V1 side. To the outer circumference of the inflating body 247, moreover, there is applied a coating agent such as silicone to form a coating layer for preventing gas leakage.

The inflating portion 248 is formed to have a generally inverted U-shape widened in the transverse direction in a front view when it completes its expansion in the non-mounted state, as shown in FIGS. 28 to 30. The portions of the inflating portion 248 extending to the rear (or upward) at the left and right sides provide pillar cover portions 249 (249L and 249R). Each pillar cover portions 249L and 249R covers the front faces of the left and right front pillars 7L and 7R. In the inflating portion 248, moreover, the portion connecting the lower ends of the pillar cover portions 249L and 249R to each other is a louver cover portion 250 for covering the uppers side of the cowl louver 218.

Near the transverse center of the louver cover portion 250, there are formed two generally cylindrical inlet portions 254, which have openings 254a confronting each other in the vehicular transverse direction. The individual inlet portions 254 and 254 are formed when the airbag 246 is manufactured, in the following manner. First of all, at the hollow-weaving time of the main body 247, the C-shaped or inverted C-shaped joint portions 257L and 257R joining the front and rear wall portions 248a and 248b are formed near the transverse center of the louver cover portion 250. Then, the individual joint portions 257L and 257R are cut in the C-shape or the inverted C-shape to form slits 258. The individual inlet portions 254 and 254 are formed by raising the inner side portions of the individual slits 258. These inlet portions 254 allow the inflating gas from the inflator 240 to flow into the inflating portion 248 of the airbag 246. Further, the individual inlet portions 254 are mounted on the two transverse ends of the inflator 240 and are connected to the inflator 240 by means of the clamps 244.

Near the transverse center of the louver cover portion 250 and above those inlet portions 254, there are formed two cylindrical portions 251 and 252. These individual cylindrical portions 251 and 252 can be inflated in a rod shape with their axes in the vehicular transverse direction. The cylindrical portions 251 and 252 are lined up in the longitudinal direction when the airbag 246 completes its expansion in the mounted state. Moreover, the transverse center portions of those cylindrical portions 251 and 252 are given communications each other by a communication portion 253 between the inlet portions 254 and 254.

Figure 31:
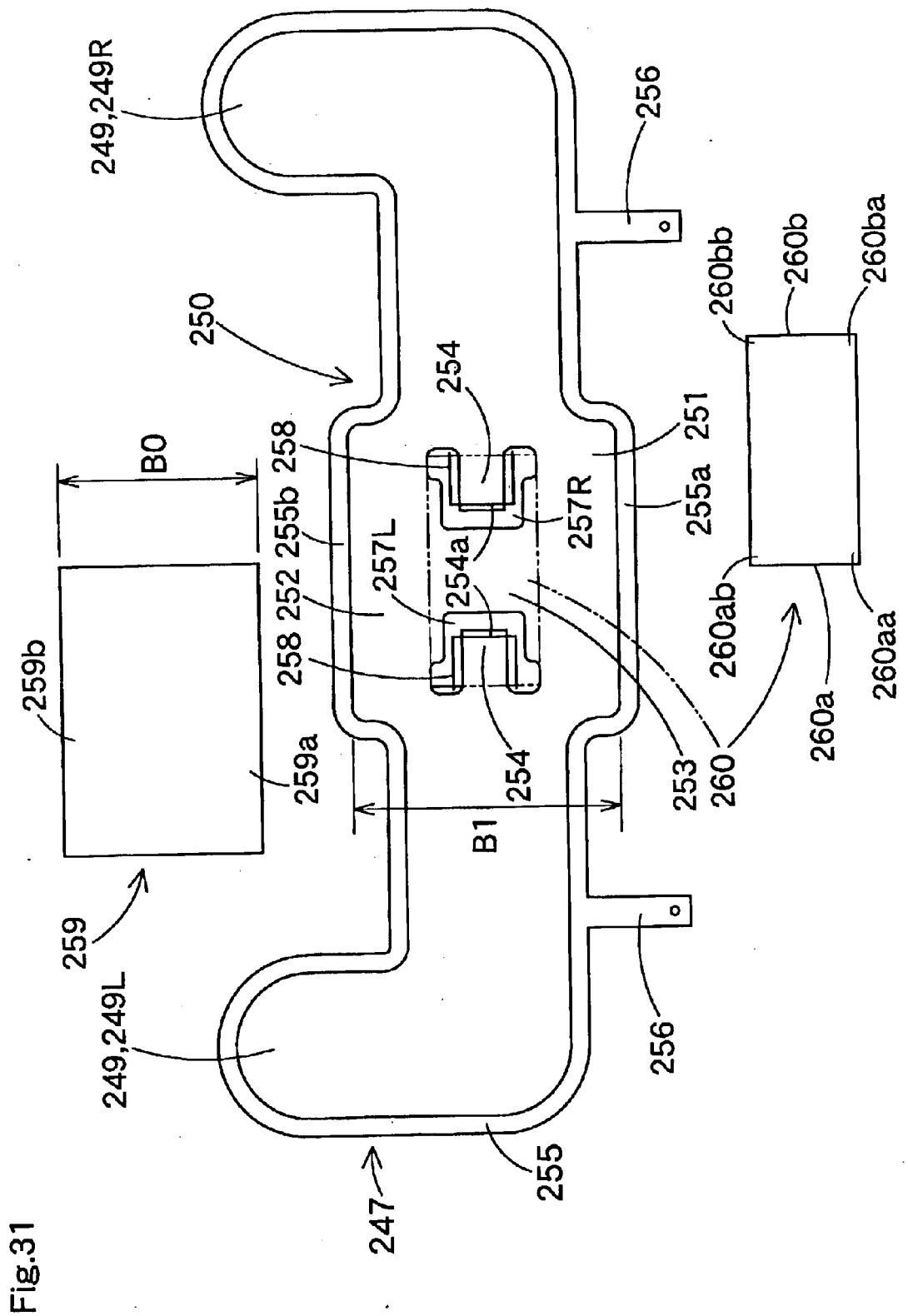
FIG. 31 is an exploded front elevation of individual members composing the airbag of the fourth embodiment.

The cover cloth 259 forms, together with the cylindrical portions 251 and 252, height restricting means HR for restricting the height size of the louver cover portion 250 upon completion of the inflation. The cover cloth 259 covers the upper face side, i.e., the side of the front wall portion 248a of the cylindrical portions 251 and 252. Moreover, the two longitudinal ends 259a and 259b of the cover cloth 259 are connected by sewing them, respectively, to the front edge 255a of the peripheral edge portion 255 of the front cylindrical portion 251 and the rear edge 255b of the peripheral edge portion 255 of the rear cylindrical portion 252, so that the cylindrical portions 251 and 252 may be connected in the longitudinal direction. Here, the cover cloth 259 has its longitudinal size B0 (FIG. 31) set so that the cylindrical portions 251 and 252 may not leave each other but may contact with each other when the airbag 246 completes its expansion. In the case of the embodiment, therefore, at the portion to serve as the cover cloth 259 of the louver cover portion 250, the longitudinal length size B1 of the inflating body 247 when the inflating body 247 is expanded flat with the surface side and back side wall portions 248a and 248b being overlapped is set longer than the longitudinal size B0 of the cover cloth 259. Thereby, the inflating body 247 is shortened in the longitudinal direction, when the cover cloth 259 is connected.

The reinforcing cloth 260 is so arranged on the side of the rear wall portion 248b as to cross the inlet portions 254 and 254. Specifically, the longitudinal corner portions 260aa, 260ab, 260ba and 260bb of the left and right ends 260a and 260b of the reinforcing cloth 260 are sewn to the joint portions 257L and 257R, which are different from the side of the inlet portions 254 after the slits 258 were formed. The reinforcing cloth 260 reinforces the peripheral edges of the inlet portions at the time when the inflating gas flows in. Here, the reinforcing cloth 260 is applied on the lower side of the inlet portions 254 and 254 in the mounted state, and the corner portions 260aa, 260ab, 260ba and 260bb are sewn to the joint portions 257L and 257R. Further, the inlet portions 254 and 254 are pulled away from the two left and right ends 260a and 260b of the reinforcing cloth 260 between the sewn connections. Then, the inlet portions 254 and 254 are arranged below the reinforcing cloth 260 in the mounted state (FIG. 30).

At the peripheral edge portion 255 on the front edge of the louver cover portion 250, on the other hand, there are formed two mounting members 256, which are extended in a sheet shape. In each of these mounting members 256, there is formed amounting hole 256a. The individual mounting members 256 are mounted on the bottom wall portion 256 of the case 234 in the following manner. The bolts 262 inserted into the mounting holes 256a of the individual mounting members 256 are inserted into the insertion holes 236a of the bottom wall portion 236. By fastening nuts 263 on the bolts 262 protruding from the bottom wall portion 236, moreover, the individual mounting members 256 are mounted on the bottom wall portion 236 of the case 234 (FIG. 25).

This airbag 246 is manufactured in the following manner. First of all, the inflating body 247, the cover cloth 259 and the reinforcing cloth 260 are prepared in advance. The inflating body 247 is manufactured in the following manner. First of all, there are hollow-woven a plurality of body materials including the inflating portion 248, the peripheral edge portion 255 and the joint portions 257. Further, the inflating body 247 is manufactured by cutting its contour from the body material and by forming the slits 258 and the individual mounting holes 256a. Here in the case of the embodiment, the coating layer is formed before the cutting by applying the coating agent when the body materials are manufactured. It is, however, also suitable that the coating layer is formed after the inflating body 247 is cut from the body material.

And, the corner portions 260aa, 260ab, 260ba and 260bb of the reinforcing cloth 260 are sewn to the predetermined portions of the inflating body 247. Next, the two edges in the longitudinal direction 259a and 259b of the cover cloth 259 are sewn to the predetermined portions of the body 247, and the airbag 246 can then be manufactured.

Here will be described how to mount the pedestrian airbag device M4 on the vehicle V1. First of all, the airbag 246 is folded in the bellows shape or the like and is then suitably wrapped with the collapse preventing breakable wrapping member.

After the airbag 246 is completely folded, the inlet portions 254 and 254 are pulled out, and the two left and right ends of the inflator 240 held on the holding portion 241a of the bracket 241 are inserted into the inlet portions 254 and 254. After this, the clamps 244 are used to connect the two left and right ends of the inflator 240 to the inlet portions 254 and 254. Then, the bolts 262 are inserted into the mounting holes 256a of the individual mounting members 256 of the airbag 246. Then, while the individual bolts 242 and 262 being inserted into the insertion holes 236a of the bottom wall portion 236 so that they may be protruded from the inner side to the outer side of the case 234, the folded airbag 246 and the inflator 240 are housed in the case 234. After this, the nuts 243 and 263 are fastened on the individual bolts 242 and 262 protruding from the insertion holes 236a so that the airbag 246 and the inflator 240 can be housed and fixed in the case 234.

Then, the cowl louver 218 having the weather strips 31 and 231 assembled therewith is assembled with the cowl panel 13, and the individual brackets 237 of the case 234 are fixed on the cowl panel 13 by means of the bolts 238. Thus, the airbag device M4 can be mounted on the vehicle V1.

Here, at the time of mounting the airbag device M4 on the vehicle V1, the not-shown airbag activating lead wire is connected with the inflator 240 through the not-shown hole formed in the case 234.

Moreover, the drive motors or the like of the wipers 11 are mounted before the airbag device M4 is mounted on the vehicle V1, and the arms of the wipers 11 and the hood panel 3 and so on are mounted on the vehicle V1 after the airbag device M4 is mounted on the vehicle V1.

If the activation signal is inputted to the inflator 240 after the pedestrian airbag device M4 is mounted on the vehicle V1, the inflator 240 is activated to discharge the inflating gas. Then, the airbag 246 is inflated by admitting the inflating gas from the inlet portions 254 and 254 into the inflating portion 248. Therefore, the door portion 225 of the cowl louver 218 is pushed by the airbag 246, breaking the break-away portion 223 on the peripheral edge. Then, the door portion 225 is opened on the hinge portion 224 to the rear so that the airbag 246 expands outward.

Figure 32:
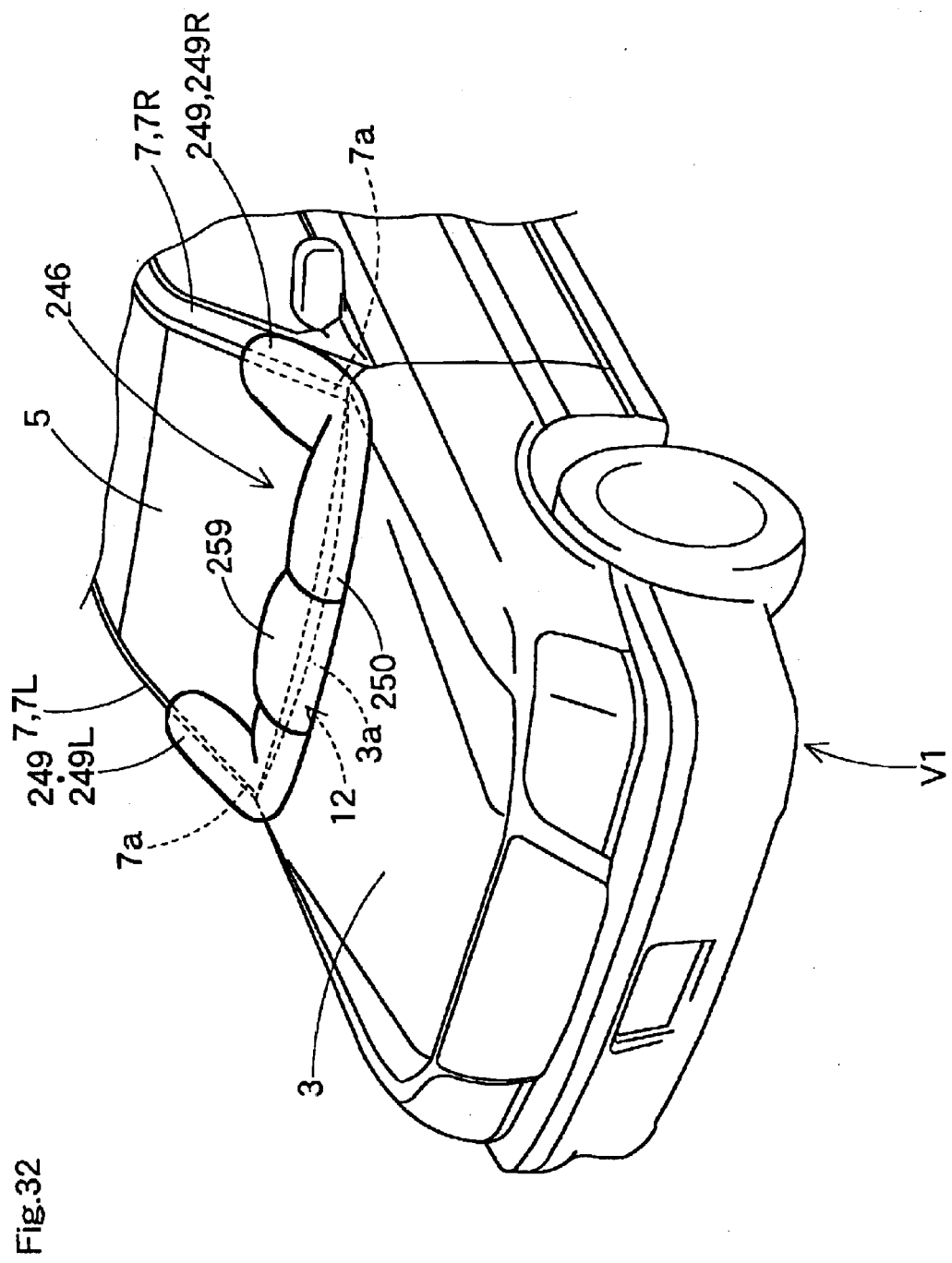
FIG. 32 is a perspective view of the vehicle at the time when the airbag in the pedestrian protecting device of the fourth embodiment has completed its inflation.

In the pedestrian airbag device M4 of the fourth embodiment, moreover, when the airbag 246 completes its expansion, the pillar cover portions 249L and 249R cover the front faces of the front pillars 7L and 7R, and the louver cover portion 250 covers the cowl louver 218 near the front of the lower end of the front windshield 5, as shown in FIG. 32.

Figure 33:
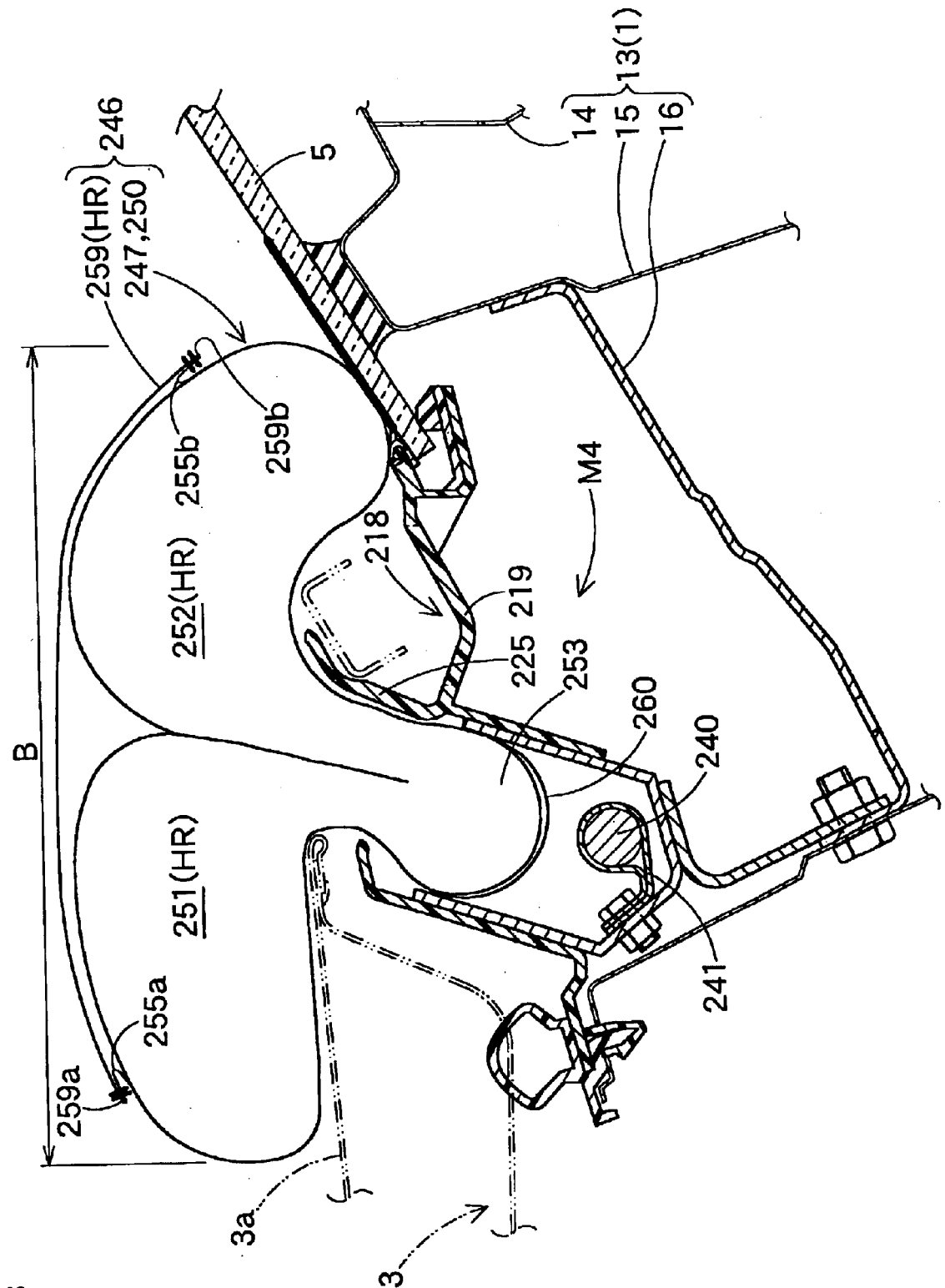
FIG. 33 is a vertical section at the time when the airbag in the pedestrian protecting device of the fourth embodiment mounted on the vehicle has completed its inflation in the vehicular longitudinal direction.

At this time, in the airbag 246 of the embodiment, the louver cover portion 250 for covering the cowl louver 218 is provided with the height restricting means HR capable of suppressing the height size when expanding, as shown in FIG. 33. Specifically, the louver cover portion 250 after completion of the expansion is suppressed in its height by the height restricting means HR. In this way, the lower cover portion 250 can easily retain its vehicular longitudinal width size B with ease.

Specifically, the louver cover portion 250 is caused, upon completion of the expansion, to enlarge its width B in the longitudinal direction by the height restricting means HR while being suppressed in its height. Therefore, it is possible to minimize the increase in the volume of the airbag 246.

In the pedestrian airbag device M4 of the fourth embodiment, therefore, the airbag 246 can cover the cowl louver 218 widely in the vehicular longitudinal direction, while being suppressed from increasing its volume, thereby protecting the pedestrian properly against the cowl louver 218.

Especially in the fourth embodiment, at completion of the expansion of inflation of the airbag 246, the two cylindrical portions 251 and 252 juxtaposed in the vehicular longitudinal direction to act as the height restricting means HR are so arranged close to each other in the longitudinal direction by the cover cloth 259 acting as the height restricting means HR as to cover the cowl louver 218. Specifically, not a single cylindrical portion is expanded or inflated, but a plurality of (two in the embodiment) cylindrical portions 251 and 252 are juxtaposed in the longitudinal direction and are arranged closer to each other in the vehicular longitudinal direction by the cover cloth 259. Therefore, the cylindrical portions 251 and 252 neither leave each other nor increase their heights but can cover the cowl louver 218 with the enhanced cushioning effect.

As a result, the fourth embodiment can easily cover the cowl louver 218 without increasing the volume of the airbag 246 while suppressing the height and enlarging the vehicular longitudinal width, even if the airbag 246 is manufactured by the hollow-weaving method by which height restricting internal tethers in the airbag 246 are difficult to construct. The airbag 246 can naturally be easily manufactured if it is cut to a predetermined shape after being woven, because it is formed by hollow-weaving.

Here, the fourth embodiment has been exemplified by the construction of the airbag 246, in which the cylindrical portions 251 and 252 and the cover cloth 259 acting as the height restricting means HR are arranged only near the vehicular transverse center of the roof cover portion 250. In another construction of the airbag, however, the two cylindrical portions may be so arranged substantially entirely of the roof cover portion as to connect the pillar cover portions so that the cover cloth may cover the roof cover portion generally throughout the transverse direction.

Moreover, the fourth embodiment has been exemplified by the construction of the airbag 246, in which the cover cloth 259 is made separate of the main body 247. In another construction of the airbag, however, the cover cloth may be hollow-woven integrally with the main body. In this modification, the cover cloth is hollow-woven integrally with the main body in that one edge in the longitudinal direction is connected to the main body. After the main body is woven, moreover, the other end side of the cover cloth is sewn to the other end side of the main body.

Moreover, the fourth embodiment is exemplified by the construction of the airbag 246, which is manufactured by the hollow-weaving method. In the airbag device M5 shown in FIGS. 34 to 36, however, an airbag 266 may be of the sewn type, in which tethers 277, 277 and 278 are arranged as the height restricting means HR. Here, this airbag device M5 has a construction similar to that of the aforementioned airbag device M4 excepting the airbag 266. Therefore, the description of the common members will be omitted, designating them by the same reference numerals.

This airbag 266 is formed by sewing the peripheral edges of two base cloths 267 and 268 with sewing thread 275. Then, the tethers 277, 277 and 278 are sewn at the two vertical ends between the peripheral edges of the base cloths 267 and 268 when these base cloths 267 and 268 are sewn to each other. Here, the base cloths 267 and 268 and the tethers 277 and 278 are formed of flexible woven fabric of polyester yarns, polyamide yarns or the like.

Further, the airbag 266 is provided with two left and right side pillar cover portions 269 and 269 capable of covering the front pillars 7L and 7R (although not shown), and a louver cover portion 270 for connecting the lower ends of the pillar cover portions 269 and 269 so as to cover the cowl louver 218. In the peripheral edge of the airbag 266, moreover, there are formed L-shaped or inverted L-shaped inlet portions 271, which can let the inflating gas therein. Each of the inlet portions 271 admits the inflating gas from the inflator 240 into the airbag 266, and is provided with an opening 271a at its leading end. The individual inlet portions 271 are mounted on the left and right ends of the inflator 240 and are connected to the inflator 240 by means of the clamps 244.

Moreover, the airbag 266 is provided on its lower edge side with four mounting members 273 having mounting holes 273a. Into the individual mounting holes 273a toward the center, there are inserted the bolts 242 which extend from the bracket 241 for holding the inflator 240. In the airbag 246 of the embodiment, moreover, the individual mounting members 273 on the left and right sides allow insertion of the bolts 262 (although not shown) through mounting holes 273a.

Figure 34:
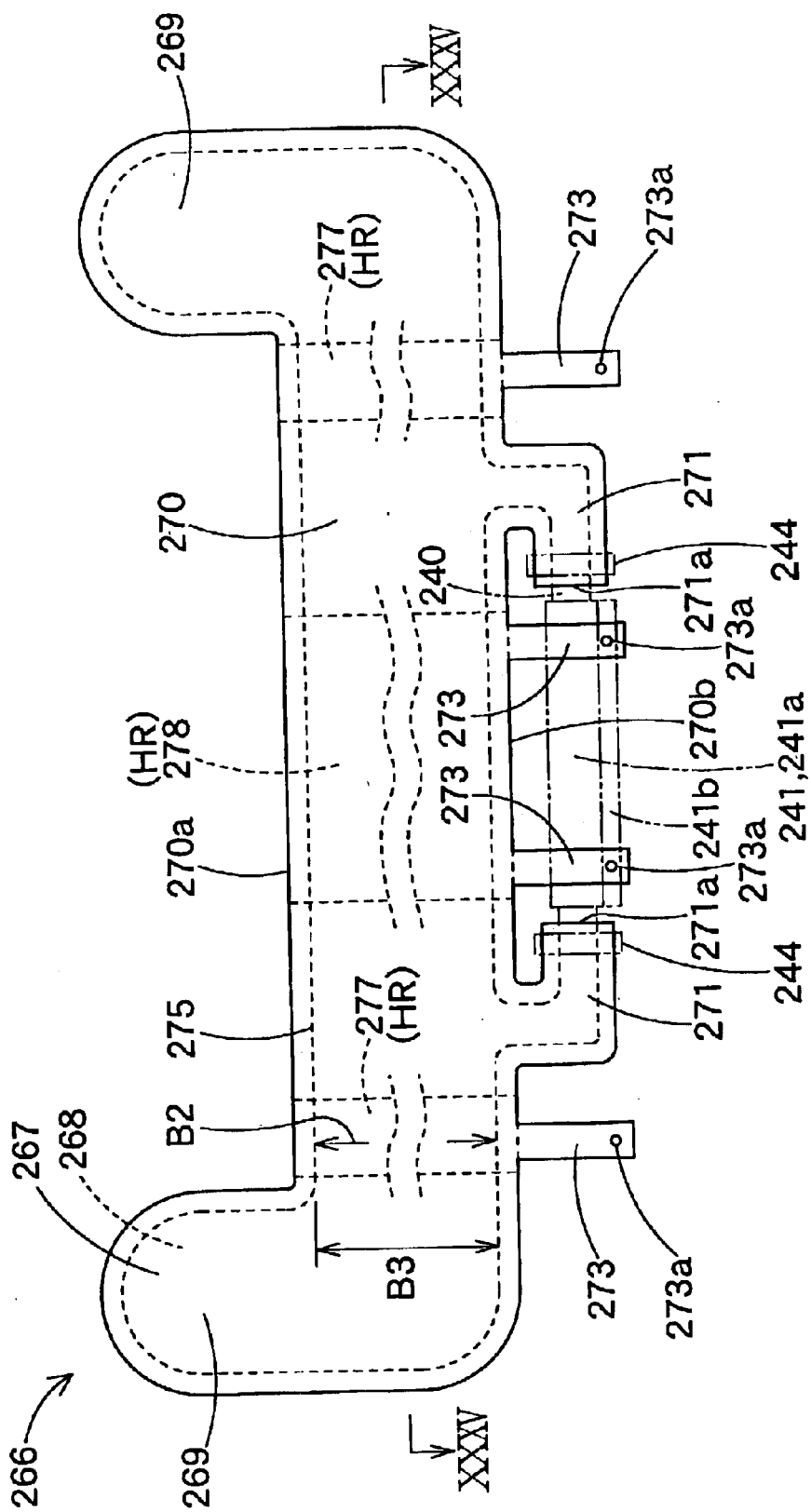
FIG. 34 is a front elevation showing an airbag according to a modification of the fourth embodiment.
Figure 35:
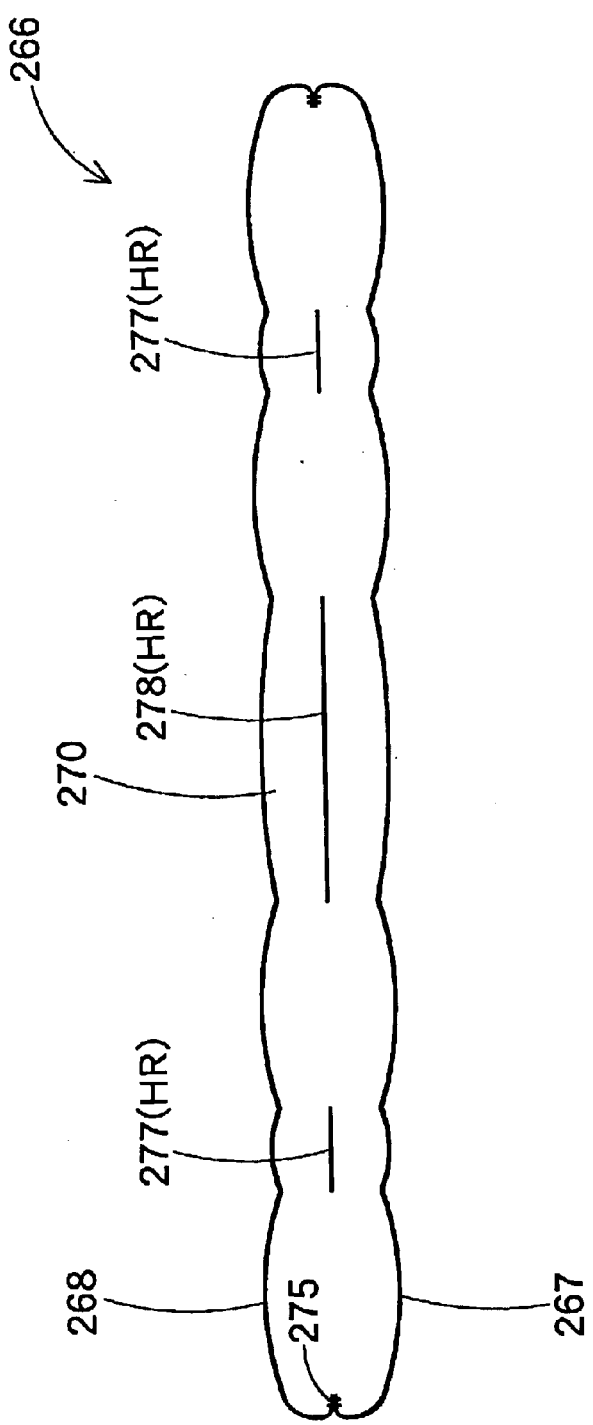
FIG. 35 is a transverse section along line XXXV—XXXV of the airbag shown in FIG. 34 when inflating.

The individual tethers 277 and 278 are arranged respectively near the left and right ends and near the center of the louver cover portion 270. Here, FIG. 34 is a front elevation of the airbag 266, in which the base cloths 267 and 268 are expanded flat. The length B2 of the individual tethers 277 and 278 is set shorter than the vertical size B3 between the upper edge portion 270a and the lower edge portion 270b of the louver cover portion 270 which is expanded flat by overlapping the base cloths 267 and 268 as to regulate the height of the louver cover portion 270 at the time when the airbag 266 is expanded (FIG. 34).

Like the airbag 246 of the fourth embodiment, the airbag 266 is connected to the inflator 240, after being folded in the bellows shape or the like, and is mounted on the vehicle.

Figure 36:
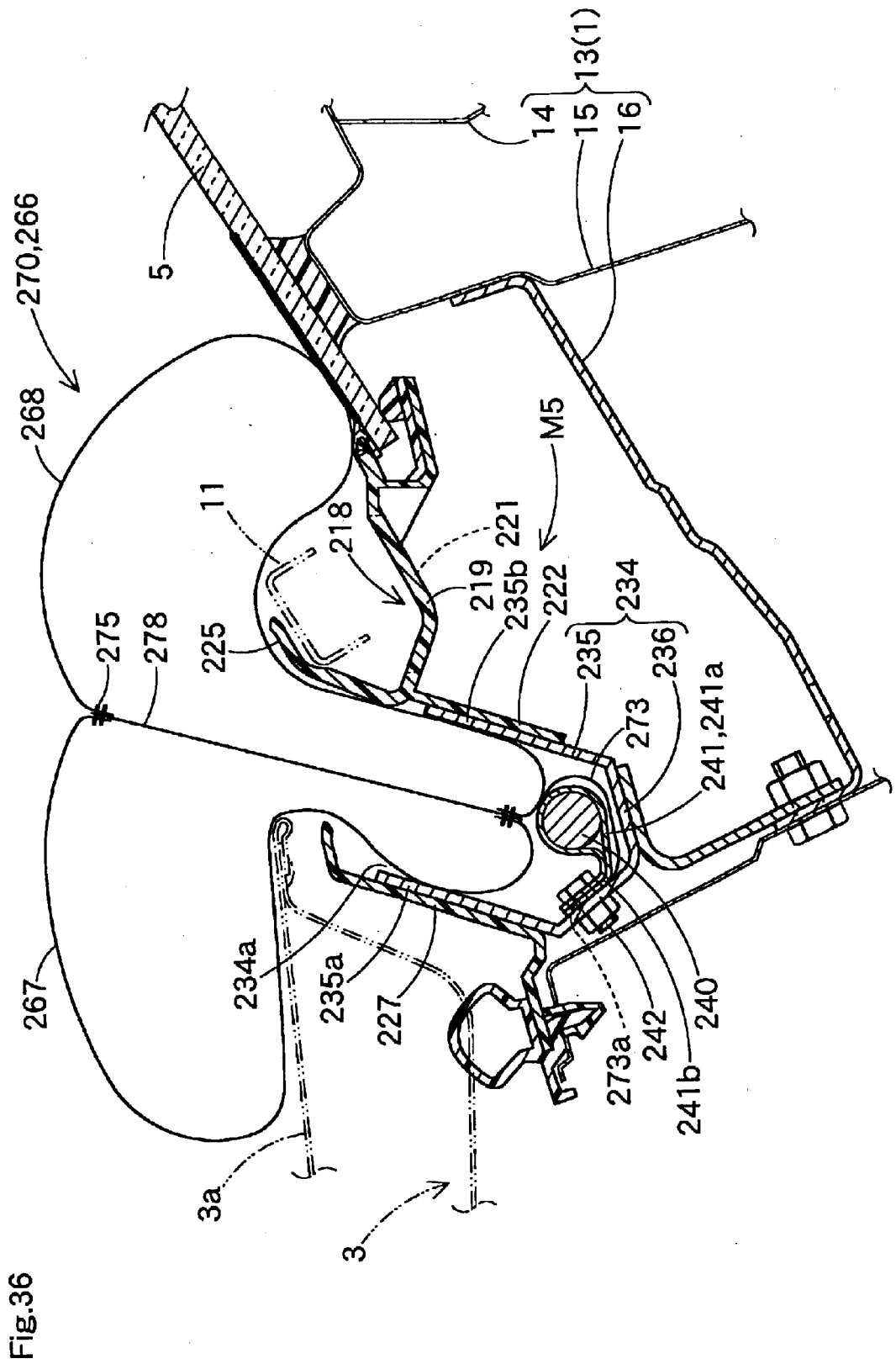
FIG. 36 is a vertical section of the airbag shown in FIG. 34 mounted on the vehicle when it has completed its inflation in the vehicular longitudinal direction.

At the expansion time, this airbag 266 is also suppressed in its height by the tethers 277 and 278 comprising the height restricting means HR, as shown in FIG. 36, so that the width in the longitudinal direction can be easily realized. Further, the louver cover portion 270 for covering the cowl louver 218 in the airbag 266 is suppressed in height to allow greater width in the longitudinal direction at completion of the expansion by the tethers 277 and 278 of the height restricting means HR, so that increase in volume can be minimized.

In this pedestrian airbag device M5, the airbag 266 can cover the cowl louver 218 widely in the longitudinal direction while suppressing increase in the volume, so that it can protect the pedestrian properly from the cowl louver 218.

Here will be described a pedestrian protecting device PM of the sixth embodiment, which can achieve the fourth object of the present invention. A vehicle V2 for mounting the pedestrian protecting device PM of the sixth embodiment has a construction similar to that of the vehicle V1 for mounting the foregoing airbag device M1 excepting the hood panel 3A, wipers 319 and cowl 325. Therefore, the description of the common members will be omitted, designating them by the same reference numerals.

As shown in FIGS. 37 to 40, the pedestrian protecting device PM of the sixth embodiment is provided with: the rear edge vicinity portion 3a of the hood panel 3A of the vehicle V2; an airbag device AS arranged on the lower side of the hood panel rear edge 3a; a cowl louver 332 arranged at the portion of the cowl 325 between the hood panel 3A and the front windshield 5; and the wipers 319 arranged in the cowl 325, which have arms 320 arranged on the upper side of the cowl louver 332. And, the airbag device AS is provided with: an airbag 366; the inflator 240 for feeding the airbag 366 with the inflating gas; a case 352 for housing the folded airbag 366 and an inflator 240; and an airbag cover 337 for covering the folded airbag 366. Here, the inflator 240 has a construction similar to that of the inflator 240 in the aforementioned airbag device M4. Therefore, the description of the common members will be omitted, designating them by the same reference numerals.

In the case of the embodiment, the cowl 325 is provided with a highly rigid cowl panel 326 provided toward the body 1 side, and the cowl louver 332 above the cowl panel 326. In the case of the embodiment, moreover, the airbag cover 337 is formed integrally with the cowl louver 332. Moreover, the cowl louver 332 is arranged above the cowl panel 326. The case 352 is fixed on the cowl panel 326.

In the case of the shown embodiment, the cowl panel 326 is constructed by welding three steel sheet panel members 327, 328 and 329. In the cowl panel 326, moreover, there are arranged a passage 326a for guiding the air A flowing in from the side of the cowl louver 332 into the vehicular compartment, and a passage 326b for causing the rainwater flowing in from the cowl louver 332 to drop from the two left and right edges of the vehicle V2.

Figure 38:
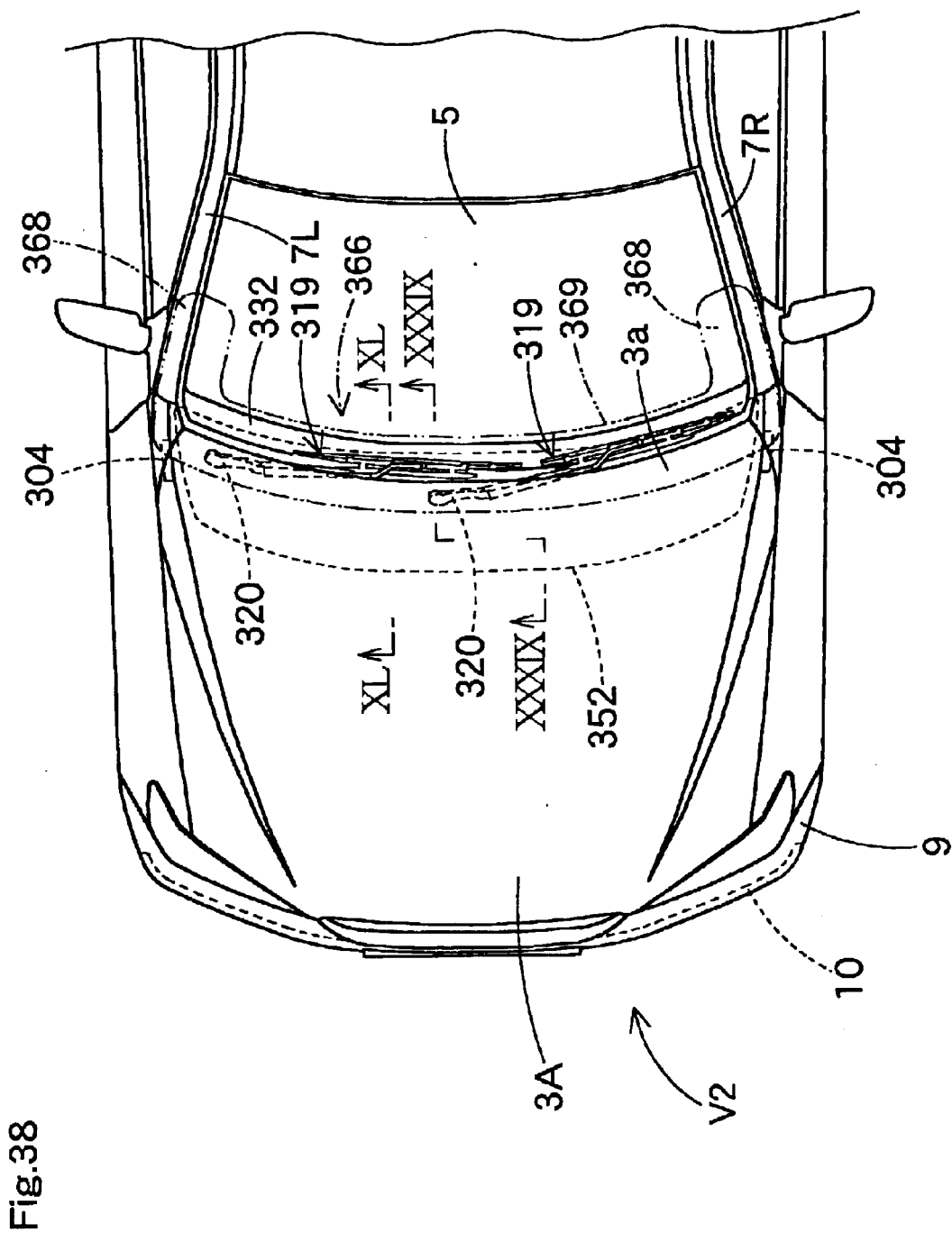
FIG. 38 is a top plan view of the vehicle on which the pedestrian protecting device of the fifth embodiment is mounted.
Figure 43:
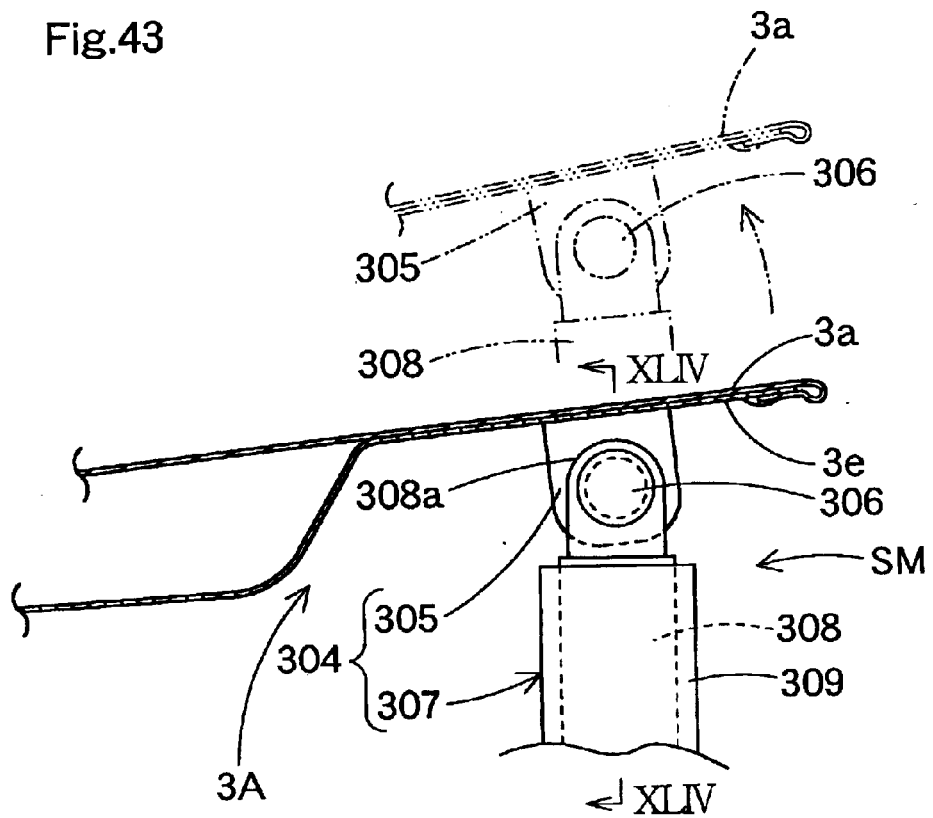
FIG. 43 is a schematic diagram showing the joined state of a hood panel and a body side in the pedestrian protecting device of the fifth embodiment.
Figure 44:
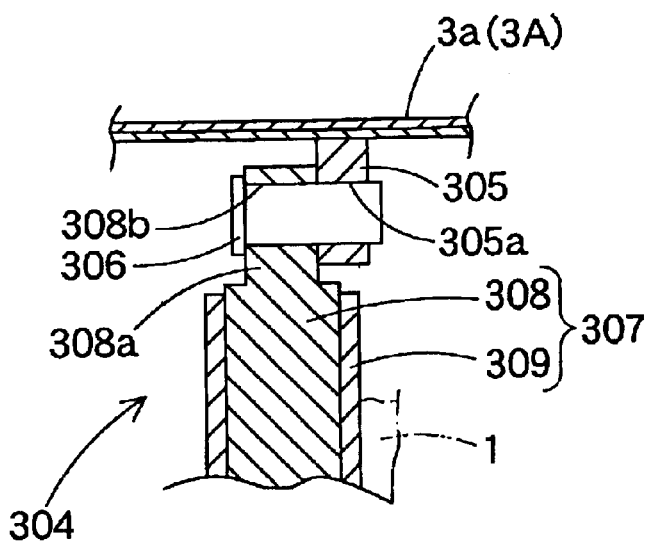
FIG. 44 is a schematic section showing the jointed state of the hood panel and the body side in the pedestrian protecting device of the fifth embodiment, and presents a section of portion XLIV—XLIV of FIG. 43.

As shown in FIG. 38, the hood panel 3A is fixed at its rear end 3a on the body 1 side of the vehicle V2 by hinges 304 and 304, which are arranged near the left and right ends of the rear edge 3a. Each hinge 304 is constructed, as shown in FIGS. 43 and 44, of a bearing portion 305, a body side member 307 and a rod-shaped pin 306. The bearing portion 305 is arranged at a lower side portion 3e of the hood panel rear edge 3a. The body side member 307 is arranged on the side of the body 1. The pin 306 connects the bearing portion 305 and the body side member 307 rotatably. The bearing portion 305 is formed generally into a disc shape. Further, the bearing portion 305 is formed to protrude downward from the lower side portion 3e of the hood panel rear edge 3a. Near the center of the bearing portion 305, there is formed an insertion hole 305a for inserting the pin 306.

The body side member 307 is provided with a slide mechanism SM, which moves to the upper side when the hood panel rear end 3a is pushed by the airbag 366 being expanded and inflated. The body side member 307 is provided with a rod-shaped main portion 308, and an outer cylinder portion 309 mounting the main portion 308. The outer cylinder portion 309 is fixed at its lower end on the body 1 side. At the upper portion of the body main portion 308, a generally disc-shaped head portion 308a having an insertion hole 308b for inserting the pin 306 is arranged. In the case of the embodiment, the hinge 304 is used in such a state when mounting that the main portion 308 is held near its head portion 308a near the upper end of the outer cylinder portion 309 and is kept from upwardly moving. When a predetermined upward pushing force acts on the lower face side portion 3e of the rear edge 3a of the hood panel 3A as the airbag 366 is expanded and inflated, the main portion 308 and the outer cylinder portion 309 are released from their connected state. Then, the main portion 308 slides upward relative to the outer cylinder portion 309 so that the rear end 3a of the hood panel 3A is pushed upward (double-dotted lines in FIG. 43).

The cowl louver 332 is made of a synthetic resin. As shown in FIGS. 38 to 41, the cowl louver 332 is so arranged in a generally crescent space from the lower side of the rear edge 3a of the hood panel 3A to the front edge of the front windshield 5, extending to the vicinities of the left and right edges of the vehicle V2. In the case of the embodiment, the cowl louver 332 is provided with a main portion 333 and the airbag cover portion 337 for covering the airbag 366. The main portion 333 is arranged generally in the horizontal direction between the hood panel rear edge 3a and the front windshield 5. The airbag cover portion 337 is arranged by the front edge of the main portion 333.

This main portion 333 has a crescent top plan view. On the rear edge 333a of the main portion 333, there is integrally arranged weather strip 31 on which is fitted the lower edge of the front windshield 5. In the main portion 333, there are formed a plurality of holes 335 for channeling the rainwater or the like to flow to the side of the cowl panel 326. In the main portion 333, moreover, there are formed two through holes 334 for extending the later-described joint shaft portions 323 of the wipers 319.

Figure 39:
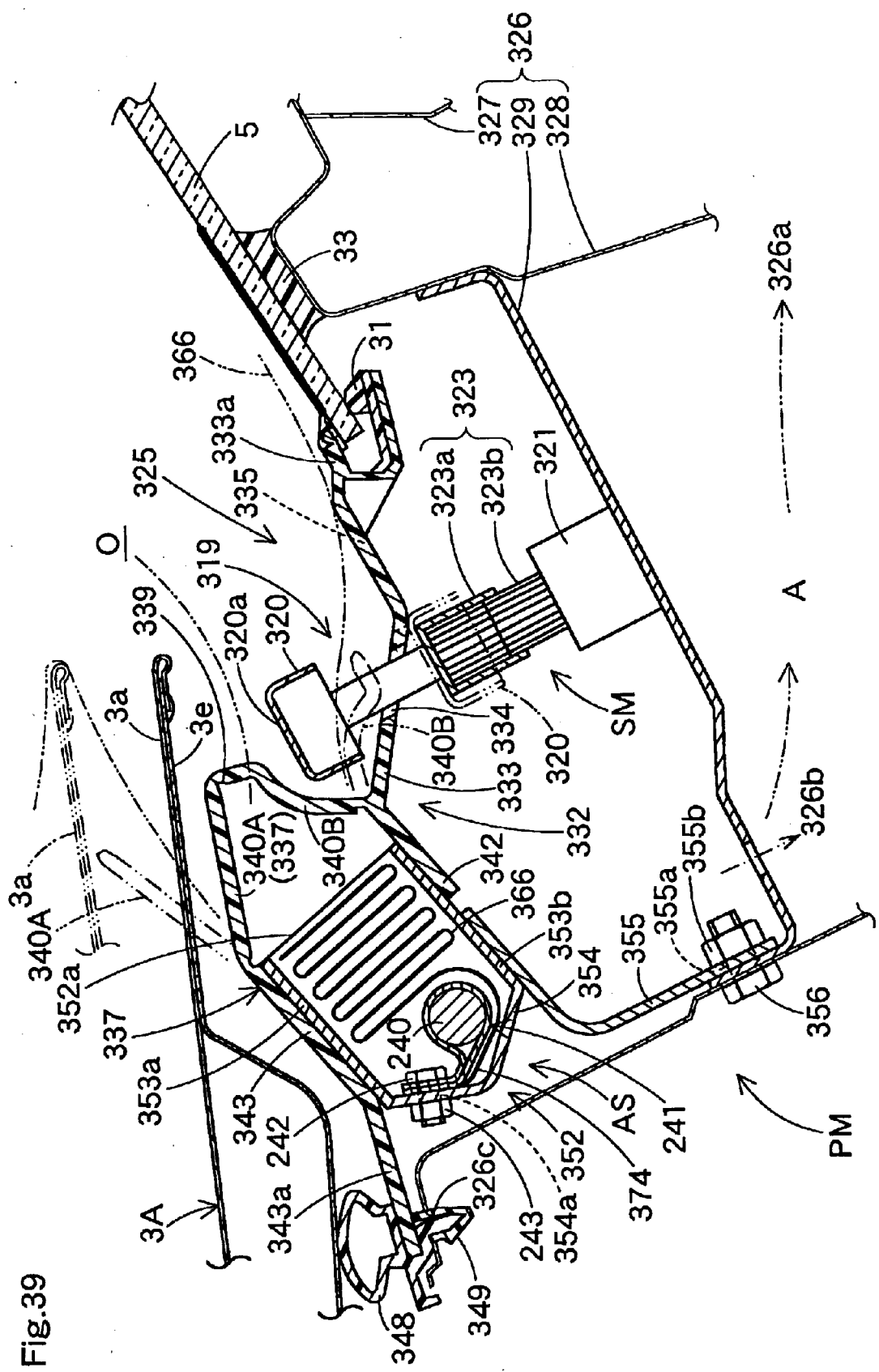
FIG. 39 is a schematic vertical section showing the pedestrian protecting device of the fifth embodiment in the vehicular longitudinal direction along line XXXIX—XXXIX of FIG. 38.
Figure 40:
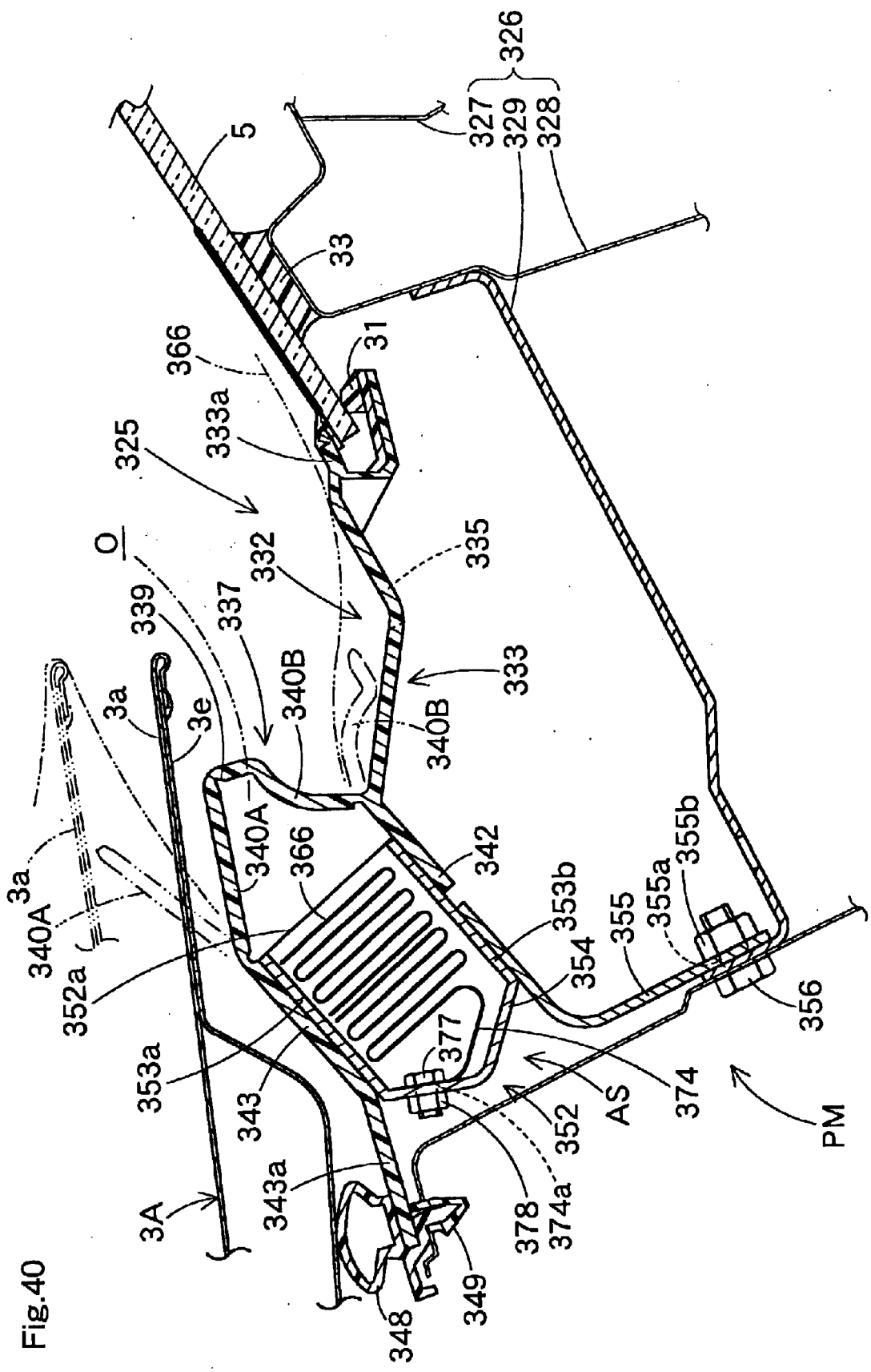
FIG. 40 is a schematic vertical section showing the pedestrian protecting device of the fifth embodiment in the vehicular longitudinal direction along line XL—XL of FIG. 38.

As shown in FIGS. 39 and 40, the airbag cover portion 337 is provided with a ceiling wall portion 338, and side wall portions 342 and 343 extending from the vicinity of the front edge and the vicinity of the rear edge of the ceiling wall portion 338. The ceiling wall portion 338 covers the upper side and the rear side of the later-described opening 352a of the case 352. The side wall portions 342 and 343 are individually arranged to adjoin the later-described peripheral wall portion 353 of the case 352. The ceiling wall portion 338 is formed into a generally Japanese letter "コ"-shaped section protruding toward the vehicular rear side. Further, a break-away portion 339 is arranged near the upper end of the ceiling wall portion 338 protruding to the vehicular rear side. The break-away portion 339 is formed into a line in the transverse direction. The portions in the front and the rear of the break-away portion 339 in the ceiling wall portion 338 provide door portions 340 and 340. These individual door portions 340 and 340 are opened toward the vehicular front and rear sides by the push of the airbag 366 when expanding. When the door portions 340 and 340 are opened, moreover, there is formed an opening O for protruding the airbag 366. The door portion 340A on the front side is arranged below the lower side portion 3e of the hood panel rear edge 3a. Specifically, the door portion 340A pushes up, together with the expanding airbag 366, the lower face side portion 3e of the hood panel rear edge 3a. The door portion 340B on the rear side is arranged above the arm 320 of the wiper 319. Specifically, the door portion 340B pushes down, together with the expanding airbag 366, the arm 320 of the wiper 319.

The side wall portion 343 is provided on its lower edge with a flange portion 343a, which is made by bending the side wall toward the front. With this flange portion 343a, there is assembled a weather strip 348 for sealing the lower face 3b near the rear edge 3a of the hood panel 3A. This weather strip 348 is arranged to be forced to contact in a line extending in substantially the entire transverse direction near the rear end 3a of the hood panel 3A. On the lower portion of the weather strip 348, moreover, there are mounted a plurality of (five in the embodiment) clips 349, which are arranged at intervals in the transverse direction. The individual clips 349 are retained in assembly holes 326c of the cowl panel 326.

Further, the cowl louver 332 is mounted on the cowl panel 326 like the cowl louver 218 in the aforementioned airbag device M4.

Two wipers 319 are arranged on the left and right, as shown in FIGS. 38 and 39. Each wiper 319 comprises an arm 320, a drive motor 321, and the joint shaft portion 323 for connecting the arm 320 and the drive motor 321. The arm 320 is arranged on the upper side of the cowl louver 332. The drive motor 321 is arranged in the cowl panel 326. The arm 320 is housed in its unused state below the hood panel rear edge 3a. In the embodiment, moreover, there is arranged between the hood panel rear edge 3a and the arm 320 the aforementioned protruding opening O, from which the airbag 366 protrudes when inflated (FIGS. 39 and 40). The joint shaft portion 323 provides the slide mechanism SM, in which the arm 320 moves downward when pushed by the expanding airbag 366. The joint shaft portion 323 is provided with an upper shaft 323a and a lower shaft 323b. The lower shaft 323b is connected to the drive motor 321 and is formed into a generally cylindrical shape. The upper shaft 323a is connected to the arm 320. Moreover, the upper shaft 323a is formed into a generally cylindrical shape having an opened lower end and is fitted from its lower end on the lower shaft 323b. The inner circumference of the upper shaft 323a and the outer circumference of the lower shaft 323b are so corrugated as to transmit the rotation in the circumferential direction, thereby transmitting the turning torque from the drive motor 321 to the arm 320.

Figure 45:
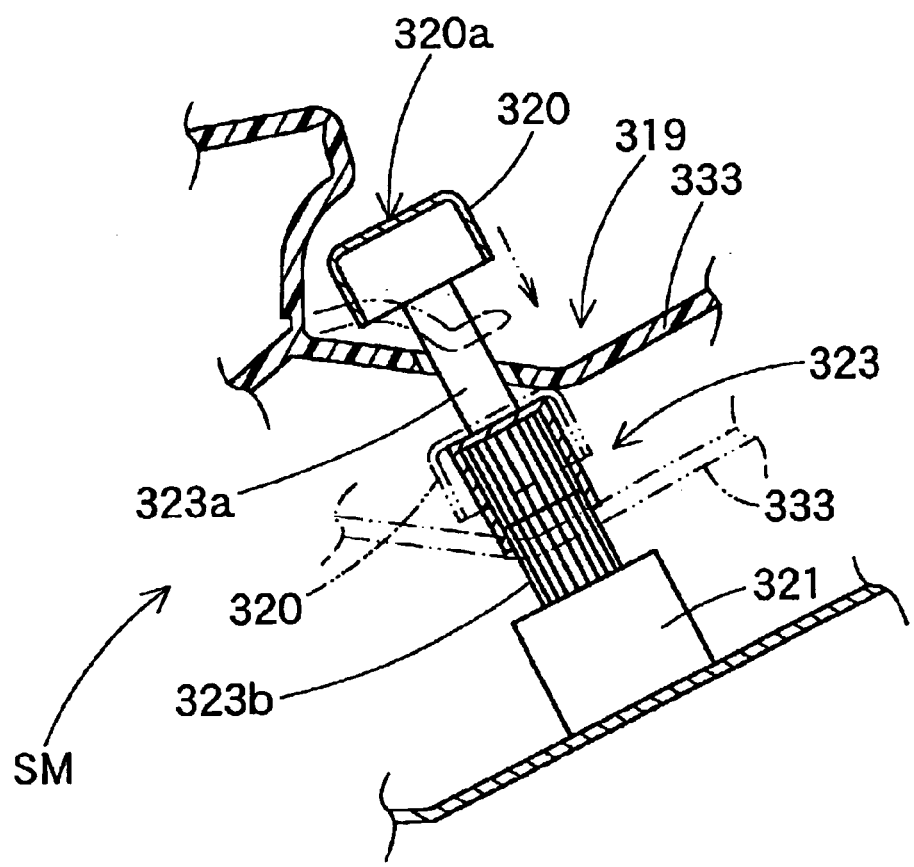
FIG. 45 is an enlarged schematic view showing the location of a wiper in the pedestrian protecting device of the fifth embodiment.

When mounting this embodiment, the upper shaft 323a is connected from its lower end to the upper end of the lower shaft 323b. In short, the upper shaft 323a drives the arm 320 while being prevented from moving downward. When a predetermined downward pushing force acts on the side of the upper face 320a of the arm 320 as the airbag 366 is expanded and inflated, the upper shaft 323a and the lower shaft 323b are released from their connected state. Then, the upper shaft 323a slides downward relative to the lower shaft 323b. As a result, the arm 320 of the wiper 319 is pushed downward together with the main portion 333 of the cowl louver 332 arranged around the wiper 319 (double-dotted lines in FIG. 45).

Figure 41:
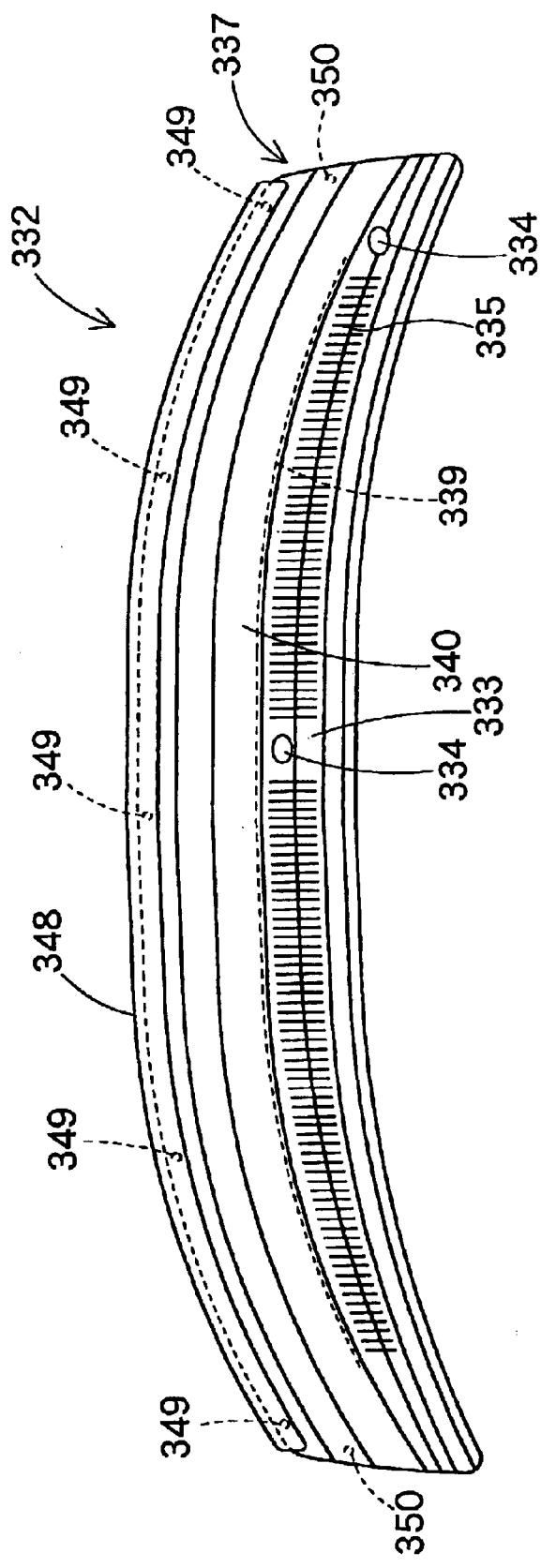
FIG. 41 is a top plan view of a cowl louver to be used in the pedestrian protecting device of the fifth embodiment.
Figure 42:
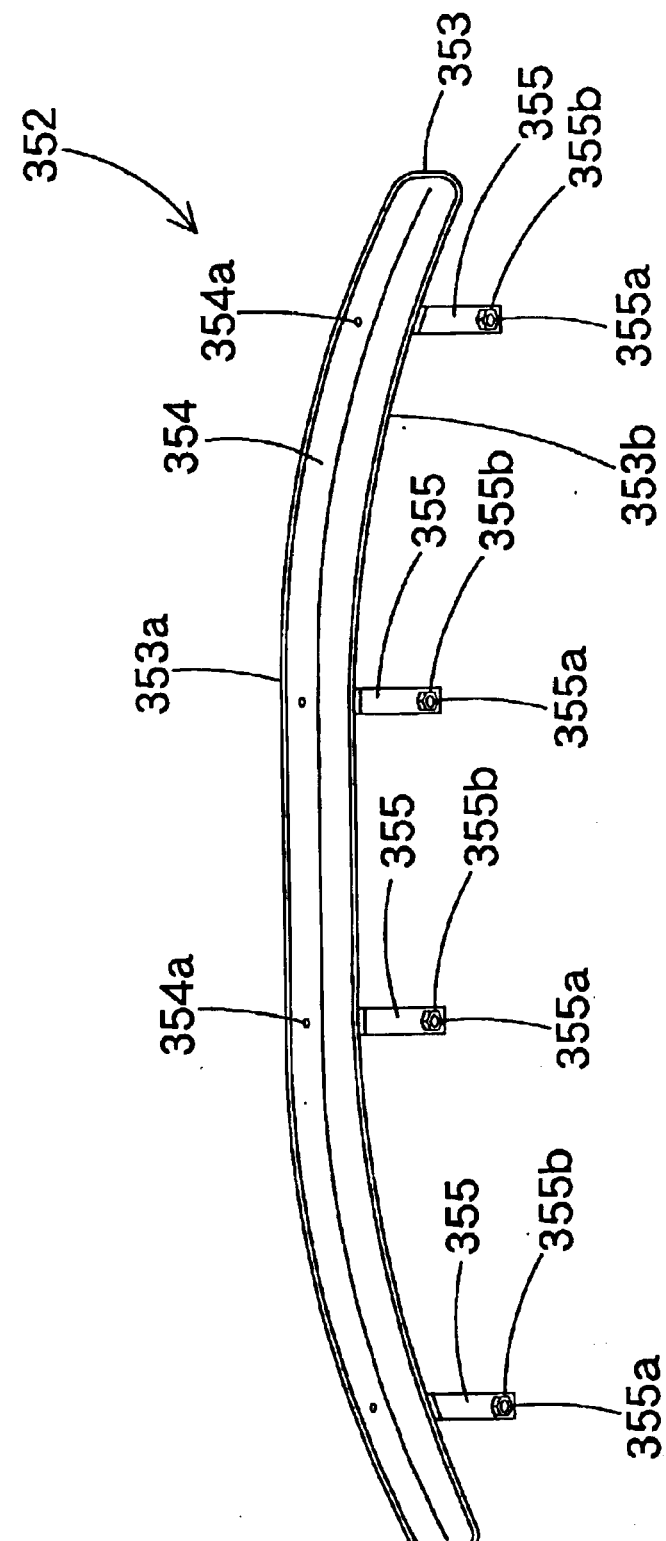
FIG. 42 is a top plan view of a case to be used in the pedestrian protecting device of the fifth embodiment.

The case 352 is made of a sheet metal. As shown in FIGS. 39 to 41, the case 352 is formed into a box shape having the peripheral wall portion 353 and a bottom wall portion 354 for closing the lower portion of the peripheral wall portion 353. This peripheral wall portion 353 is provided with the opening 352a below the door portions 340 and 340. The front wall portion 353a and the rear wall portion 353b of the peripheral wall portion 353, confronting each other in the vehicular longitudinal direction, are positioned near their transverse centers toward the front and near their two transverse edges toward the rear. In other words, the front wall portion 353a and the rear wall portion 353b are formed and curved along the front edge of the main portion 333 of the cowl louver 332.

In the bottom wall portion 354, there are formed a plurality of insertion holes 354a. Into these individual insertion holes 354a are inserted bolts 377 and 242 for mounting the airbag 366 and the inflator 240. On the lower face of the rear wall portion 353b, moreover, there are fixed a plurality of (four in the embodiment) brackets 355 for mounting the case 352 on the cowl panel 326. The individual brackets 355 are provided with insertion holes 355a for inserting bolts 356, and nuts 355b fixing the peripheral edges of the insertion holes 355a. The nuts 355b can fasten the bolts 356. In other words, the case 352 is mounted and fixed on the cowl panel 326 by fastening the bolts 356 in the nuts 355b through the insertion holes 326d of the cowl panel 326 and through the insertion holes 355a.

Figure 37:
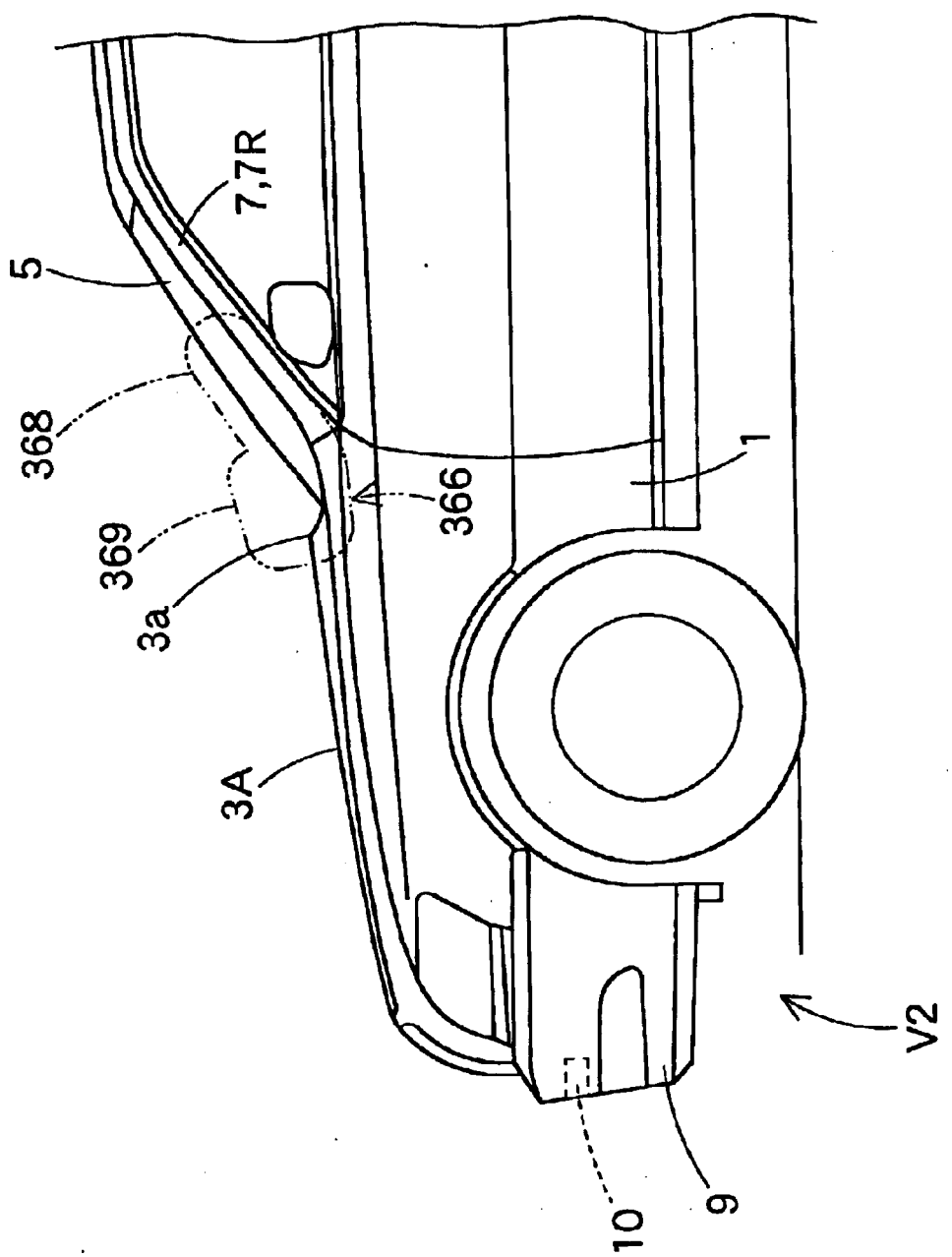
FIG. 37 is a side elevation of a vehicle on which a pedestrian protecting device according to a fifth embodiment is mounted.
Figure 46:
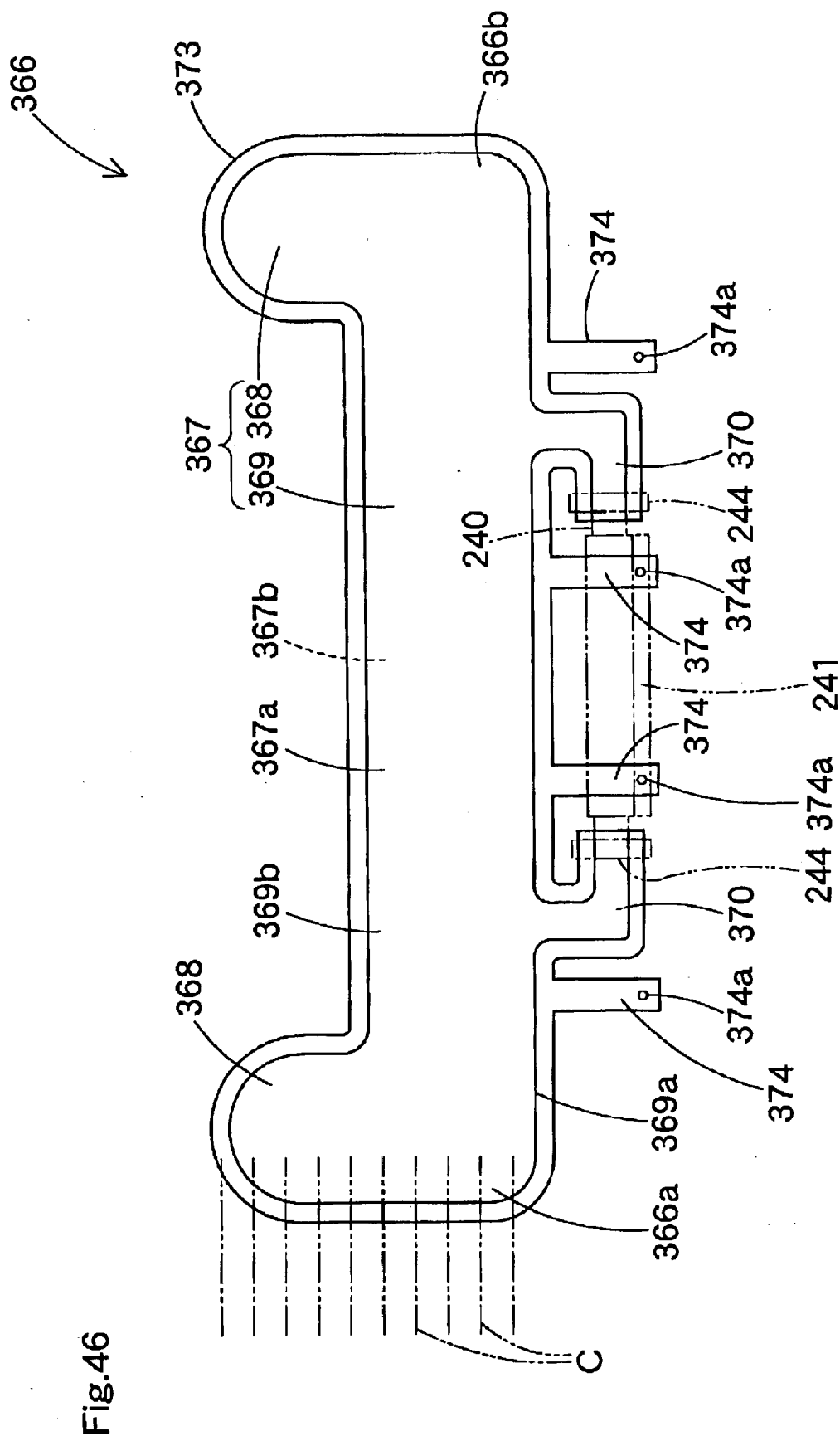
FIG. 46 is a top plan view showing only the airbag to be used in the pedestrian protecting device of the fifth embodiment when inflated.

As shown in FIGS. 37, 38 and 46, the airbag 366 includes an inflating portion 367 to be inflated by admitting the inflating gas, and a peripheral edge portion 373 arranged around the inflating portion 367 but in which the inflating gas does not enter. The inflating portion 367 is inflated, if the inflating gas enters, separating the front wall portion 367a and the rear wall portion 367b. Further, the airbag 366 has identical plane shapes at its front wall portion 367a and its rear wall portion 367b. In other words, the airbag 366 is of such a flat airbag type can be expanded in a plane if the wall portion 367a and the wall portion 367b are overlapped one on the other. In the case of the embodiment, the airbag 366 is manufactured by hollow-weaving polyester yarns, polyamide yarns or the like.

Here, at completion of the expansion of the airbag 366, the rear wall portion 367b largely faces to the side of the vehicle V2. On the other hand, the front wall portion 367a largely faces to the free space side removed from the vehicle V2.

As shown in FIGS. 37, 38 and 46, moreover, the inflating portion 367 of the airbag 366 takes such a shape at completion of the expansion in the non-mounted state as formed into a transversely widened general U-shape in a top plan view. Vertical inflating portions 368 and 368 arranged on the two left and right sides cover the front faces of the left and right front pillars 7L and 7R when the airbag 366 completes its expansion. A lateral inflating portion 369 is arranged to connect the lower end sides of the vertical inflating portions 368 and 368. This lateral inflating portion 369 inflates substantially almost all along the transverse direction during expansion of the airbag 366 and covers the vicinity above the cowl louver 332 from the vicinity of the lower end front face of the glass windshield 5 to the vicinity of the upper face 3c of the rear end 3a of the hood panel 3A.

At the front edge 369a of the lateral inflating portion 369 (or on the lower side at completion of the inflation in the mounted state), moreover, there are formed inlet portions 370 and 370, which are extended forward and bent to approach each other. These inlet portions 370 admit the inflating gas from the inflator 240 into the inflating portion 367 of the airbag 366. The individual inlet portions 370 are mounted on the two left and right ends of the inflator 240 and are connected to the inflator 240 by means of the clamp 244.

At the portion of the peripheral edge portion 373 on the side of the front edge 369a of the lateral inflating portion 369, moreover, there are formed four mounting members 374, which are extended in a sheet shape. In the individual mounting members 374, there are formed mounting holes 374a. In the two mounting members 374 on the central side are inserted the bolts 242 through the mounting holes 374a for mounting the bracket 241 on the case 352. Then, the individual mounting members 374 are mounted together with the bracket 241 on the bottom wall portion 354 of the case 352 when the bolts 242 are fastened by the nuts 243 (FIG. 39). Moreover, the mounting members 374 on the two left and right sides are mounted on the bottom wall portion 354 of the case 352 by fastening the bolts 377 inserted into the mounting holes 374a and through the insertion holes 354a of the bottom wall portion 354, on nuts 378 (FIG. 40).

Here will be described how to mount the pedestrian protecting device PM of the sixth embodiment on the vehicle V2. First of all, the airbag 366 is folded like the airbag 56 of the foregoing airbag device M1. After the airbag 366 is completely folded, the airbag 366 is suitably wrapped with the collapse preventing breakable wrapping member.

After this, the inlet portions 370 of the airbag 366 and the inflator 240 are connected, as in the aforementioned airbag device M4. Then, the bolts 242 of the bracket 241 are inserted into the mounting holes 374a of the individual mounting members 374 near the center of the airbag 366. At the same time, the bolts 377 are inserted into the mounting holes 374a of the individual mounting members 374 on the left and right sides of the airbag 366. Next, the folded airbag 366 and the inflator 240 are housed in the case 352 by inserting the individual bolts 242 and 377 into the insertion holes 354a of the bottom wall portion 354 so that the bolts 242 and 377 may protrude from the inner side to the outer side of the case 352. When the nuts 243 and 378 are fastened on the individual bolts 242 and 377 protruded from the insertion holes 354a, therefore, the airbag 366 and the inflator 240 can be housed and fixed in the case 352.

Then, the drive motors 321 and the joint shaft portions 323 of the wipers 319 are mounted on the cowl panel 326. Moreover, the body side members 307 comprising the hinges 304 are mounted on the predetermined portions of the body 1 side.

After this, the cowl louver 332 having the weather strips 31 and 348 assembled integrally is built into the cowl panel 326. Then, the airbag device AS can be mounted on the vehicle V2 by fastening the individual brackets 355 of the case 352 on the cowl panel 326 by means of the bolts 356.

When the airbag device AS is mounted on the vehicle V2, the airbag activating not-shown lead wire is connected with the inflator 240 through the not-shown hole formed in the case 352.

Then, after mounting the arms 321 of the wipers 319 and the hood panel 3A on the vehicle V2, the pedestrian protecting device PM is mounted on the vehicle V2.

If the activation signal is inputted to the inflator 240 after the pedestrian protecting device PM is mounted on the vehicle V2, the inflating gas is discharged from the inflator 240. And, the airbag 366 is inflated by admitting the inflating gas from the inlet portions 370 and 370. Therefore, the door portions 340 and 340 of the cowl louver 332 are pushed by the airbag 366 to break the break-away portion 339. And, the individual door portions 340 and 340 are opened in the longitudinal direction of the vehicle V2 so that the airbag 366 is expanded and inflated.

In the pedestrian protecting device PM of the sixth embodiment, moreover, when the airbag 366 completes the expansion, the vertical inflating portions 368 and 368 cover the front faces of the front pillars 7L and 7R, and the lateral inflating portion 369 covers the cowl louver 332 at the lower edge of the front windshield 5, as shown by double-dotted lines in FIGS. 37 and 38.

In the pedestrian protecting device PM of the sixth embodiment, moreover, when the housed airbag 366 is expanding, the protruding opening O is arranged below the hood panel rear edge 3a and above the arms 320 of the wipers 319. Even if the arms 320 of the wipers 319 are housed in the unused state below the hood panel rear end 3a, more specifically, the airbag 366 can be protruded from the protruding opening O between the hood panel rear end 3a and the arms 320. Therefore, the airbag 366 can be smoothly expanded and inflated while suppressing the interference between it and the hood panel rear end 3a or the arms 320.

In the pedestrian protecting device PM of the sixth embodiment, therefore, even if the wipers 310 includes the arms 320 housed in their unused state below the hood panel rear end 3a, the airbag 366 can be smoothly expanded and inflated to protect the pedestrian properly.

In the pedestrian protecting device PM of the sixth embodiment, moreover, when the airbag device AS is activated, the expanding airbag 366 pushes the lower face of the rear edge 3a of the hood panel 3A and the upper faces of the arms 320 thereby to activate the slide mechanism SM which is arranged at the portion of the hinges 304 connecting the hood panel rear end 3a to the body 1 and the slide mechanism SM at the wipers 319. In other words, the expanding airbag 366 displaces the hood panel rear end 3a upward, and displaces the arms 320 of the wipers 319 together with the cowl louver 332 downward. In other words, in the pedestrian protecting device PM of the sixth embodiment, the expanding airbag 366 pushes the hood panel rear end 3a and the arms 320 widely apart while protruding from the protruding opening O between the hood panel rear edge 3a and the arms 320. Even if the distance between the hood panel rear end 3a and the arms 320 in the uninflated state of the airbag 366 is set to be small, therefore, the vertical distance between the hood panel rear end 3a and the arms 320 is enlarged at the expansion time of the airbag 366 so that the airbag 366 is smoothly expanded without interference with the hood panel rear end 3a or the arms 320. On the contrary, the vertical distance between the hood panel rear end 3a and the arms 320 in the uninflated state of the airbag 366 can be set to be small so that the design of the vehicle can be improved. Here in the sixth embodiment, the slide mechanisms SM are arranged both in the portion of the hinges 304 connecting the hood panel rear end 3a to the body 1 and in the wipers 319. It is, however, natural that the slide mechanism SM may be arranged only on one of them.

What is claimed is:

1. A pedestrian protecting device comprising:
a synthetic resin cowl including a cowl louver arranged between, and along a substantially entire transverse length of, a hood panel and a front windshield of a vehicle such that said cowl louver is bent along a lower end of said front windshield, and a synthetic resin cowl panel located below the cowl louver that together with the cowl louver form is a chamber; and
an airbag housed below, and folded in an elongated manner along said cowl louver,
wherein
said airbag can be expanded in an upward direction
said cowl louver includes front and rear edges and a door portion curved to protrude frontwardly at respective centers of said front and rear edges, to cover said airbag, and a plurality of insertion holes that open into the chamber for passing water and air to the cowl panel,
said door portion can be opened in a frontward or rearward direction by the said airbag when said airbag expands,
is formed integrally with said cowl louver, and
includes expansion promoting means which enable said door portion to be smoothly opened.

2. A pedestrian protecting device according to claim 1, wherein said expansion promoting means is constructed such that said door portion is formed of a thermoplastic elastomer.

3. A pedestrian protecting device according to claim 1, wherein said expansion promoting means of said door portion is a split door structure separating the door into a plurality of doors lined up along a transverse direction of the vehicle.

4. A pedestrian protecting device comprising:
a synthetic resin cowl including a cowl louver arranged between, and along a substantially entire transverse length of, a hood panel and a front windshield of a vehicle, and a synthetic resin cowl panel located beneath the cowl louver that together with the cowl louver forms a chamber; and
an airbag folded and housed below said cowl louver,
wherein
said airbag is; expandable in an upward direction,
said cowl louver is made of a synthetic resin and includes an upper side main body and a lower side member arranged below said main body,
said lower side member has a housing recess formed between itself and said main body, for housing said airbag and said inflator,
said main body has a door portion formed integrally with said main body above said housing recess, and a plurality of insertion holes that open into the chamber for passing water and air to the cowl panel,
said door portion can be opened when said housed airbag is expanded, by said airbag, and
said main body and said lower side member are sealed and connected to each other near a peripheral edge of said housing recess.

5. A pedestrian protecting device according to claim 4, wherein said main body and said lower side member are made of polypropylene, wherein a seal member for sealing said main body and said lower side member are is made of a thermoplastic elastomer of olefins or a thermoplastic elastomer of styrenes, and wherein said seal member is formed integrally with said main body or with said lower side member.

6. A pedestrian protecting device according to claim 5, wherein said door portion is made of the same material as that comprising said seal member, and wherein said seal member is formed integrally with said main body together with said door portion.

7. A pedestrian protecting device according to claim 4, wherein said hood panel has a rear vertical wall portion arranged in the vertical direction on its rear edge, wherein said main body has a front vertical wall portion bent downward at the front of the main body to form the front wall portion of said housing recess, and wherein said front vertical wall portion is arranged to approach the rear vertical wall portion of said hood panel from the vehicular rear and to face directly opposite the same.

8. A pedestrian protecting device comprising:

an airbag folded and housed at a portion of a cowl arranged between a hood panel and a front windshield of a vehicle, wherein said airbag can be expanded to protrude upward by admitting an inflating gas discharged from an inflator, thereby to protect a pedestrian, wherein said cowl includes a cowl panel made of a sheet metal and arranged within the vehicle, and a cowl louver made of a synthetic resin and arranged above said cowl panel, wherein said cowl louver has a housing portion for housing said airbag and said inflator, and a door portion for covering an upper side of said housing portion, wherein said door portion can be opened by said airbag when said airbag expands, and wherein said housing portion is supported by said cowl panel.

9. A pedestrian protecting device according to claim 8, wherein the housing portion of said cowl louver is supported on its lower face side in abutment against said cowl panel.

10. A pedestrian protecting device according to claim 8, wherein the housing portion of said cowl louver is supported at a position on the upper side of said cowl panel.

11. A pedestrian protecting device according to claim 8, wherein said airbag is housed in said housing portion after receiving water-proofing treatment, and wherein said inflator is housed in said housing portion while being surrounded with said airbag.

12. A pedestrian protecting device according to claim 8, wherein said airbag is connected and fixed to said cowl panel together with the housing portion of said cowl louver.

13. A pedestrian protecting device comprising:

an airbag for covering at least a cowl louver when it completes expansion, wherein a portion of said airbag for covering said cowl louver includes height restricting means for suppressing a height of the portion at expansion completion, wherein said airbag is formed by a hollow-weaving method, said height restricting means includes a plurality of cylindrical portions juxtaposed in a vehicular longitudinal direction in said airbag, and a cover cloth for covering said cylindrical portions on respective upper sides thereof, and said cover cloth is connectable at cover cloth edges along the vehicular longitudinal direction to said cylindrical portions to bring said cylindrical portions closer to each other in the vehicular longitudinal direction.

* * * * *